(12) United States Patent
Takayama et al.

(10) Patent No.: US 6,697,731 B2
(45) Date of Patent: *Feb. 24, 2004

(54) APPARATUS AND METHOD FOR PRESENTING NAVIGATION INFORMATION BASED ON INSTRUCTIONS DESCRIBED IN A SCRIPT

(75) Inventors: Kuniharu Takayama, Kanagawa (JP); Minoru Sekiguchi, Kanagawa (JP); Hirohisa Naito, Kanagawa (JP); Hisayuki Horai, Kanagawa (JP); Yoshiharu Maeda, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 128 days.

(21) Appl. No.: 09/994,003

(22) Filed: Nov. 27, 2001

(65) Prior Publication Data

US 2002/0103597 A1 Aug. 1, 2002

Related U.S. Application Data

(62) Division of application No. 09/392,221, filed on Sep. 9, 1999, now Pat. No. 6,336,072.

(30) Foreign Application Priority Data

Nov. 20, 1998 (JP) .......................... 10-330960
Apr. 21, 1999 (JP) .......................... 11-113191

(51) Int. Cl.$^7$ .............................. G01C 21/00
(52) U.S. Cl. .................... 701/200; 701/211; 340/995.1; 340/995; 340/27
(58) Field of Search ................. 701/200, 208, 701/210, 211, 213; 340/988, 990, 995.1, 995.25, 995.26, 995.27, 995.28

(56) References Cited

U.S. PATENT DOCUMENTS

| 5,442,557 | A | * | 8/1995 | Kaneko ................. 340/990 |
| 5,627,549 | A | * | 5/1997 | Park ................... 340/996 |
| 5,784,059 | A | * | 7/1998 | Morimoto et al. ........ 340/995 |
| 6,026,375 | A | * | 2/2000 | Hall et al. ............ 701/201 |
| 6,084,543 | A | * | 7/2000 | Iizuka ................ 342/357.13 |
| 6,091,956 | A | * | 7/2000 | Hollenberg ............ 455/456 |

FOREIGN PATENT DOCUMENTS

| EP | 0 867 850 A2 | 9/1998 | ........... G08G/1/09 |
| JP | 7-83688 | 3/1995 | |
| JP | 7-318361 | 12/1995 | |
| JP | 09-153054 | 10/1997 | ........... G06F/17/30 |
| JP | 10-66149 | 3/1998 | |
| JP | 10-11298 | 1/2003 | |
| WO | WO 98/51991 | 11/1998 | ........... G01B/5/24 |

OTHER PUBLICATIONS

Peck, Alex, et al., "Junction Deection and Pathway Selection," SPIE vol. 1613, Mobile Robots VI, Boston, Massachusetts, Nov. 14–15, 1991, pp. 139–145.

Lim, Willie, et al., "Plan–Behavior Interaction in Autonomous Navigation," SPIE vol. 1388, Mobile Robots V, Boston, Massachusetts, Nov. 8–9, 1990, pp. 464–475.

"Extensible Markup Language", www.w3.org/TR/1998/REC–xml–19980210, Feb. 10, 1998.

* cited by examiner

*Primary Examiner*—Tan Q. Nguyen
(74) *Attorney, Agent, or Firm*—Staas & Halsey LLP

(57) ABSTRACT

A navigation script includes time and point information for navigation and information for guidance, and describes an instruction sequence which can represent these information in time series in a mark-up language. According to the structured data generated from the navigation script, an instruction corresponding to a current time or point is executed, so that information for guidance to be presented is output.

19 Claims, 58 Drawing Sheets

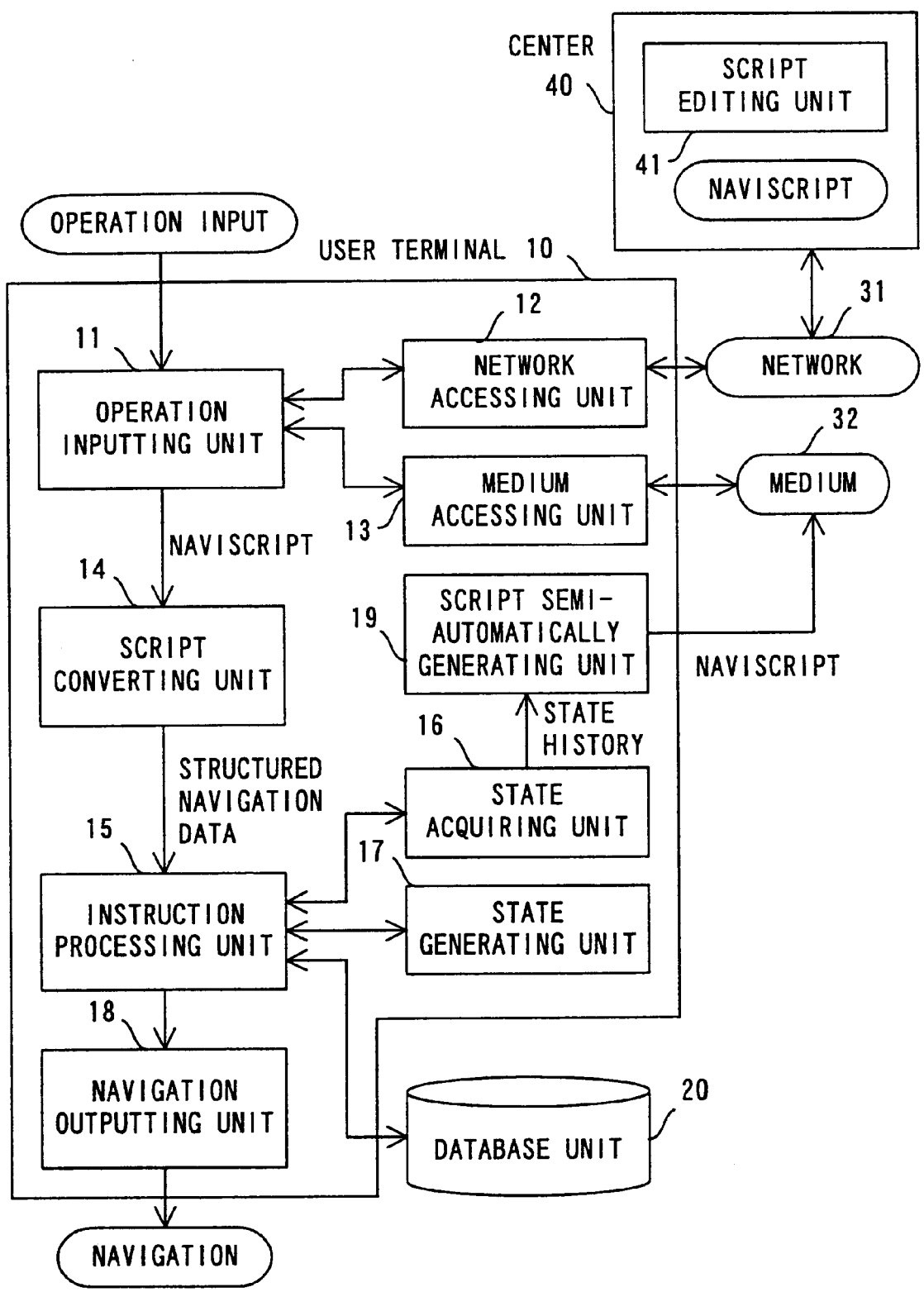
F I G. 1

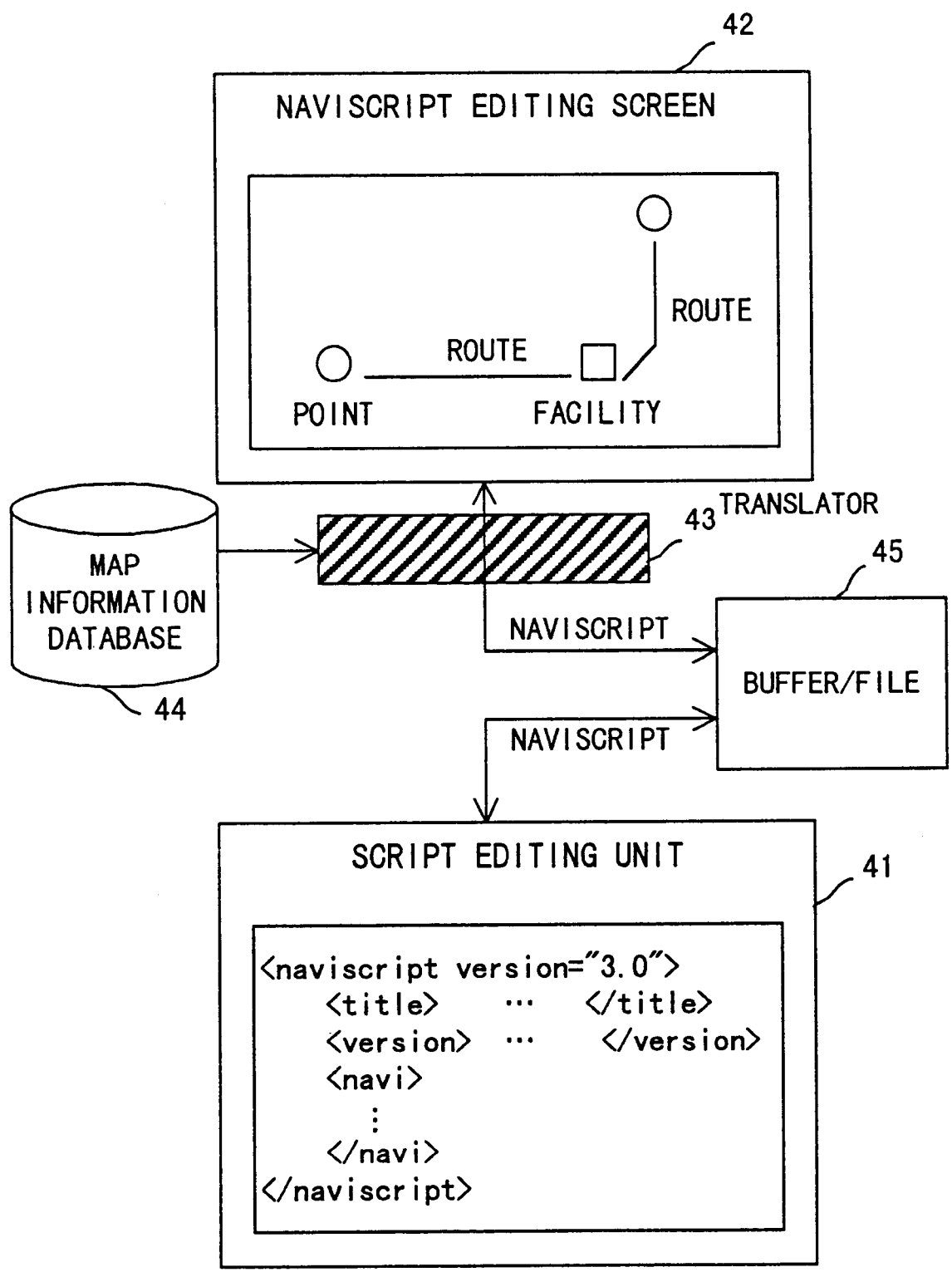
F I G. 2

| CONDITION | TIME | PLACE | ROUTE | NAVIGATION INFORMATION |
|---|---|---|---|---|
| | | | | voice:WELCOME TO RAINBOW TOWN TOUR! |
| | | category:station<br>name:KAIHINMAKUHARI | means:train<br>category:JR<br>category:KEIYO LINE<br>duration:41min<br>distance:31.7km<br>cost:540yen | |
| | | category:station<br>name:TOKYO | | |
| | | name:TOKYO STATION YAESU CENTRAL EXIT<br>longitude:133.33.36<br>latitude:36.2.5 | means:car<br>category:METROPOLITAN HIGHWAY<br>cost:700yen | |
| | | name:KYOBASHI IC<br>longitude:133.33.36<br>latitude:36.2.5 | | |
| | | | | text:RAINBOW BRIDGE IN 10 MINUTES |
| | time(EDOBASHI JC)-10min | location(EDOBASHI JC)-1.0KM | | info:info OF RAINBOW BRIDGE |
| | | name:EDOBASHI JC | title:RAINBOW BRIDGE<br>means:car<br>category:METROPOLITAN HIGHWAY | |
| | | DAIBA IC (POINT INFORMATION) | | |
| ... | | ... | ... | ... |

CONTINUED FROM FIG. 3

| CONDITION | TIME | PLACE | ROUTE | NAVIGATION INFORMATION |
|---|---|---|---|---|
| ... | ... | ... | ... | ... |
| if((11:30=<(time (DAIBA IC) && (time (DAIBA IC))=<(13:30)) | | restaurant (POINT INFORMATION) | | info:info of restaurant |
| if((DAIBA IC))|| (13:30<time(DAIBA IC)) | | cafe (POINT INFORMATION) | | info:info of cafe |
| | | BREAKWATER (POINT INFORMATION) | | |
| | | name:FUJISUN-TELEVISION address:9-9-9,DAIBA,MINATO WARD, TOKYO | | |
| | | name:TOKYO STATION YAESU CENTRAL EXIT longitude:133.33.36 latitude:36.2.5 | | |
| | | | | voice:HOPE YOU ENJOYED THIS TOUR! Sound:sound — bye.way |
| | 12:00 | | | voice:NOW AT NOON |

FIG. 4

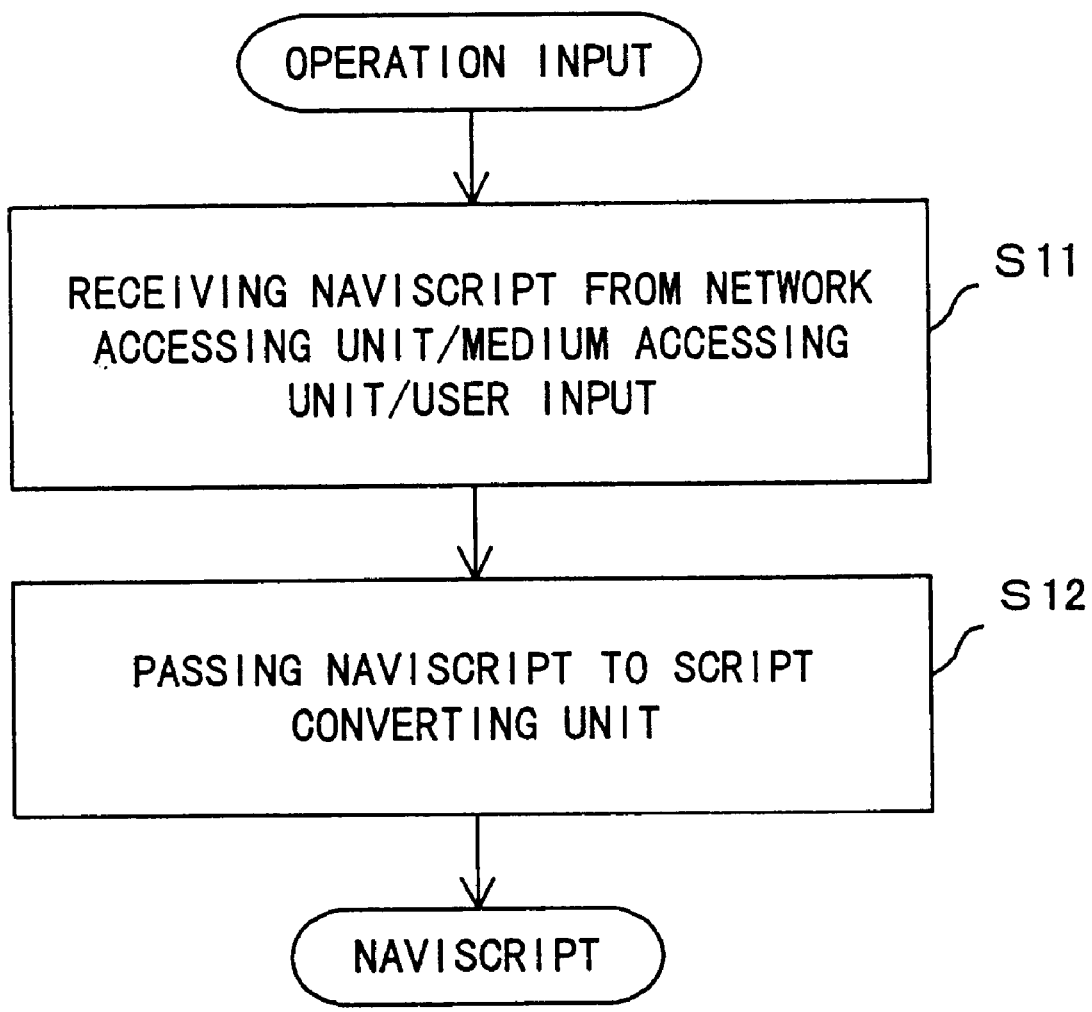
F I G. 5

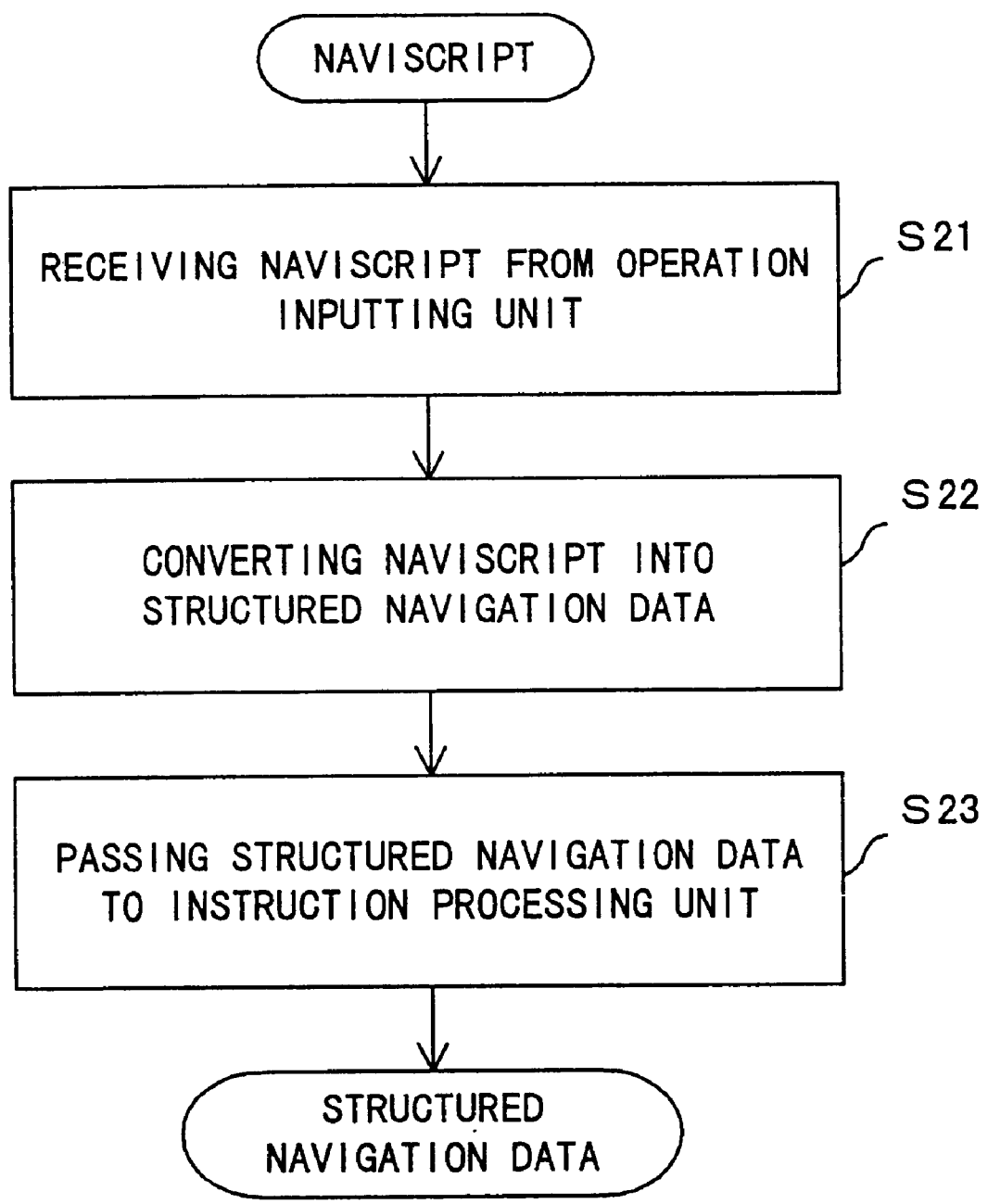
F I G. 6

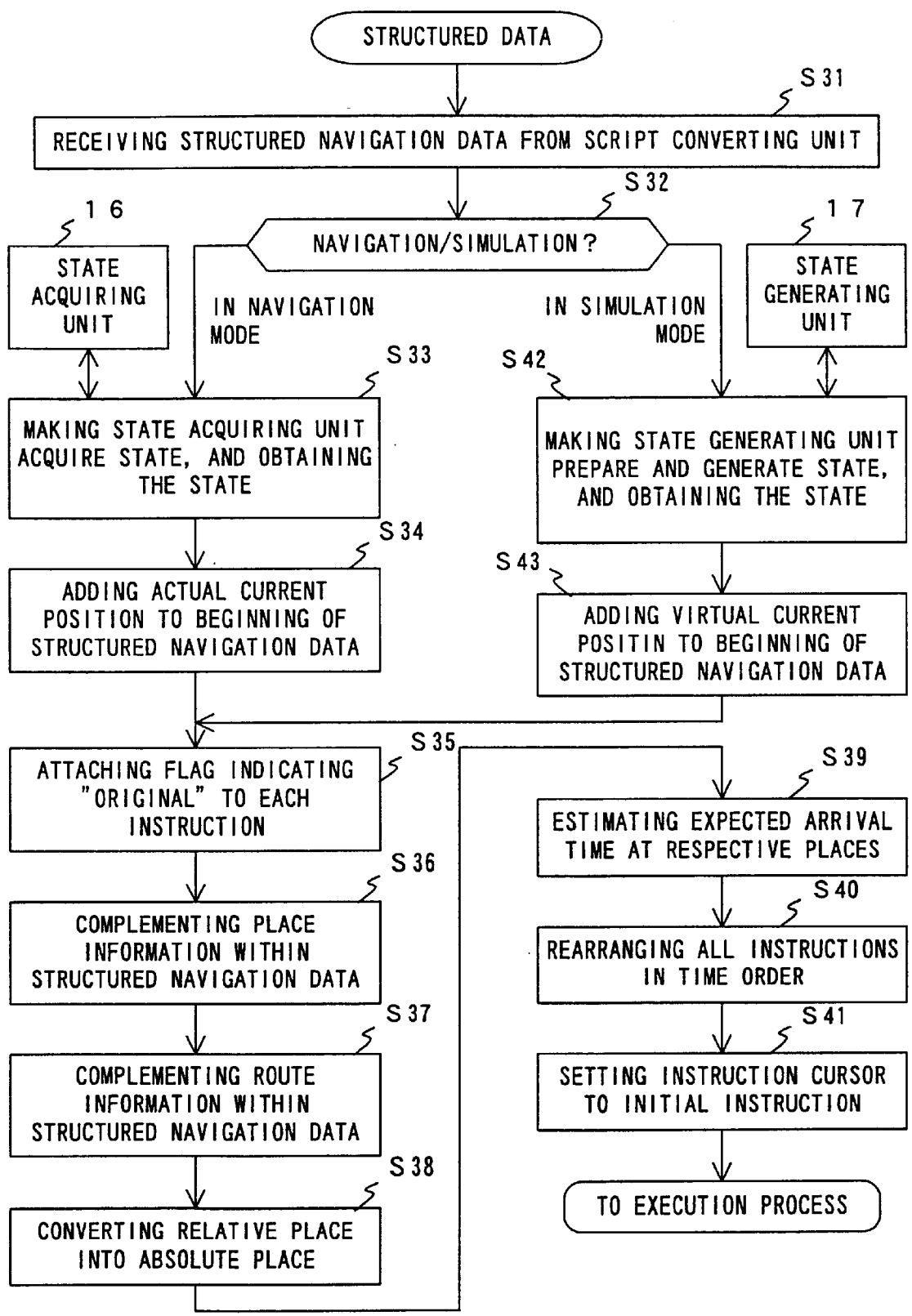
F I G. 7

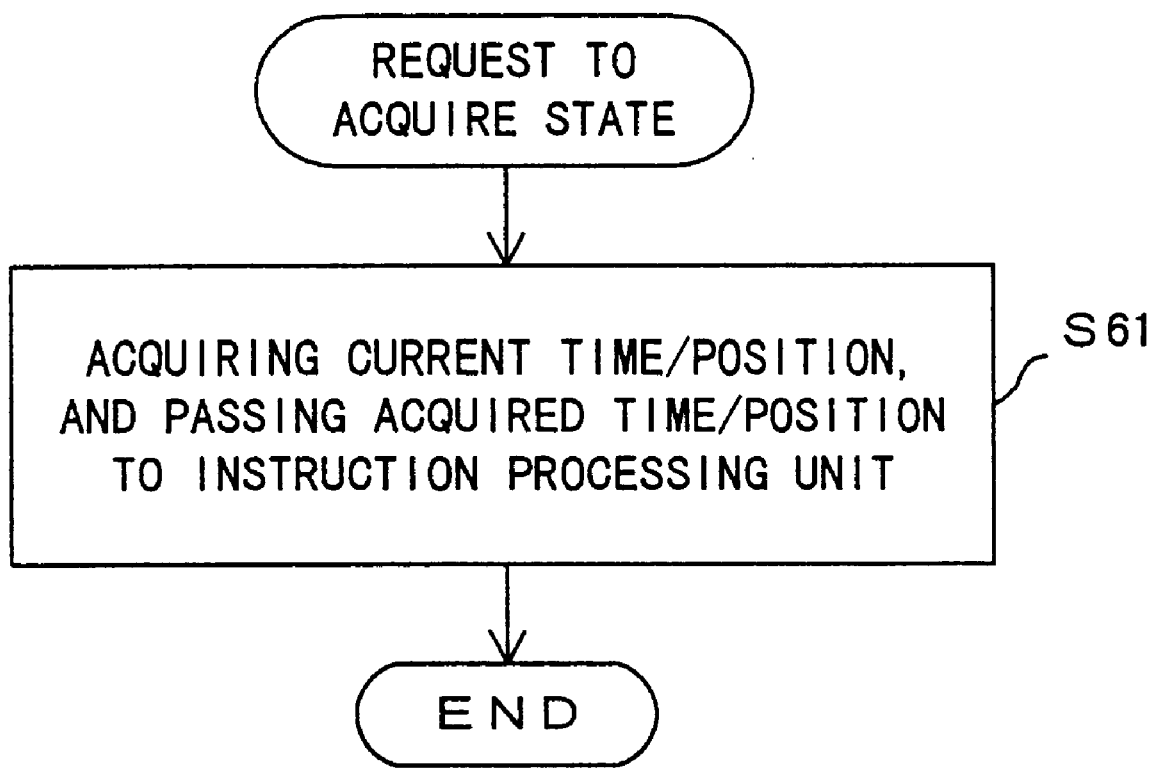
F I G. 9

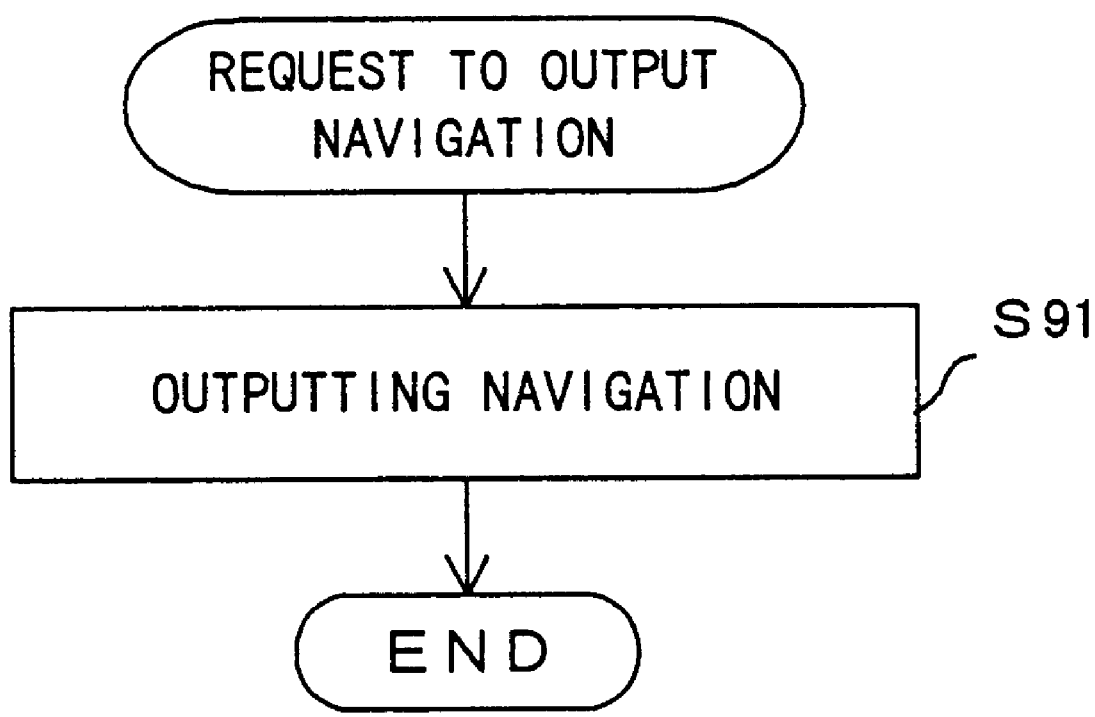
F I G. 1 3

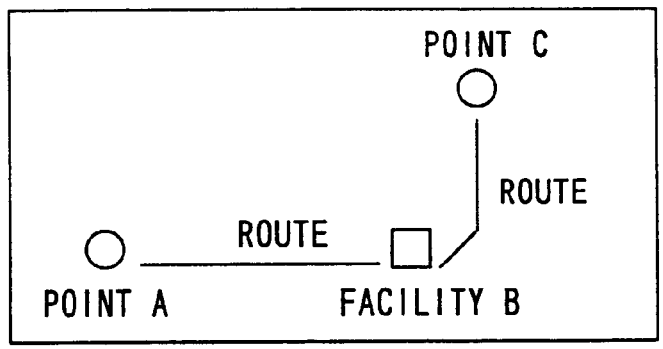
F I G. 1 4 A
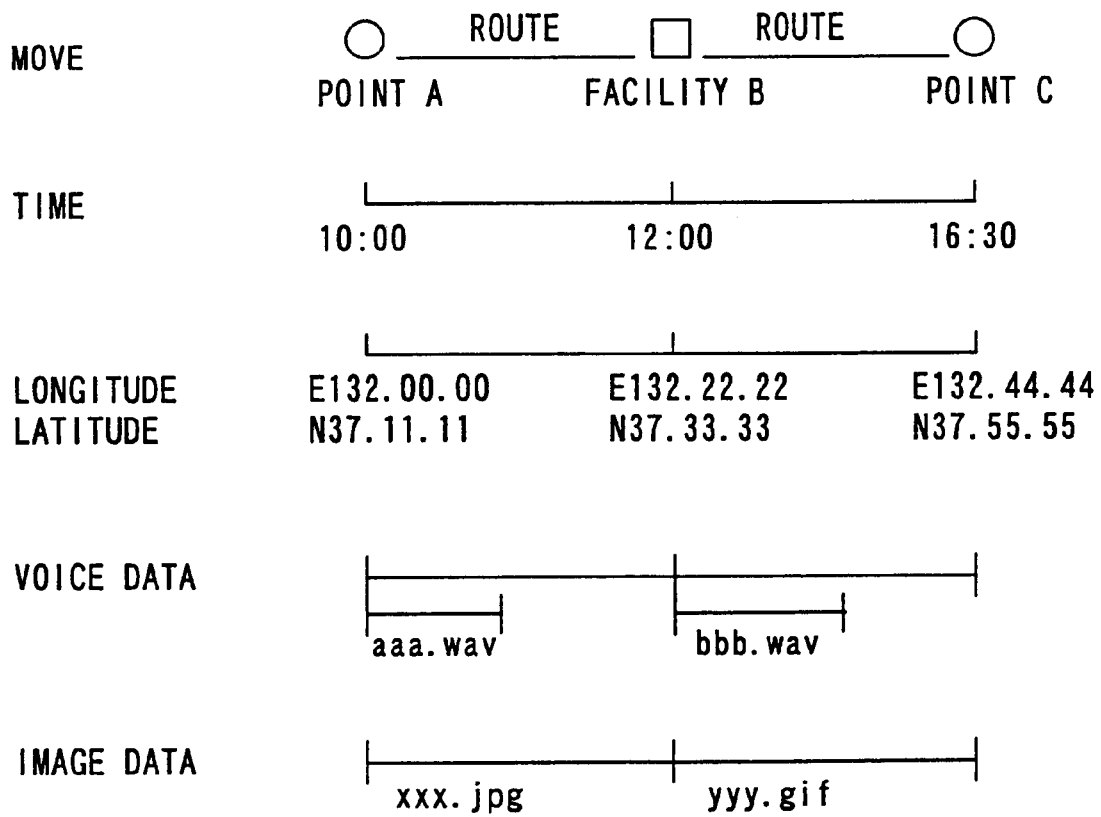
F I G. 1 4 B

NAVIScript　　　　AREA/CATEGORY　　　　ClipFile　　　　OriginalScript

AREA　　SHIBUYA WARD

CATEGORY　　VIEW

NUMBER OF SEARCHED RESULTS　2(1/1)

| NUMBER | CATEGORY | COURSE NAME<br>METHOD, DISTANCE, TIME, COST |
|---|---|---|
| 1 | VIEW | TOKYO ○○ CITY-□○ COMMUNICATION CENTER—NATIONAL NOH THEATER<br>WALKING, 3.0KM, 3 HOURS AND 30 MINUTES, 1,400YEN (ADMISSION TICKET) |
| 2 | VIEW | SWORDS MUSEUM—MEIJI SHRINE<br>WALKING, 1.5KM, 1 HOURS AND 30 MINUTES, 800YEN (ADMISSION TICKET) |

☐　☐

NEXT PAGE　　　RE-SEARCH　　　WRITING TO CLIP FILE

AREA/CATEGORY　　　　ClipFile　　　　OriginalScript

F I G. 17

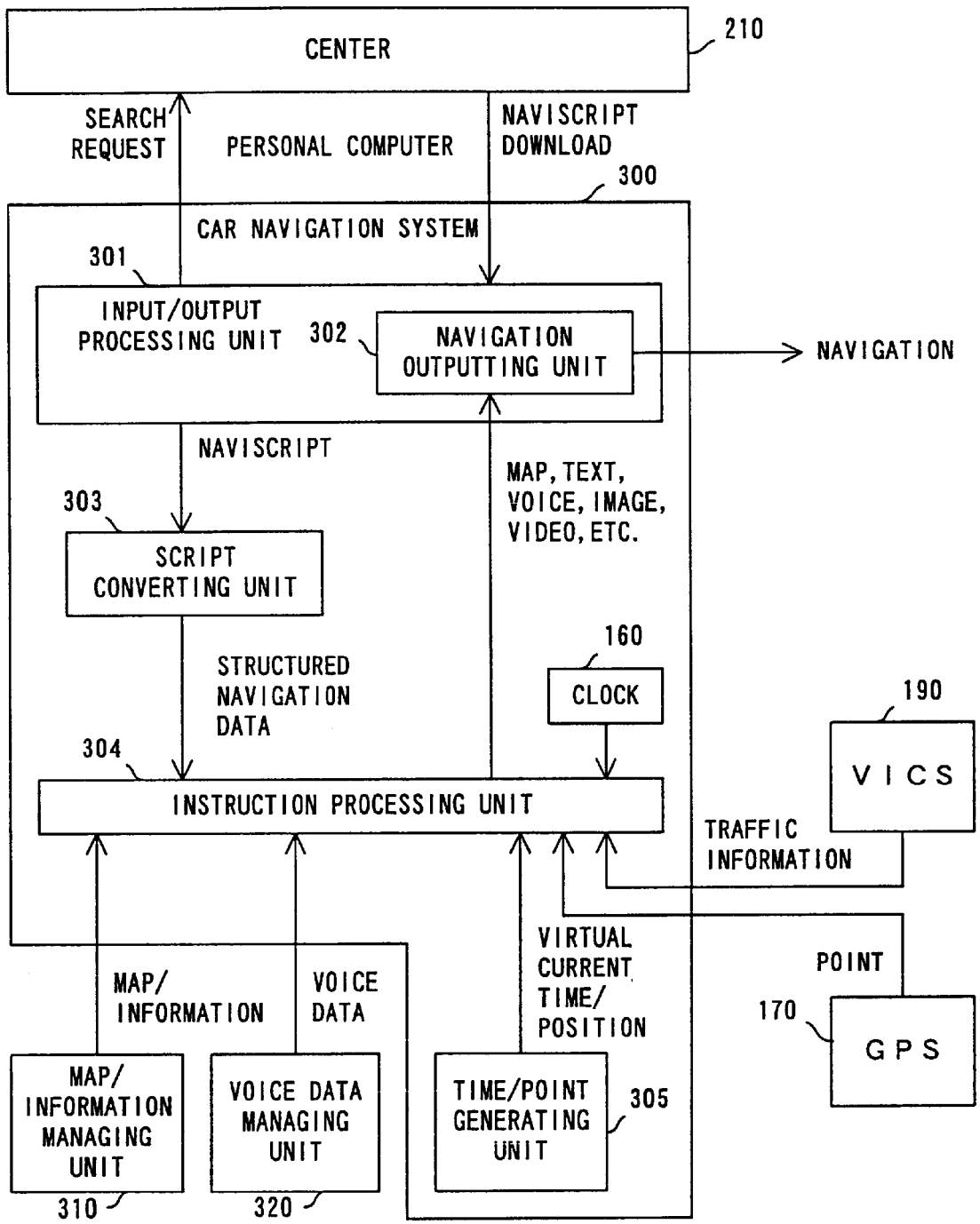
F I G. 1 9

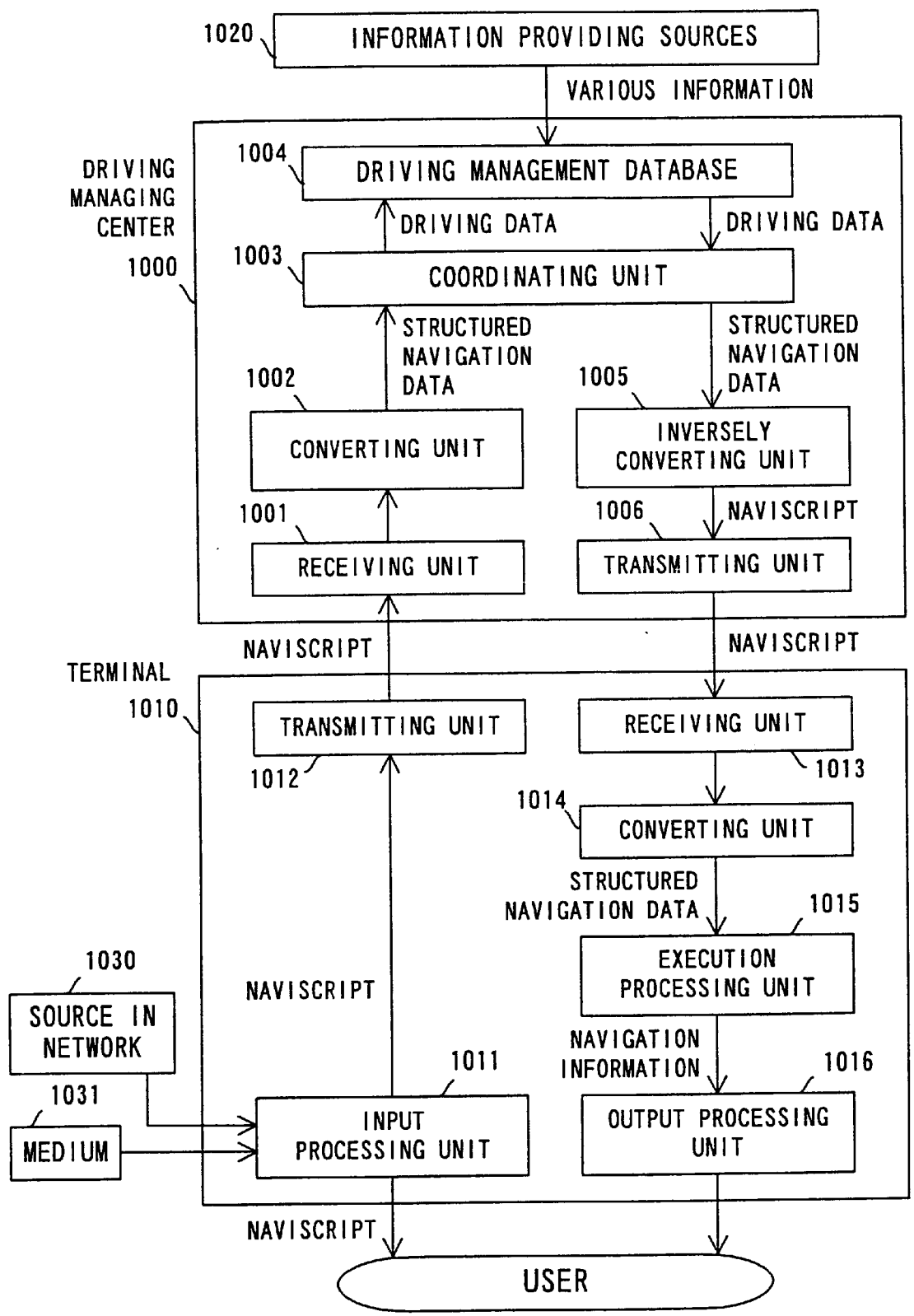
F I G. 2 1

Active Time/Point Scheduler

| PLACE | TIME | MOVE METHOD | AMOUNT OF MONEY | | MAP |
|---|---|---|---|---|---|
| MAKUHARI BLDG./ KAIHINMAKUHARI | 08:15<br>08:25 | WALKING | | | |
| KAIHINMAKUHARI/ HACCHOBORI | 08:32<br>09:02 | KEIYO LINE (RAPID) | 540 | ◁ | |
| HACCHOBORI/ NAKAMEGURO | 09:08<br>09:31 | HIBIYA SUBWAY LINE | 190 | ▷ | |
| ◆ CURRENT TIME | 09:40 | | | ◁ | NEXT POINT REACHED BEHIND SCHEDULE. RESCHEDULING AT NORMAL SPEED? |
| NAKAMEGURO/ MUSASHIKOSUGI | 09:34<br>09:46 | TOKYU TOYOKO LINE (EXPRESS) | 190 | ▷ | |
| MUSASHIKOSUGI/ MUSASHINAKAHARA | 09:51<br>09:53 | NANBU LINE | 130 | | |
| MUSASHINAKAHARA/ KAWASAKI PLANT | 09:53<br>10:00 | WALKING | | | |
| ◇ REQUIRED TIME | 01:21 | | 1,050 | ▷ | ▷ ◁ Yes No Undo |

F I G. 2 8

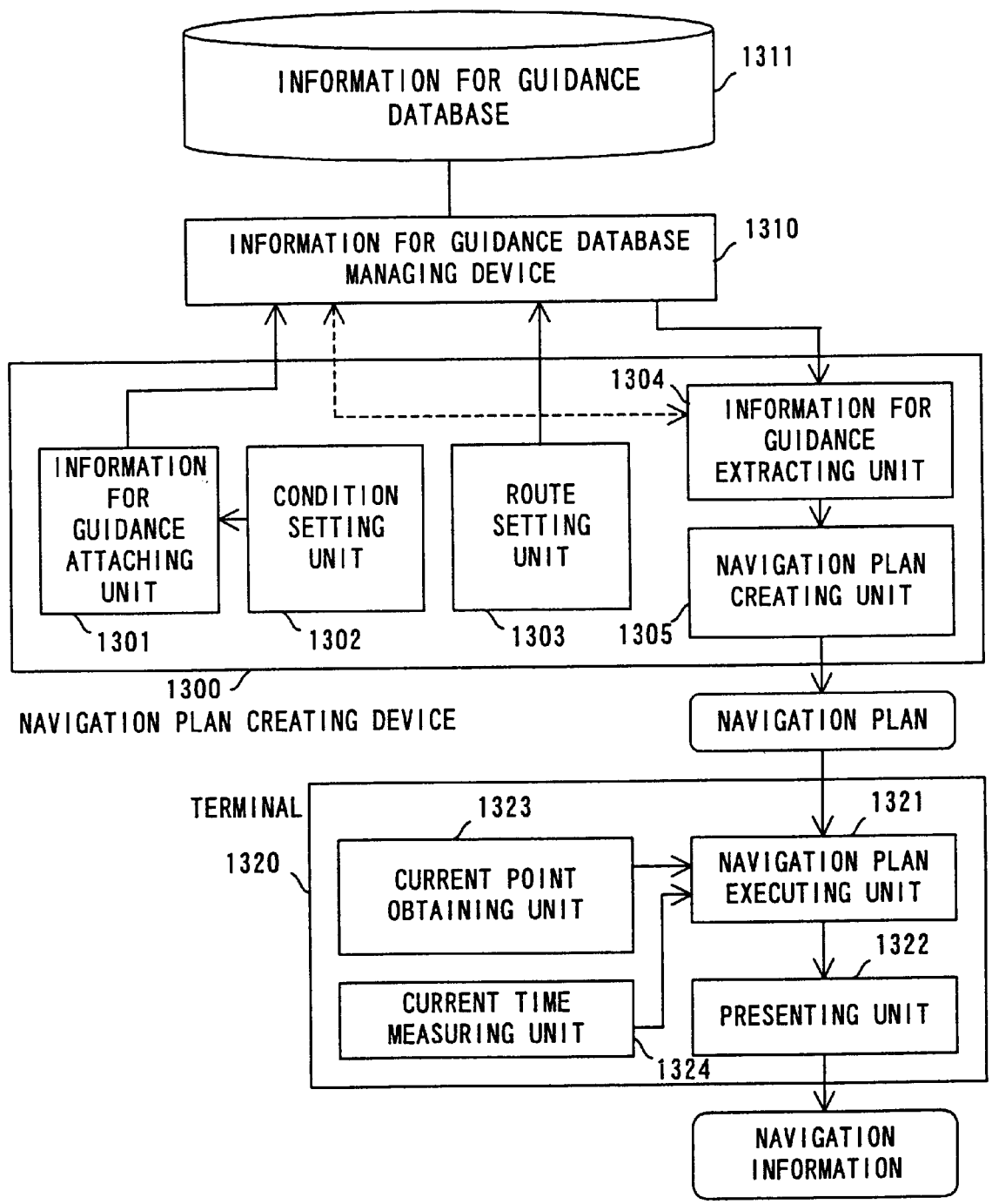
F I G. 3 1

SCHEDULE DATA IN THE FORM OF ONE MONTH

1998 DECEMBER

| SUN | MON | TUE | WED | THU | FRI | SAT |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |  |  |  |

1344

○○ FESTIVAL WILL BE HELD. — 1345

SCHEDULE DATA IN THE FORM OF ONE DAY

DECEMBER 7TH, 1998

| AM | 7 | 00 |
|---|---|---|
|  |  | 30 |
|  | 8 | 00 |
|  |  | 30 |
|  | 9 | 00 |
|  |  | 30 |
|  | 10 | 00 |
|  |  | 30 |
|  | 11 | 00 |
|  |  | 30 |
|  | 12 | 00 |
|  |  | 30 |
| PM | 1 | 00 |
|  |  | 30 |
|  | 2 | 00 |
|  |  | 30 |

1341

HAVE LUNCH WITHIN THIS TIME SLOT — 1342

FREE TIME — 1343

FIG. 33B

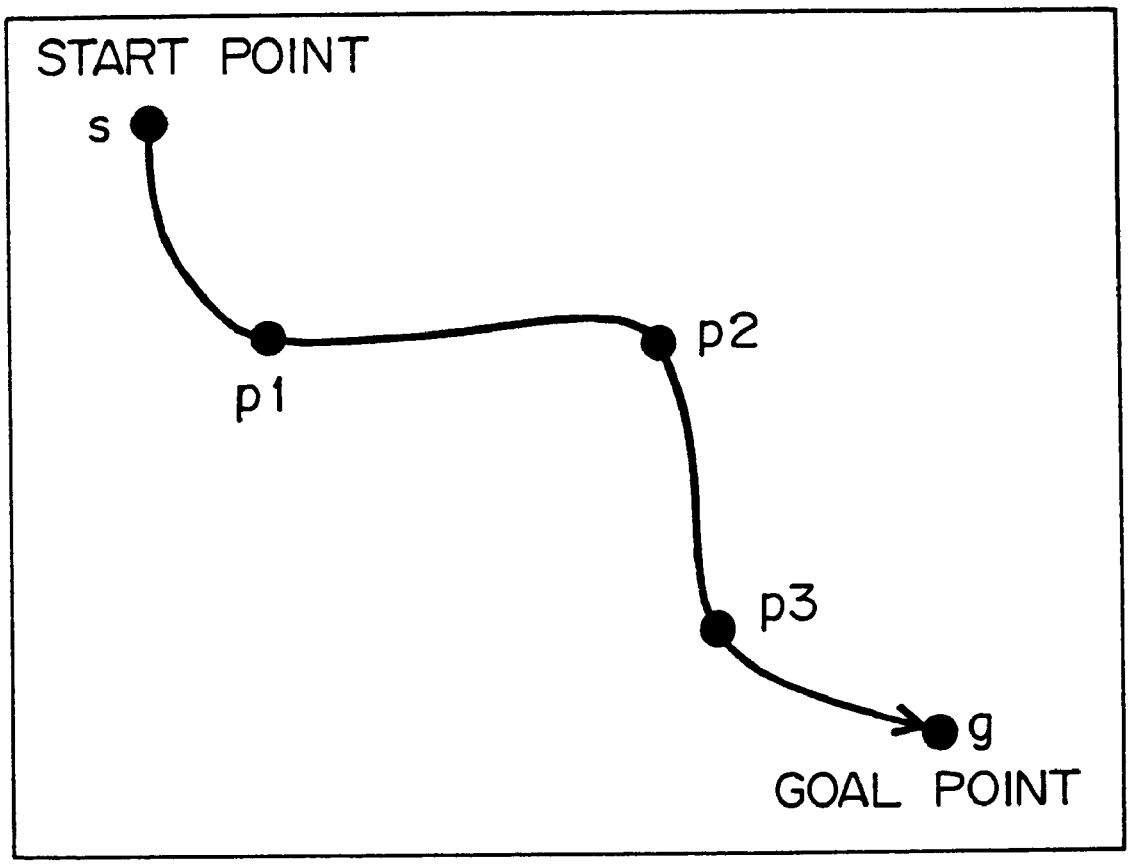
F I G. 38B

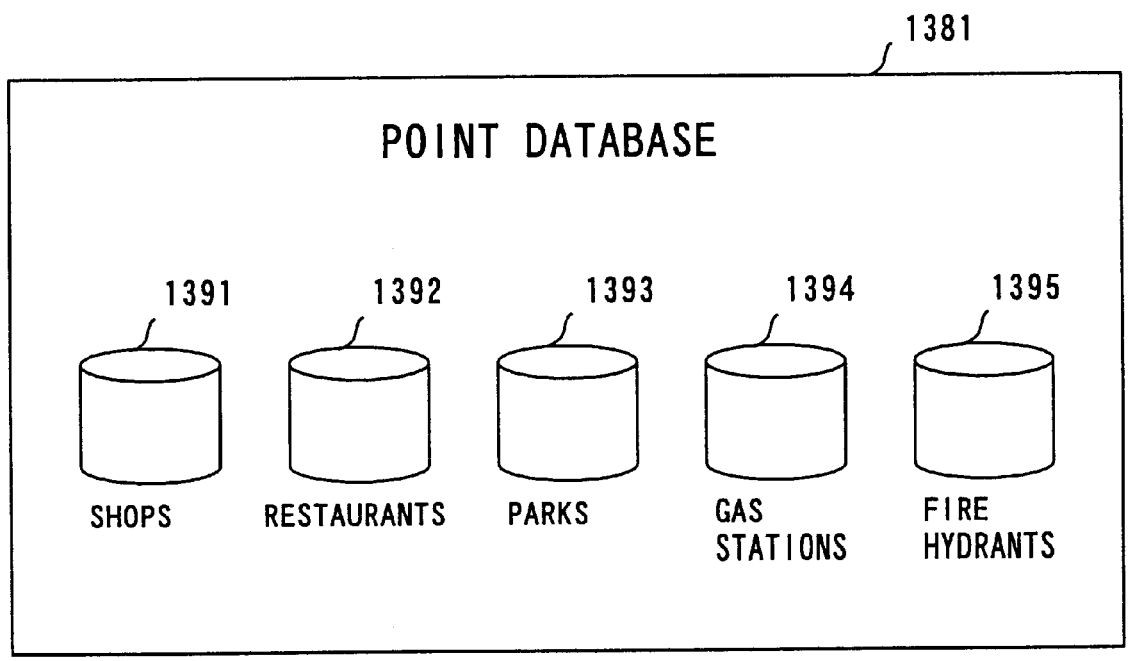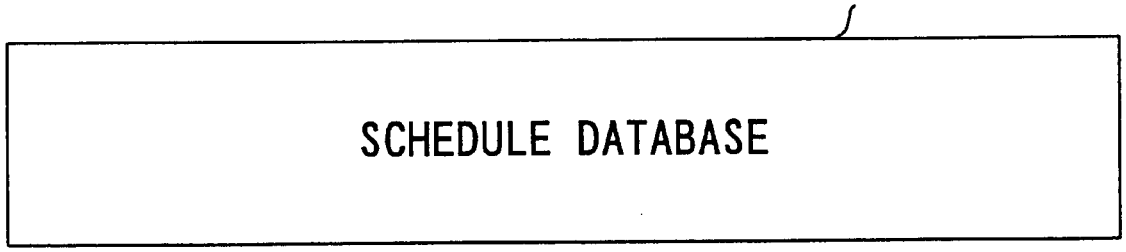
F I G. 38E

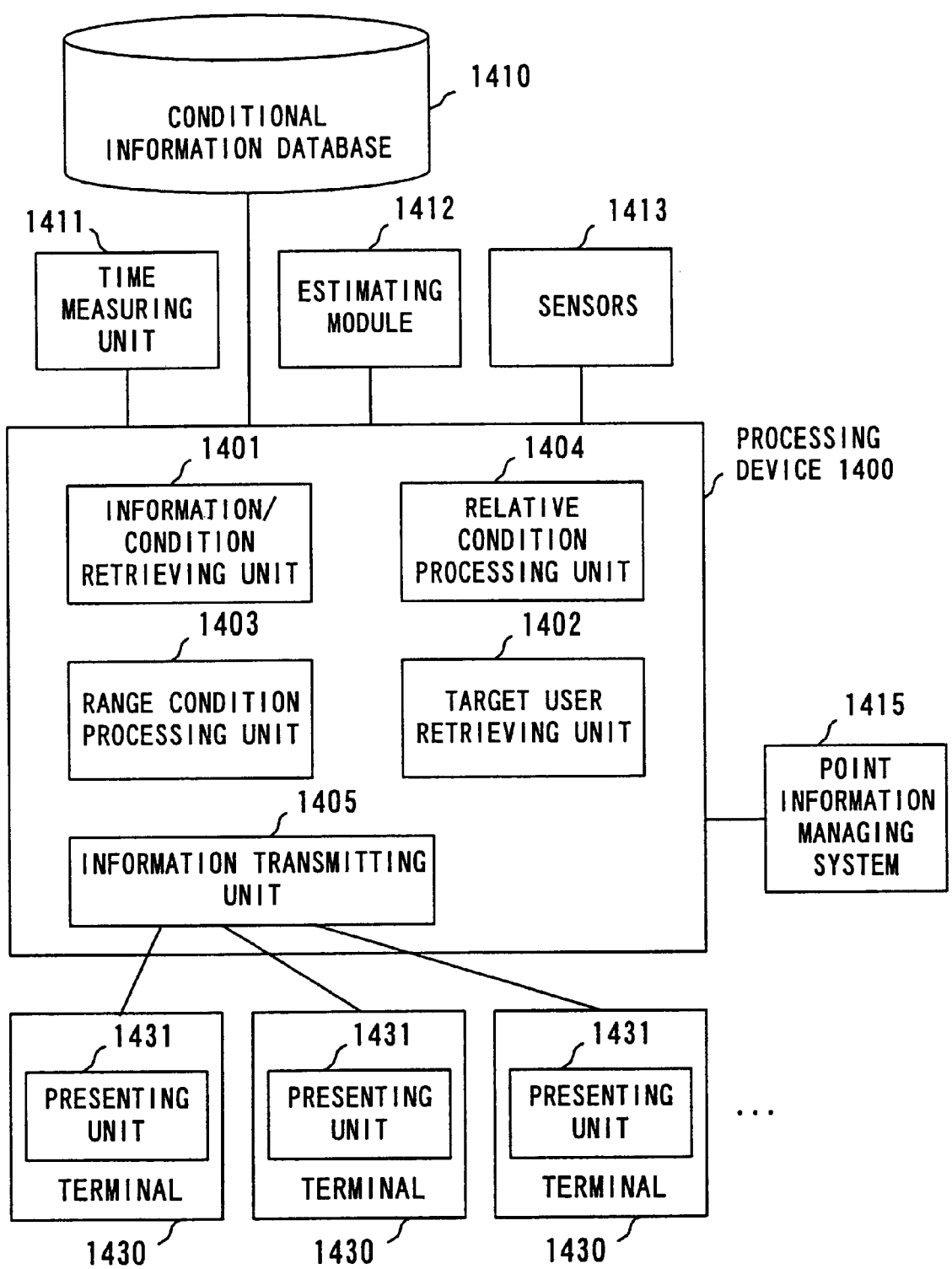
F I G. 40

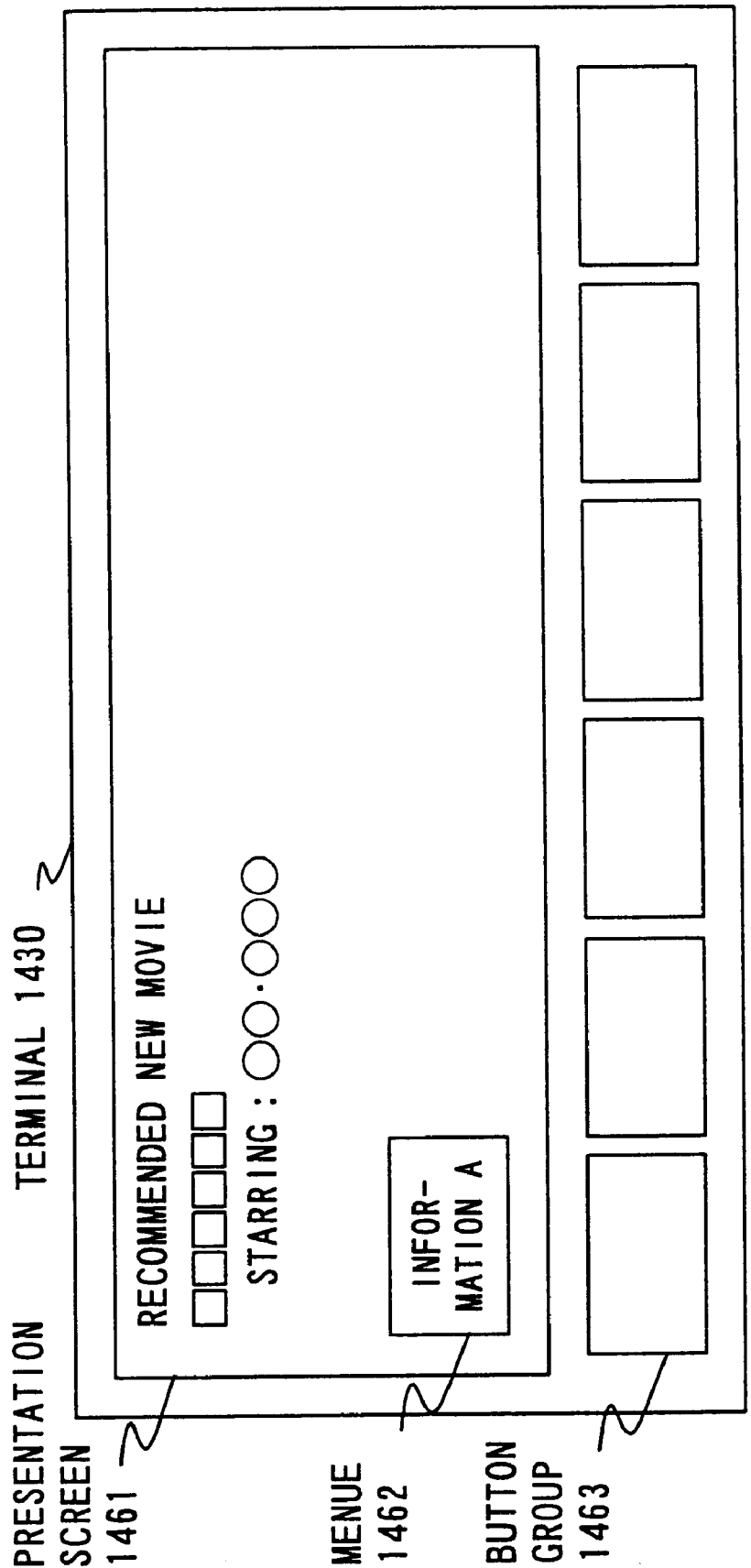

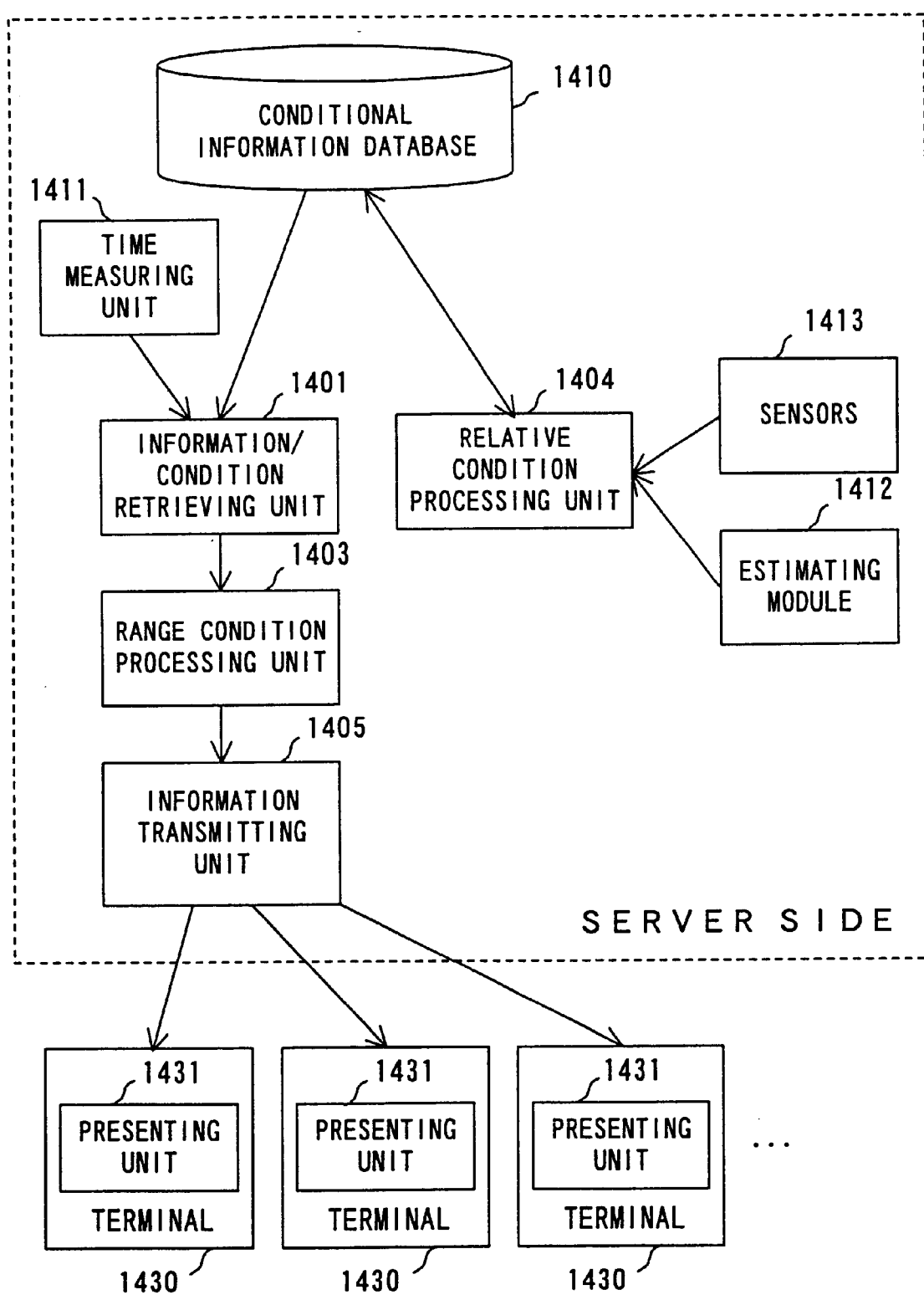
F I G. 4 2

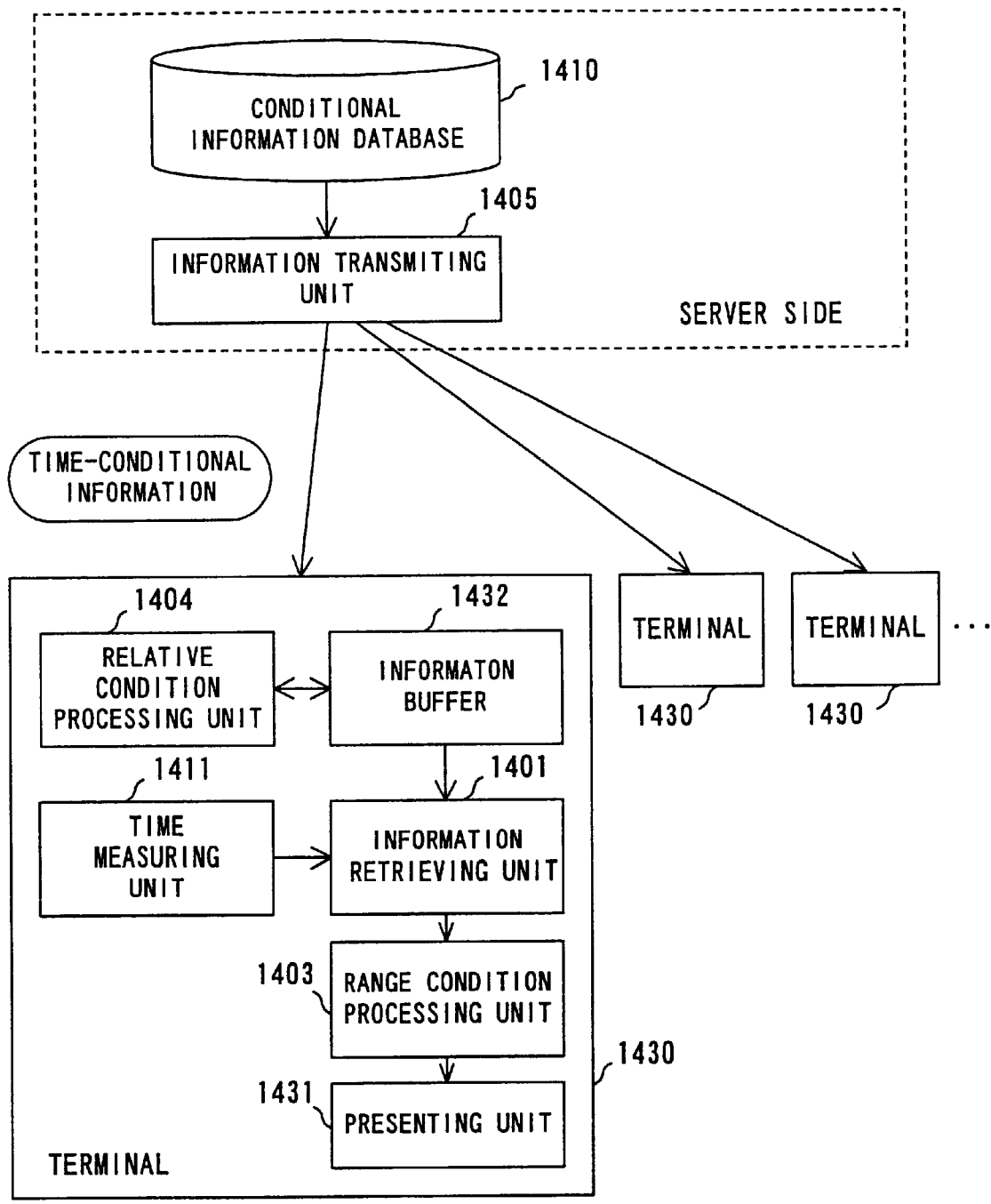
F I G. 4 3

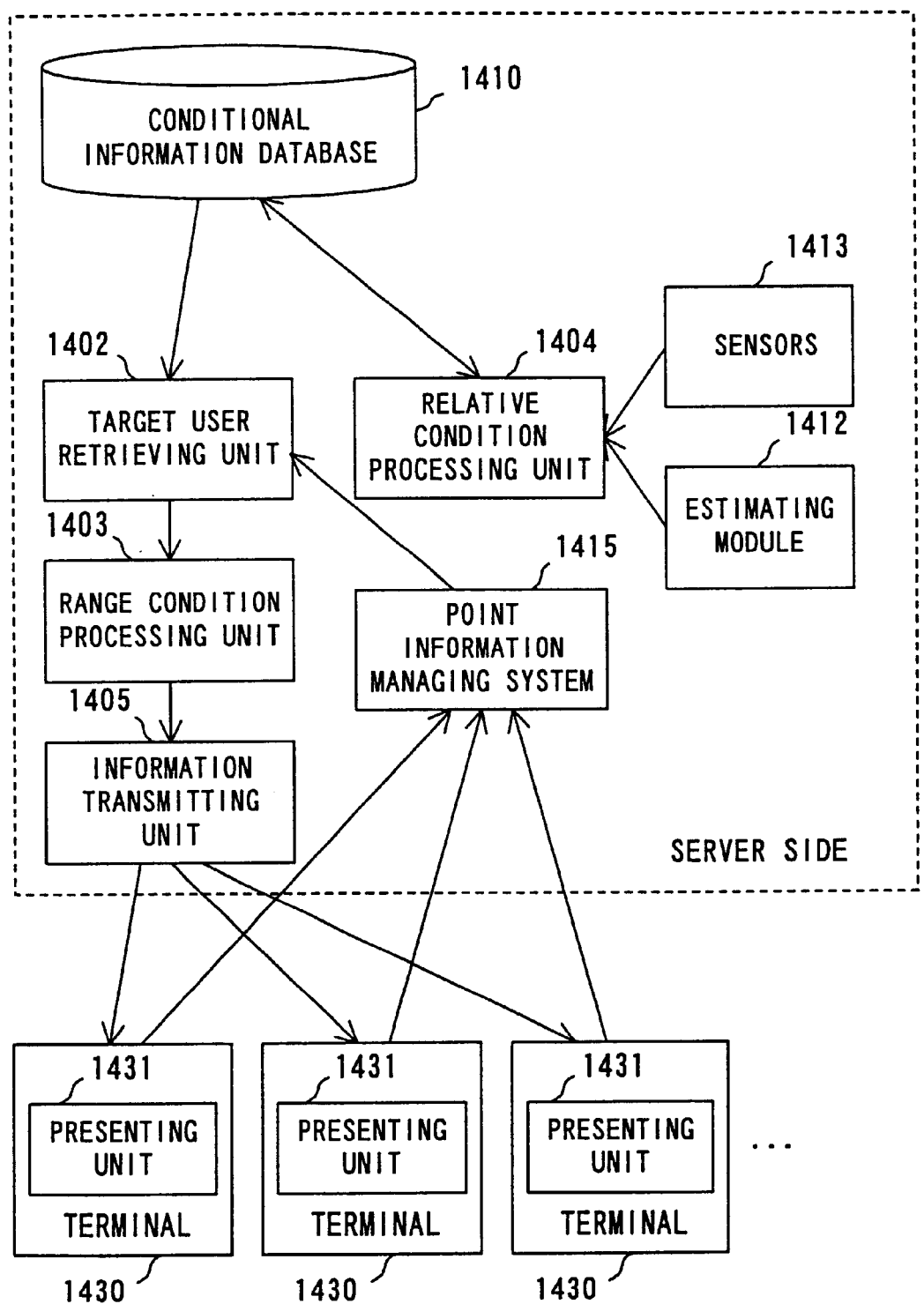
F I G. 45

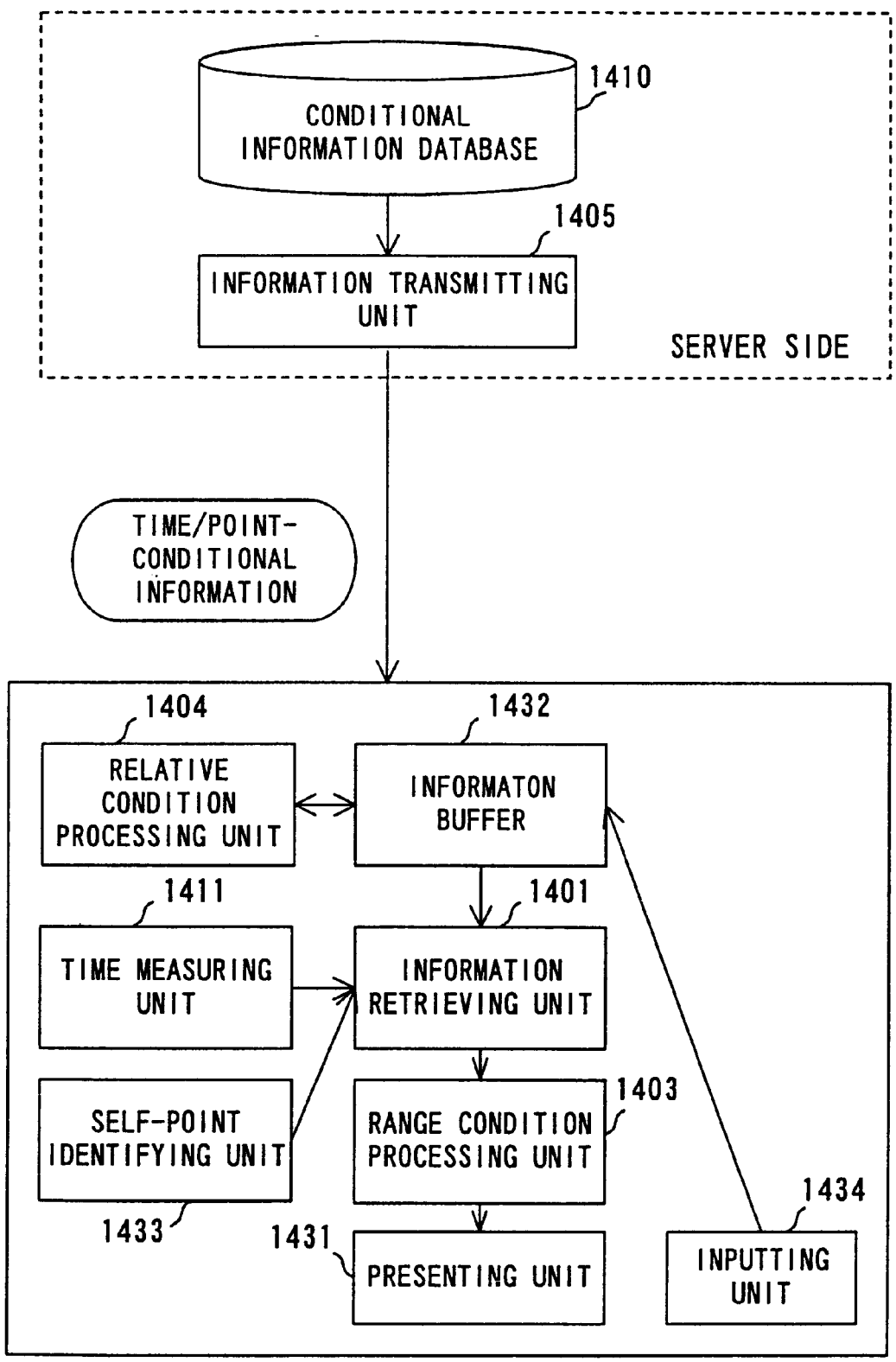
F I G. 50

APPARATUS AND METHOD FOR PRESENTING NAVIGATION INFORMATION BASED ON INSTRUCTIONS DESCRIBED IN A SCRIPT

This is a division of Application Ser. No. 09/392,221 filed Sep. 9, 1999, now U.S. Pat. No. 6,336,072.

BACKGROUND OF THE INVENTION

1. Field of the Invention

The present invention relates to a navigation information presenting apparatus for providing navigation information of a route, etc. by using a markup language description and a method thereof, and more particularly to a technique which is applied to car navigation systems, personal computers, PDA (Personal Digital Assistant), PDC (Personal Digital Cellular), PHS (Personal Handyphone System), etc., and is available for providing route information or additional information such as route navigation, sightseeing information, a delivery plan, a travel plan, traffic control, scheduling, an amusement, a municipal service, etc. via a network or an electronic medium.

2. Description of the Related Art

With conventional navigation information services, for example, if a point desired to be navigated is specified, the data about that point are listed and presented in many cases. Additionally, their contents include only the geographic information (such as a point, a route to the point, or some facilities, etc.)

Furthermore, with a conventional car navigation system, when a departure point, a destination, en-route spots, etc. are set, an appropriate route is selected based on map information, and only geographic information is output while a car is running, thus it is impossible to output additional information for navigation and guidance at a particular time and/or point. Still further, the route information from a departure point to a destination, which is set by one car navigation system, cannot be ported to another so as to utilize the information.

Besides, in a conventional navigation information service, a data list relating to a place to be presented appears to be uneasy to understand. For example, it is unclear whether such a data list is either a mere data set or a data sequence described in an order to be executed. Accordingly, it is also unclear how to handle the described data.

Additionally, since the contents of described data include only the information about a specified point, it is impossible to flexibly guide the route reaching that point or en-route spots. By way of example, information for guidance such as "This facility is famous for ○○" or "Reaches ○○ in 3 more minutes" 3 minutes prior to an arrival at a destination cannot be described and provided on a route, with only destination specification.

Furthermore, because data of the conventional navigation information service are provided in a format which is different depending on each system, navigation information are difficult to be reciprocally used. For instance, although point information services can be provided in a car navigation system or a PHS (Personal Handyphone System), their data cannot be shared by the systems.

SUMMARY OF THE INVENTION

An object of the present invention is to provide an apparatus which can provide the information such as points, routes, and facilities, can actually or virtually perform navigation along a route to a certain point as a user moves or time elapses, and can provide various information for guidance in a format which can be shared by various systems or devices, and a method thereof.

A navigation information presenting apparatus in a first aspect of the present invention comprises an inputting unit, a state acquiring and/or generating unit, a processing unit, and a presenting unit, and presents navigation information to a user or users depending on the state.

The inputting unit inputs a navigation script composed of an instruction sequence based on a predetermined specification, which can describe at least time information and/or point information, and various information for guidance to be output according to at least a time and/or point to be presented, where each of the information is described by a set of combinations of a name which can identify a type of the information and the contents thereof.

The state acquiring unit acquires a state including at least a current time and point, and the state generating unit generates a state including at least either of a virtual current time and point. The processing unit processes the instructions described in an input navigation script according to at least the current or virtual time and point obtained by the state acquisition process or the state generation process. The presenting unit outputs navigation information to be output as the instructions are processed, and presents the navigation information to a user or users.

A navigation information presenting apparatus in a second aspect of the present invention comprises a selecting unit and an outputting unit, and presents navigation information to a user or users depending on a state.

The selecting unit dynamically selects navigation information to be presented according to at least time information and/or point information. The outputting unit outputs selected navigation information according to at least a time and a point to be presented.

A driving managing device in a third aspect of the present invention comprises an inputting unit, a driving management database, a coordinating unit, and an outputting unit, and manages driving data.

The inputting unit inputs a navigation script composed of an instruction sequence based on a predetermined specification, which can describe at least time information and/or point information, and information for guidance to be output according to at least a time and/or point to be presented, where the information is described by a set of combinations of a name which can identify a type of the information and the contents thereof.

The driving management database manages the data describing at least time and/or point information, and at least a reservation state and/or a point state. The coordinating unit makes a comparison and coordination between the navigation script input by the inputting unit and the data of the driving management database, and performs the process for modifying the navigation script and the process for updating the data of the driving management database depending on need, according to the result of the comparison and coordination. The outputting unit outputs a resultant navigation script.

A time coordinating device in a fourth aspect of the present invention comprises an inputting unit, a scheduler, a rule base, and a monitoring and executing device, and proposes an action to be executed by a user depending on whether or not the user reaches by an arrival time.

The inputting unit inputs a navigation script composed of an instruction sequence based on a predetermined specification, which can describe at least time information and/or point information, and information for guidance to be output according to at least a time and/or point to be presented, where the information is described by a set of combinations of a name which can identify a type of the information and the contents thereof.

The scheduler schedules arrival times at respective points. The rule base stores the rules which describe actions to be executed depending on whether or not there is sufficient time to an arrival time. The monitoring/executing device checks the arrival times at which subsequent points from the current point at the current time are reached for at least each of a predetermined time, point, and distance.

A navigation plan creating apparatus in a fifth aspect of the present invention comprises an associating unit, a setting unit, and a creating unit, and creates a navigation plan obtained by combining navigation information.

The associating unit associates the navigation information with one of areas and points of map information. The setting unit sets a route specified on the map information. The creating unit creates a navigation plan by extracting the navigation information associated with the set route.

A navigation information providing apparatus in a sixth aspect of the present invention comprises a managing unit, a retrieving unit, and a providing unit, and provides information to a user.

The managing unit manages the information with a presentation condition relating to a time. The retrieving unit checks the information with the presentation condition for each time step, and retrieves the information which satisfies a time condition. The providing unit provides a user with the information which satisfies the time condition.

A navigation information providing apparatus in a seventh aspect of the present invention comprises a managing unit, an obtaining unit, a retrieving unit, and a providing unit, and provides a user with information.

The managing unit manages the information with a presentation condition relating a place. The obtaining unit obtains the position information of a user. The retrieving unit checks the information with the presentation condition according to the obtained position of the user, and retrieves information which satisfies a place condition. The providing unit provides the user with the information which satisfies the place condition.

A navigation information providing apparatus in an eighth aspect of the present invention comprises a managing unit, an obtaining unit, a retrieving unit, and a providing unit, and provides a user with information.

The managing unit manages the information with a presentation condition relating to a place. The obtaining unit obtains the position information of a user. The retrieving unit checks the information with the presentation condition, and retrieves a user which satisfies a place condition. The providing unit provides the retrieved user with the information with the corresponding presentation condition.

BRIEF DESCRIPTION OF THE DRAWINGS

FIG. 1 is a block diagram showing the configuration of an apparatus according to the present invention;

FIG. 2 explains the process performed by a script editing unit;

FIG. 3 shows a part of structured navigation data into which a navigation script is converted, in the form of a table;

FIG. 4 shows in the form of a table a part of structured navigation data into which a naviscript is converted, in the form of a table;

FIG. 5 is a flowchart showing the process performed by an operation inputting unit;

FIG. 6 is a flowchart showing the process performed by a script converting unit;

FIG. 7 is a flowchart showing the preparing process performed by an instruction processing unit;

FIG. 9 is a flowchart showing the state acquiring process performed by a state acquiring unit;

FIG. 13 is a flowchart showing the navigation outputting process performed by a navigation outputting unit;

FIG. 14A shows a target route of a script semi-automatic generation process;

FIG. 14B shows target time series data of the script semi-automatic generation process;

FIG. 17 exemplifies a screen resultant from the naviscript retrieval;

FIG. 19 exemplifies the system configuration in the case where the present invention is applied to a car navigation system;

FIG. 21 exemplifies the system configuration in the case where the present invention is applied to a driving managing system;

FIG. 28 exemplifies a monitor display screen;

FIG. 31 exemplifies the configuration of a navigation plan creating and information for guidance managing system;

FIG. 33B shows the process for attaching navigation information to time data;

FIG. 38B shows a second example of the route;

FIG. 38E shows a point database and a time database;

FIG. 40 exemplifies the configuration of a system for processing information with a time/point condition;

FIG. 41A shows a first example of an information presentation screen;

FIG. 42 exemplifies the system configuration in the case where a server side processes information with a time condition;

FIG. 43 exemplifies the system configuration in the case where a terminal side processes information with a time condition;

FIG. 45 exemplifies the system configuration in the case where a server side processes information with a place condition;

FIG. 50 exemplifies the system configuration in the case where a terminal having a scheduling capability processes information with a condition.

DESCRIPTION OF THE PREFERRED EMBODIMENTS

Figure 8:
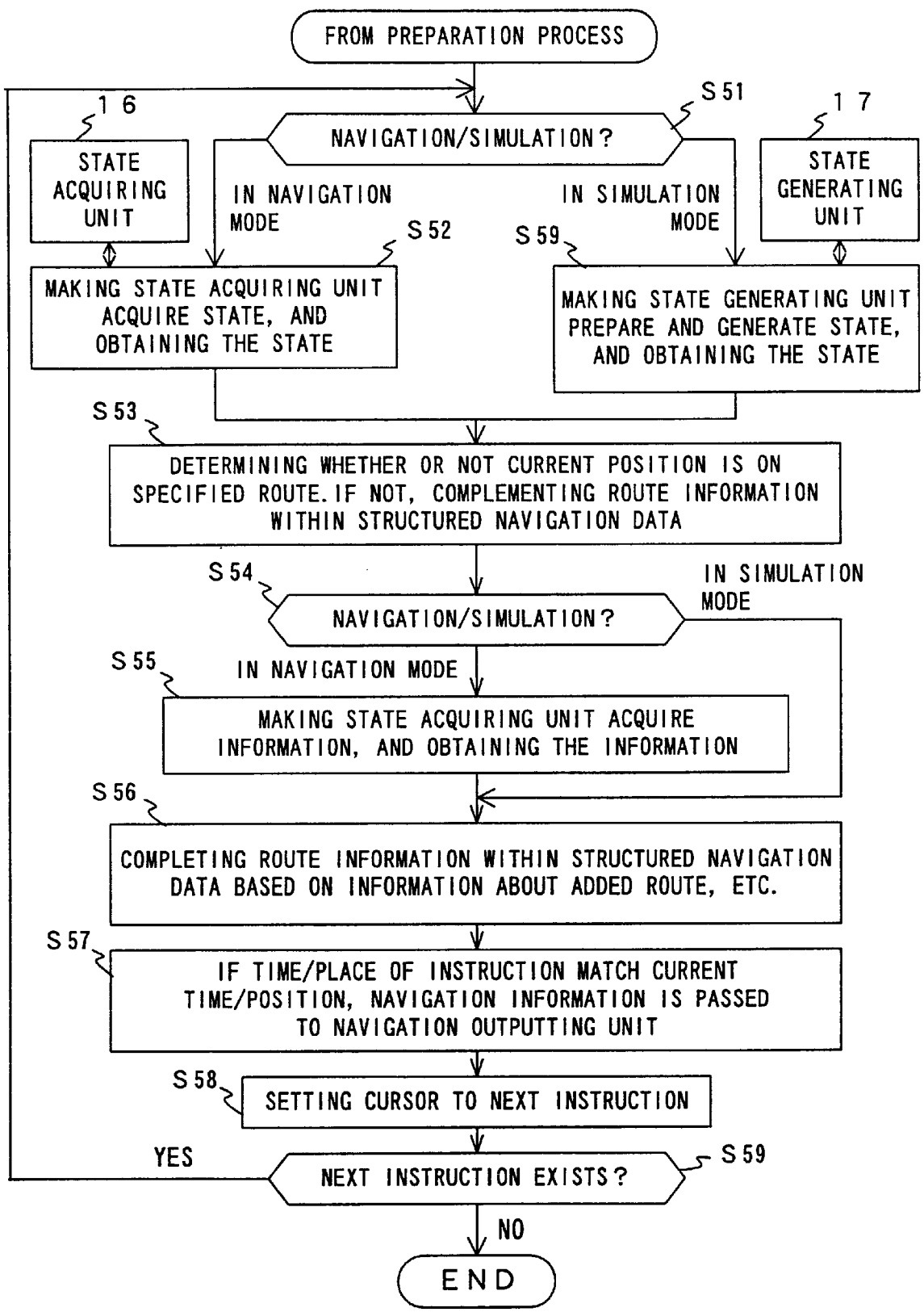
FIG. 8 is a flowchart showing the execution process performed by the instruction processing unit.

Provided below is the explanation about the details of preferred embodiments according to the present invention, by referring to the drawings.

First of all, examples in which the present invention is applied are provided for ease of understanding of the present invention.

Assume that a user will visit a friend's home on the next Sunday, and he or she has received text information which is referred to as a navigation script in the present invention and created by the friend, and image data, etc. accompanying the navigation script depending on need. On the next Sunday, the user makes his or her portable PC or electronic pocketbook read the received navigation script, carries the PC or the pocketbook, and makes it perform navigation using the navigation script at the station nearest to the friend's home, etc. In this way, the route from the nearest station to the friend's home is displayed on the screen of the portable PC or the electronic pocketbook. At this time, the current position continuously changes and is displayed on the route as the user moves. At a point where the user seems to get lost on the route, voice or image warning is issued by an instruction which is described in the navigation script beforehand. This navigation script can be used also for a car navigation system having the capabilities of the present invention. Therefore, the navigation according to the navigation script created by the friend can be received, also when the user visits the friend's home by car.

Also, the following usage can be made. Here, assume that a user walks around Shibuya Station for a couple of hours. In this case, a navigation script for navigating Shibuya Station for a couple of hours is downloaded from the center providing navigation information via a network. Instructions described in the navigation script are executed by a portable information device, so that a navigation service according to a time and a place can be received. Also restaurant information is automatically displayed around lunch time. The navigation service can be also received by a cellular phone, etc. In this case, the instructions included in the navigation script are executed on a center side, and a center device transmits the navigation information to the cellular phone as voice or text.

Additionally, navigation scripts of recommended sightseeing courses are created and registered to an electronic medium such as a CD-ROM (Compact Disk-Read Only Memory) being attached to a travel magazine as a supplement, a bar-code, etc. A subscriber retrieves his or her desired sightseeing course from the electronic medium with a PC, etc., and executes the instructions included in the retrieved navigation script in a simulation mode. In this case, the navigation information are dynamically displayed as if the subscriber actually walked along the sightseeing course. Furthermore, by executing the navigation script in a navigation mode on the actual course, the information for guidance according to the point where the subscriber actually stays can be viewed.

To realize the above described capabilities, a navigation information presenting apparatus according to the present invention comprises: an inputting unit for inputting a navigation script describing an instruction sequence which can describe at least time and/or point information, and information for guidance to be output according to a time and/or point to be presented, based on a predetermined specification; a unit for acquiring the state of a current time and point, or for generating the state of a virtual current time and point; a unit for processing instructions described in the input navigation script according to the current time and point obtained by the state acquisition or generation process; and a unit for outputting the navigation information to be output while the instructions are processed, and for presenting the navigation information to a user or users.

The navigation script is described, for example, in a markup language which identifies with tags the time information, the point information, the information for guidance, and the other constituent elements of instructions.

Additionally, the navigation script can describe a directive for directing a plurality of instructions to be processed sequentially or in parallel. The unit for processing instructions processes the plurality of instructions sequentially or in parallel according to the above described directive for sequential/parallel instruction processing.

Furthermore, the unit for inputting a navigation script inputs a navigation script specified by a user or users by communicating with an external device which provides the navigation script via a network, and/or by reading the navigation script from a computer-readable electronic medium, and/or from an input device operated by a user or users.

The navigation information presenting apparatus according to the present invention further comprises a unit for parsing an input navigation script and for converting the script into hierarchical and grouped navigation data. The unit for processing instructions processes the instructions represented as structured navigation data.

The unit for outputting navigation information presents to a user or users a part or the whole of a navigation script, such as a current point, a departure point, en-route spots, a destination, and a route one after another or according to each instruction. Additionally, the navigation information is presented to the user or users as texts, maps, voice, images, videos, lights, smell, force, movements, etc. for a specified time, point, distance, input operation, and/or an external event.

As an operating mode of navigation, either a navigation mode or a simulation mode can be selected. Instructions are processed according to the state of an actual current time and/or point in the navigation mode, while the instructions are processed according to the state of a virtual current time and/or point in the simulation mode. As a result, navigation information is presented to a user or users.

A program for realizing the above described units by means of a computer can be stored in a computer-readable portable medium memory or a suitable storage medium such as a semiconductor memory, a hard disk, etc. Also a navigation script can be stored in a computer-readable portable medium memory such as a magnetic disk, an optical disk, an IC card, etc., or a suitable storage medium such as a semiconductor memory, a hard disk, etc. Or, the navigation script may be converted into a bar code, which can be registered to a printed matter.

The navigation script can be created and edited by a normal text editor or a GUI (Graphical User Interface) editor. Or, the script can be semi-automatically generated based on a history of time and point information, which is obtained while moving on a route to be actually navigated.

The above described navigation script has a feature that an instruction sequence relating to time, point, navigation information is described in a markup language based on a predetermined specification, and is easy to be read and written by human beings. Additionally, the navigation script can be created, provided, and used in a format shared by various devices, and is easy to be distributed via a network or an electronic medium, etc. Also its duplication can be made with ease. The navigation script can describe various navigation information related to time and point. The navigation information related to a point and a route, such as "This facility is famous for ○○), can be described. Also the navigation information about time, such as "Informed ten minutes prior to arrival" can be described.

FIG. 1 is a block diagram exemplifying the configuration of a navigation information presenting apparatus according to the present invention. According to the present invention, an instruction sequence composed of data (such as text data, image data, voice data, etc.) of time, point, and information for guidance, which are stored in various formats, is described in a markup language description format.

An instruction is a unit of a script composed of navigation information including times (such as a departure time, en-route times, an arrival time, a start time, an end time, etc.), and points (such as a departure point, en-route spots, a destination, an intersection, a transfer point, a facility location, etc.), and one shot or a portion of various media data (a map, text, voice, music, an image, a video, etc.). The instruction is, for example, a directive for outputting voice data (aaa.wav) and image data (xxx.jpg), which explain a point A, at the point A on a certain route.

Such an instruction sequence, which is described in a markup language such as an XML (extensible Markup Language) ("Extensible Markup Language (XML) 1.0," World Wide Web Consortium (W3C) Recommendation, REC-xml-19980210, Feb. 10, 1998. http://www.w3.org/TR/1998/REC-xml-19980210) format, is referred to as a naviscript, according to the present invention. The navigation script is abbreviated to a naviscript in the remaining portion of this specification. The naviscript is stored and managed by a center 40. Or, the naviscript is stored in various media such as a magnetic disk, a CD-ROM, etc., and is read from a user terminal 10.

An operation inputting unit 11 of the user terminal 10 selects a naviscript script from among the naviscripts stored in the center 40 and/or various media 32 via a network accessing unit 12 and/or a medium accessing unit 13 in response to a retrieval request issued by a user, and passes the selected naviscript and/or a naviscript directly input by a user to a script converting unit 14. The script converting unit 14 parses the naviscript, and converts it into structured navigation data. When the user uses the naviscript during an actual move (navigation mode), an instruction processing unit 15 obtains the current state (current time, point, etc.) of the user from the state acquiring unit 16, and complements the route information of the structured navigation data. Navigation information is then output from a navigation outputting unit 18 based on the structured navigation data according to the obtained state.

When the user uses a naviscript in a virtual state (simulation mode), the instruction processing unit 15 obtains a virtual current time and point from a state generating unit 17, and complements the route information of the structured navigation data. Navigation information is then output from the navigation outputting unit 18.

Assume that there is a naviscript for navigating, for example, a ○○ Tour on a route from Tokyo Station to the Rainbow Bridge via Kyobashi IC (InterChange), and the naviscript describes the following instructions.
(1) An instruction for outputting voice data "Tokyo Station" at Tokyo Station.
(2) An instruction for outputting voice data "Welcome to ○○ Tour" 2 minutes after the first data, and displaying image data summarizing the tour.
(3) An instruction for outputting voice data "Kyobashi IC" at Kyobashi IC.
(4) An instruction for outputting voice data "Rainbow Bridge Soon Ahead" 3 km before the Rainbow Bridge.
(5) An instruction for outputting voice data "Rainbow Bridge" at the Rainbow Bridge.

In this case, the operation inputting unit 11 reads this naviscript from the center 40 via a network 31, etc. and starts to execute the naviscript, according to a user instruction. The script converting unit 14 then generates structured navigation data by converting the naviscript. The instruction processing unit 15 first extracts the descriptions of points and the route, which are included in the instructions, based on the structured navigation data, and displays the summary of the route by referring a database 20 storing map information, etc. Then, the instruction processing unit 15 obtains the current position or time from the state acquiring unit 16 of a GPS, etc., and processes the instructions based on the obtained point or time. As a result, the navigation outputting unit 18 outputs the voice data "Tokyo Station" when the user reaches Tokyo Station, outputs the voice message "Welcome to ○○ Tour" 2 minutes later, and displays the image data of the summary of the tour. Furthermore, the navigation outputting unit 18 outputs the voice data "Kyobashi IC" at Kyobashi IC, the voice data "Rainbow Bridge Soon Ahead" 3 km before the Rainbow Bridge, and the voice data "Rainbow Bridge" upon arrival at the Rainbow Bridge. Accordingly, the user can obtain the helpful navigation information at the suitable spots at the suitable timing while moving on the route of the ○○ Tour.

For such a naviscript, an instruction sequence relating to time, places, and information for guidance is described in a markup language description format. A generated naviscript is easy to be read and written similar to an existing mark up language, thereby facilitating retrieval and processing. Accordingly, the meaning of the data of a naviscript, and whether or not its instruction sequence is described in an order to be executed are made clear to a naviscript generator.

Additionally, it becomes possible to rearrange instruction sequentially or in parallel, to optimize instructions, and to structure data (into hierarchies or groups), etc., so that various navigation information about time and points can be presented. As a result, navigation information can be easily created, modified, etc.

Furthermore, since the naviscript obtained from the center 40, etc. is converted into structured navigation data corresponding to a local terminal itself, one naviscript can be shared by various devices and systems.

Also, it becomes clear to a user that navigation information is presented according to an instruction sequence (a time sequence and/or a point sequence), thereby obtaining navigation information, which is more suitable for a state, at suitable timing. In the navigation mode, navigation information can be obtained on an actual route. Besides, in the simulation mode, the navigation of a certain route can be virtually experienced.

The naviscript can be easily created and edited by using an existing text editor, and a created naviscript can be registered to a center, etc., so that everybody can obtain navigation information everywhere by using the naviscript via a network, etc.

Naviscript Editing

FIG. 2 explains the process performed by a script editing unit 41. Since the naviscript is described in a markup language, it can be edited by using a normal text editor. As shown on a naviscript editing screen 42 illustrated in FIG. 2, a naviscript can be also generated/edited with GUI by editing and inputting a route, etc. on a map with the use of the map information obtained from a map information database 44, and by converting the information on the naviscript editing screen 42 into a naviscript described in a markup language with the use of a translator 43 which converts graphic information such as a map, etc. into text information. The translator 43 has not only a capability for converting a map image into a naviscript, but also a capability for converting a naviscript stored in a buffer/file 45 into information to be displayed on a map. Such a naviscript editing tool can be easily implemented likewise a home page creation tool of the Internet. The editing tool can be utilized not only by the center 40, but also by a personal computer that a general user possesses.

Naviscript Summary

The naviscript language adopted in this preferred embodiment is a markup language for describing a naviscript, which is newly defined as a subset of an XML (extensible Markup Language)("Extensible Markup Language (XML) 1.0, " World Wide Consortium (W3C) Recommendation, REC-xml-19980210, Feb. 10, 1998. http://www.w3.org/TR/1998/REC-xml-19980210) laid down by W3C (World Wide Web Consortium).

In a naviscript, characters enclosed by angle brackets "<" and ">", such as <inst id=inst-01>, </inst>, <title>, </title> is called a tag. A tag which does not start "</" is called a start tag, while a tag starts with "</" is called an end tag. The start and the end tags are used as a pair, such as <inst id=inst-01> and </inst>, or <title> and </title>. Such a pair is hereinafter referred to as a tag set. Additionally, for example, "id" included in <inst id=inst-01> is defined to be an attribute of a tag, and "inst-01" is defined to be the value of the attribute.

A naviscript is described by a hierarchical structure of tag sets each forming a pair. When a tag set does not exist in a portion enclosed by another tag set, its portion is defined to be the contents of the tag. The naviscript is composed of tags, an attribute, and contents in a naviscript language.

Here, suppose that the following naviscript exists.

```
<inst>
    <time> ○ </time>
    <info> □ </info>
</inst>
```

In this naviscript, "○" enclosed by <time> and </time> between <inst> and </inst>, "□" enclosed by <info> and </info> indicate that navigation information about □ is output at a time ○. Here, "inst" indicates an instruction. Also suppose that the following naviscript exists.

```
<inst>
    <point> ○ </point>
    <info> □ </info>
</inst>
``` where "○" enclosed by <point> and </point>between <inst> and </inst>, and "□" enclosed by <info> and </info> indicate that navigation information about □ is output at a place ○.

Instructions enclosed by <seq> and </seq> perform navigation sequentially, while instructions enclosed by <par> and </par> perform navigation in parallel. Similarly, instructions enclosed by <time-optimal> and </time-optimal> perform navigation in an optimal order of required time. Instructions enclosed by <distance-optimal> and </distance-optimal> perform navigation in an optimal order of a required distance. Instruction enclosed by <cost-optimal> and </cost-optimal> perform navigation in an optimal order of a required cost.

A specific example of a naviscript description is provided below.

<time>12:00</time>

This is an absolute time display "at 12:00".

Additionally,

<time>+5 sec </time> is a relative time display "5 seconds after a preceding instruction".

<time>−10 min </time>

This is a relative time display "10 minutes before a succeeding instruction".

Furthermore,

<longitude>○○</longitude>
<latitude>○○</latitude> are a direct and absolute point display with a coordinate of longitude and latitude.

<name>○○</name>
<address>○○</address>
<phone>○○</phone> are an indirect and absolute point display with a name, an address, and a telephone number.

<location>+1.0 km </location> is a relative point display "1 km beyond a preceding point".

<location>−1.0 km </location> is a relative point display "1 km before a succeeding point".

<name >○○ National Park </name>
<address>○○ ward ○○ town</address>
<zip>123-4566</zip> are an indirect point range display with a name, an address, and a zip code.

<route>
  <name>Route 1</name>
</route> is route specification with a name. Meanwhile,

<route src=route-data.dat>
</route> is route information specification with a data file and

<route func=route-func.fnc>
</route> is route information specification with a function.

Furthermore, a condition of whether or not to execute each instruction can be described depending on whether or not the information about a navigation user, a move method, an environment, etc. are equal to certain values, or belong to a certain range (set).

For example, the information about a navigation user, which are used for the condition of whether or not to execute an instruction, include the following items: sex, age, date of birth, blood type, single/married/divorced/bereaved, the number of children, family members, address, legal domicile, place of employment, occupation (business category, occupation type, title), height, weight, figure, physical ability, disease, handicap (sense of sight, sense of color, sense of hearing, taste, language, body), character, hobby, liking (liquor, tobacco, having a sweet tooth/drinking, Japanese-style food/Western food, fish/meat, etc.), driving years, accident history, violation history, temperature, blood pressure, pulsation, heart beat rate, brain waves, eyeball movement, driving time, driver, fellow passenger, etc.

The information about a move method include: a type (walking, bicycle, two-wheeled vehicle, car, bus, train, ship, airplane, etc.), position, speed, acceleration, direction, angular velocity, angular acceleration, altitude, residual quantity of gas, light ON/OFF, windshield wiper ON/OFF, room lamp ON/OFF, air conditioner ON/OFF, radio/TV ON/OFF, car navigation system ON/OFF, air flow, sound volume, checking/mobile inspection time, car type, displacement, automobile maker, right/left handle, etc.

The information about an environment include weather (fine/cloudy/rain/snow, rainy season/typhoon), temperature, humidity, atmospheric pressure, probability of rainfall, UV index, photochemical smog index, noise index, traffic jam state, regulation information, accident information, etc.

Additionally, text data, voice data, sound data, image data, video data, etc. can be specified as navigation information as follows.

<text>○○</text>
  <voice>○○</voice>
  <sound>○○</sound>
  <image>○○</image>
  <video>○○</video>

Furthermore, a URL (Uniform Resource Locator) can be described as follows.

<inst id="inst-point-breakwater">
    <point ref="HTTP://www.naviscript.com/japan/tokyo/odaiba.na#point-breakwater">

Specific Example of a Naviscript

A specific example of a naviscript described in a naviscript language is provided next. Since details of the specifications of tags used in the naviscript language will be described in the rear of this specification, please refer them on demand.

<title>Rainbow Town Tour</title>
<version>example-04_05</version>
<copyright>All Right Reserved,
Copyright (C) FujiLab Ltd. 1988.

```
<navi>
    <title>         Rainbow Town    </title>
    <author>        Fuji Kanko      </author>
    <date>          98/09/10        </date>
    <duration>      3hour40min      </duration>
    <distance>      95.0km          </distance>
    <cost>          1940yen         </cost>
    <par>
        <seq>
            <inst ref = "inst-info-opening">              </inst>
            <inst ref = "inst-point-Kaihinmakuhari
Sta.">
                                                          </inst>
            <inst ref = "inst-point-Tokyo Sta.">
                                                          </inst>
            <inst ref = "inst-point-Tokyo Sta. Yaesu
central Exit">
                                                          </inst>
            <inst ref = "inst-point-Kyobashi IC">
                                                          </inst>
            <inst ref = "inst-info-Rainbow Bridge-
navigation1">
                                                          </inst>
            <inst ref = "inst-info-Rainbow Bridge-
navigation2">
                                                          </inst>
            <inst ref = "inst-point-Edobashi JC">
                                                          </inst>
            <inst ref = "inst-point-Daiba IC">            </inst>
            <inst ref = "inst-object-restaurant">
                                                          </inst>
            <inst ref = "inst-object-cafe">
                                                          </inst>
```

```
            <inst ref = "inst-point-breakwater">
                                                    </inst>
            <inst ref = "inst-object-FujiSun TV">
                                                    </inst>
            <inst ref = "inst-point-Tokyo Sta. Yaesu
Central Exit">                                      </inst>
            <inst ref = "inst-info-closing">        </inst>
        </seq>
        <seq>
            <inst ref = "inst-info-noon">           </inst>
        </seq>
    </par>
</navi>
<inst id = "inst-info-opening">
    <time> +5sec </time>
    <info>
        <voice> Welcome to Rainbow Town Tour!
                                                    </voice>
    </info>
</inst>
<inst id = "inst-point-Kaihinmakuhari Sta.">
    <point>
        <category>  station          </category>
        <name>      Kaihinmakuhari   </name>
    </point>
    <route>
        <means>     train            </means>
        <category>  JR               </category>
        <category>  Keiyo Line       </category>
        <duration>  41min            <duration>
        <distance>  31.7km           </distance>
        <cost>      540yen           </cost>
    </route>
</inst>
<inst id = "inst-point-Tokyo Sta.">
    <point>
        <category>  station          </category>
        <name>      Tokyo            </name>
    </point>
</inst>
<inst id = "inst-point-Tokyo Sta. Yaesu Central Exit">
    <point>
        <name>      Tokyo Sta. Yaesu Central Exit  </name>
        <longitude> 133.33.36        </longitude>
        <latitude>  36.2.5           </latitude>
    </point>
    <route>
        <means>     car              </means>
        <category>  Metropolitan Highway  </category>
        <cost>      700yen           </cost>
    </route>
</inst>
<inst id = "inst-point-Kyobashi IC">
    <point>
        <name>      Kyobashi IC      </name>
        <longitude> 133.33.36        </longitude>
        <latitude>  36.2.5           </latitude>
    </point>
    <route>
        thesame
    </route>
</inst>
<inst id = "inst-info-Rainbow Bridge-navigation1">
    <time>   −10min   </time>
    <info>
        <text> Rainbow Bridge in 10 minutes </text>
    </info>
</inst>
<inst id = "inst-info-Rainbow Bridge-navigation2">
    <location> −1.0 km </location>
    <info ref = "object-Rainbow Bridge#info">
    </info>
</inst>
<inst id = "inst-point-Edobashi JC">
    <point>
        <name> Edobashi JC </name>
    </point>
    <route>
        <name>      Rainbow Bridge   </name>
        <means>     car              </means>
        <category>  Metropolitan Highway  </category>
    </route>
</inst>
<inst id = "inst-point-Daiba IC">
    <point ref = "point-Daiba IC"> </point>
    <route>  thesame   </route>
</inst>
<inst id = "inst-object-restaurant"
    if = "(ref(inst-point-DaibaIC#time) &ge 11:30)&&
        (ref(inst-point-DaibaIC#time) &le 13:30)">
    <point ref = "object-restaurant"> </point>
    <info>
        <text ref = "object-restaurant#text">
    </text>
        <image ref = "object-restaurant#image">
                                                    </image>
    </info>
</inst>
<inst id = "inst-object-cafe"
    if = "(ref(inst-point-DaibaIC#time) < 11:30) ||
        (ref(inst-point-DaibaIC#time) > 13:30)">
    <object ref = object-cafe> </object>
</inst>
<inst id = "inst-point-breakwater">
    <point ref = "http://www.naviscript.com/japan
        /tokyo/odaiba.nav#point-breakwater">
    </point>
</inst>
<inst id = "inst-object-FujiSun TV">
    <object>
        <name>    FujiSun TV         <name>
        <address> 9-9-9, Daiba, Minato Ward, Tokyo
                                                    </address>
    </object>
</inst>
<inst id = "inst-point-Tokyo Sta. Yaesu Central Exit">
    <point>
        <name>       Tokyo Sta. Yaesu Central Exit </name>
        <longitude>  133.33.36       </longitude>
        <latitude>   36.2.5          </latitude>
    </point>
</inst>
<inst id = "inst-info-closing">
    <time> +0sec </time>
    <info>
        <par>
            <voice times = 1> Hope you enjoyed this
tour!                                               </voice>
            <sound src = "sound-bye.wav duration =
2min30sec">                                         </sound>
        </par>
    </info>
</inst>
<inst id = "inst-info-noon">
    <time> 12:00 </time>
    <info>
        <voice> Now at noon </voice>
    </info>
</inst>
<point id = "point-Daiba IC">
    <name>      Daiba IC    </name>
    <longitude> 133.37.46   </longitude>
    <latitude>  36.3.5      </latitude>
</point>
<object id = "object-Rainbow Bridge">
    <name>     Rainbow Bridge   </name>
    <category> bridge           </category>
    <info>
        <text> Rainbow Bridge is 125m above sea
level and 826m in length . . .       </text>
    </info>
</object>
<object id = "object-restaurant">
    <name>     Restaurant Fuji  </name>
    <category> restaurant       </category>
    <category> Italian          </category>
    <phone>    987-654-3210     </phone>
```

-continued

```
    <text>      Specialty is . . . made by Italian chef
                                              </text>
        <image src = "image-restaurant.jpg">     </image>
</object>
<object id = "object-cafe">
        <name>      Cafe Fuji      </name>
        <category>  cafe           </category>
        <phone>     999-999-9999   </phone>
</object>
</naviscript>
```

In the first half of the above provided naviscript from <navi> to </navi>, the information of the title, the version, etc. of the naviscript are defined, and the instructions defined by this naviscript are defined.

Next, the contents of the respective instructions are defined after </navi>. For example, the initial instruction "inst-info-opening" instructs a navigation message "Welcome to Rainbow Town Tour" to be vocally output after 5 seconds elapse from a departure time.

Example of Conversion from a Naviscript into Structured Navigation Data

A naviscript like the above described one is converted into structured navigation data by the script converting unit 14. An example of structured navigation data into which the above described naviscript is converted is provided below.

```
[example-04-05.dat]
    naviscript.title
        = "Rainbow Town Tour";
naviscript.version
        = "example-04_05";
    naviscript.copyright
        = "All Rights Reserved, Copyright (C)
FujiLab Ltd. 1998.";
    naviscript.navi.title
        = "Rainbow Town";
    naviscript.navi.author
        = "Fuji Kanko";
    naviscript.navi.date
        = "98/09/10";
    naviscript.navi.duration
        = "3hour40min";
    naviscript.navi.distance
        = "95.0km";
    naviscript.navi.cost
        = "1940yen";
    naviscript.navi.instlist
        = "par(seq(1,2,3,4,5,6,7,8,9,10,11,12,
13,14,15),seq(16))";
    naviscript.navi.inst[1].id
        = "inst-info-opening";
    naviscript.navi.inst[1].time
        = "+5sec";
    naviscript.navi.inst[1].info.voice
        = "Welcome to Rainbow Town Tour!";
    naviscript.navi.inst[2].id
        = "inst-point-Kaihinmakuhari Sta.";
    naviscript.navi.inst[2].point.category
        = "station";
    naviscript.navi.inst[2].point.name
        = "Kaihinmakuhari";
    naviscript.navi.inst[2].route.means
        = "train";
    naviscript.navi.inst[2].route.category
        = "JR";
    naviscript.navi.inst[2].route.category
        = "Keiyo Line";
    naviscript.navi.inst[2].route.duration
        = "41min";
    naviscript.navi.inst[2].route.distance
        = "31.7km";
    naviscript.navi.inst[2].route.cost
        = "540yen";
    naviscript.navi.inst[3].id
        = "inst-point-Tokyo Sta.";
    naviscript.navi.inst[3].point.category
        = "station";
    naviscript.navi.inst[3].point.name
        = "Tokyo";
    naviscript.navi.inst[4].id
        = "inst-point-Tokyo Sta. Yaesu Central Exit";
    naviscript.navi.inst[4].point.name
        = "Tokyo Sta. Yaesu Central Exit";
    naviscript.navi.inst[4].point.name
        = "Tokyo Sta. Yaesu Central Exit";
    naviscript.navi.inst[4].point.longitude
        = "133.33.36";
    naviscript.navi.inst[4].point.latitude
        = "36.2.5";
    naviscript.navi.inst[4].route.means
        = "car";
    naviscript.navi.inst[4].route.category
        = "Metropolitan Highway";
    naviscript.navi.inst[4].route.cost
        = "700yen";
    naviscript.navi.inst[5].id
        = "inst-point-Kyobashi IC";
    naviscript.navi.inst[5]point.name
        = "Kyobashi IC";
    naviscript.navi.inst[5].point.longitude
        = "133.33.36";
    naviscript.navi.inst[5].point.latitude
        = "36.2.5";
    naviscript.navi.inst[5].route.thesame
        = "yes";
    naviscript.navi.inst[6].id
        = "inst-info-Rainbow Bridge-navigation1";
naviscript.navi.inst[6].time
        = "-10min";
    naviscript.navi.inst[6].info.text
        = "Rainbow Bridge in 10 minutes";
    naviscript.navi.inst[7].id
        = "inst-info-Rainbow Bridge-navigation2";
    naviscript.navi.inst[7].location
        = "-1.0km"
    naviscript.navi.inst[7].info.text
        = "Rainbow Bridge is 125 m above sea level
and 826 m in length, . . .";
    naviscript.navi.inst[8].id
        = "inst-point-Edobashi JC";
    naviscript.navi.inst[8].point.name
        = "Edobashi JC";
    naviscript.navi.inst[8].route.name
        = "Rainbow Bridge";
    naviscript.navi.inst[8].route.means
        = "car"
    naviscript.navi.inst[8].route.category
        = "Metropolitan Highway";
    naviscript.navi.inst[9].id
        = "inst-point-Daiba IC";
    naviscript.navi.inst[9].name
        = "Daiba IC";
    naviscript.navi.inst[9].longitude
        = "133.37.46";
    naviscript.navi.inst[9].latitude
        = "36.3.5";
    naviscript.navi.inst[9].route.thesame
        = "yes";
    naviscript.navi.inst[10].id
        = "inst-object-restaurant";
    naviscript.navi.inst[10].if
        = "(ref(inst-point-Daiba IC#time) &ge
11:30) && (ref(inst-point-Daiba IC#time) &le 13:30)";
    naviscript.navi.inst[10].point.id
        = "object-restaurant";
    naviscript.navi.inst[10].point.name
        = "Restaurant Fuji";
    naviscript.navi.inst[10].point.category
        = "restaurant";
```

-continued

```
naviscript.navi.inst[10].point.category
    = "Italian";
naviscript.navi.inst[10].point.phone
    = "987-654-3210";
naviscript.navi.inst[10].point.info.text
    = "Specialty is . . . made by Italian chef";
naviscript.navi.inst[10].point.info.image.src
    = "image-restaurant.jpg";
naviscript.navi.inst[11].id
    = "inst-object-cafe";
naviscript.navi.inst[11].if
    = "(ref(inst-point-Daiba IC#time) <
11:30) || (ref(inst-point-Daiba IC#time) > 13:30)";
naviscript.navi.inst[11].object.id
    = "object-cafe";
naviscript.navi.inst[11].object.name
    = "Cafe Fuji";
naviscript.navi.inst[11].object.category
    = "cafe";
naviscript.navi.inst[11].object.phone
    = "999-999-9999";
naviscript.navi.inst[12].id
    = "inst-point-breakwater";
naviscript.navi.inst[12].point.ref
    = "http://www.naviscript.com/japan/tokyo
/odaiba.nav#point-breakwater";
naviscript.navi.inst[13].id
    = "inst-object-FujiSun TV";
naviscript.navi.inst[13].object.name
    = "FujiSun TV";
naviscript.navi.inst[13].object.address
    = "9-9-9, Daiba, Minato Ward, Tokyo";
naviscript.navi.inst[14].id
    = "inst-point-Tokyo Sta. Yaesu Central Exit";
naviscript.navi.inst[14].point.name
    = "Tokyo Sta. Yaesu Central Exit";
naviscript navi.inst[14].point.longitude
    = "133.33.36";
naviscript.navi.inst[14].point.latitude
    = "36.2.5";
naviscript.navi.inst[15].id
    = "inst-info-closing";
naviscript.navi.inst[15].time
    = "+0sec";
naviscript.navi.inst[15].infolist
    = "par(1,2)";
naviscript.navi.inst[15].info[1].voice.times
    = "1";
naviscript.navi.inst[15].info[1].voice
    = "Hope you enjoyed this tour!";
naviscript.navi.inst[15].info[1].sound.src
    = "sound-bye.wav";
naviscript.navi.inst[15].info[1].sound.duration
    = "2min30sec";
naviscript.navi.inst[16].id
    = "inst-info-noon";
naviscript.navi.inst[16].time
    = "12:00";
naviscript.navi.inst[16].info.voice
    = "Now at noon";
```

FIGS. 3 and 4 show a portion of the above described structured navigation data in the form of a table. As is easily understood from these figures, the voice navigation "Welcome to Rainbow Town Tour" is first performed. Then, the route navigation from Tokyo Sta. Yaesu Central exit to Daiba IC via Kyobashi IC and Edobashi JC is performed after the train navigation from Kaihinmakuhari Sta. to Tokyo Sta. The text "Rainbow Bridge in 10 minutes" is displayed 10 minutes before a scheduled time at which Edobashi JC is passed through. Additionally, if the arrival time at Daiba IC is between 11:30 and 13:30, the information about restaurants is presented. If the arrival time at Daiba IC is before 11:30 or after 13:30, the information about cafes is presented. Provided next are the explanations about the processes performed by the respective units shown in FIG. 1.

Process Performed by the Operation Inputting Unit 11

The operation inputting unit 11 obtains a naviscript stored in the center 40 or the medium 32, or a naviscript input by a user. The flow of the process performed by the operation inputting unit 11 is shown in FIG. 5. The operation inputting unit 11 accesses the center 40 via the network 31 with the use of the network accessing unit 12, and/or accesses the medium 32 storing naviscripts with the use of the medium accessing unit 13. A desired naviscript is retrieved and selected according to a user instruction, or a naviscript is directly input by a user, so that the operation inputting unit 11 receives the naviscript (step S11). The operation inputting unit 11 passes the received naviscript to the script converting unit 14 (step S12). Although the naviscript itself is received from the medium 32 at this time, an external image file, etc. specified with URL within the naviscript may be sometimes received via the network 31.

Process Performed by the Script Converting Unit 14

The script converting unit 14 converts a naviscript described in a markup language into structured navigation data. The flow of the process performed by the script converting unit 14 is shown in FIG. 6. As shown in this figure, the script converting unit 14 receives a naviscript from the operation inputting unit 11 (step S21), converts the received naviscript into structured navigation data (step S22), and passes the data to the instruction processing unit 15 (step S23).

The script converting unit 14 can convert a naviscript into not only structured data referenced by the instruction processing unit 15, but also various types of structured data used by a local system or other devices, etc. Accordingly, it is possible, for example, to make a scheduler display a time instruction after being passed to the scheduler unchanged or after being converted, or to display on a map the information obtained by converting a place instruction into a map description script.

Process Performed by the Instruction Processing Unit 15

The instruction processing unit 15 processes the instructions included in structured navigation data according to the current state of a user or a virtually set state for simulation after complementing the information in an unspecified portion of the route information of the structured navigation data received from the script converting unit 14. The instruction processing unit 15 performs the process shown in FIG. 7 as a preparation process of the instruction processing, and further performs the process shown in FIG. 8 as an execution process.

In the preparation process of the instruction processing, upon receipt of structured navigation data from the script converting unit 14 (step S31), the instruction processing unit 15 determines whether the execution mode set by a user is either a navigation mode or a simulation mode (step S32). If the instruction processing unit 15 determines that the execution mode is the navigation mode, it makes the state acquiring unit 16 acquire a state (an actual current time/point), and obtains the state (step S33). Then, the instruction processing unit 15 adds the actual current point to the beginning of the structured navigation data (step S34). The flow then goes to step S35.

If the instruction processing unit 15 determines that the execution mode is the simulation mode, it issues a request to prepare a state to the state generating unit 17 and a further request to generate a state upon completion of the initial request. The instruction processing unit 15 then obtains the state (virtual current time and point) (step S42), and adds the virtual current position to the beginning of the structured navigation data (step S43).

Next, the instruction processing unit 15 attaches a flag indicating "original" to all of the instructions (step S35). This flag is intended to make a distinction between an instruction originally included in a naviscript and an instruction newly added by a complementing process to be described later.

Then, the instruction processing unit 15 complements the information about a place within the structured data (step S36). In this complementing process, an attribute or attributes not described in the naviscript among various attributes such as latitude, longitude, altitude, a name, an address, a phone number, a zip code, etc. are retrieved from the database unit 20 with a described attribute as a key. If only an area is specified, the attribute of a representative spot in the area is retrieved. By way of example, spots representative of Shinjuku Ward, such as Shinjuku Ward Office, Shinjuku Station, etc. or spots representative of Mt. Fuji, such as Top of Mt. Fuji, an entry point of a Mt. Fuji route etc., are retrieved from the database unit 20. If a plurality of retrieval results are obtained, the instruction processing unit 15 inquires of the user which result to select by using a menu, or selects one of them by using an evaluation index. The instruction processing unit 15 describes a retrieved/selected attribute in a corresponding portion of the structured navigation data.

Similarly, the instruction processing unit 15 complements the information about a route within the structured navigation data (a portion where the route is not specified, etc.) (step S37). Here, if a route is not specified in an item of a route, or if a category (such as a normal road, a toll road, a highway, time precedence, distance precedence, straight drive precedence, wider road precedence, etc.) is specified, the instruction processing unit 15 retrieves a route. If a plurality of retrieval results are obtained, the instruction processing unit 15 inquires of the user which result to select by using a menu, or selects one of them by using a suitable evaluation index. Then, the instruction processing unit 15 additionally describes the retrieved/selected route to the corresponding portion of the structured navigation data, and attaches a flag indicating "addition" to the instruction of the route. If the route is entirely specified, the instruction processing unit 15 determines whether this route is either available or unavailable. If the instruction processing unit 15 determines that the route is unavailable, it retrieves another route. If a plurality of retrieval results exist also in this case, the instruction processing unit 15 inquires of the user which result to select by using a menu, or selects one of them by using a suitable evaluation index. The instruction processing unit 15 then modifies the corresponding portion of the structured navigation data by describing the retrieved/selected route therein, and attaches a flag indicating "addition" to the instruction of that route.

Next, the instruction processing unit 15 converts all of relatively specified places into absolutely specified places (step S38), estimates expected arrivals times at the respective places (step S39), and rearranges all of the instructions in time order (step S40). The instruction processing unit 15 then sets an instruction cursor pointing the instruction to be executed next on the initial instruction (step S41). The flow then proceeds to the execution process shown in FIG. 8.

In the execution process, as shown in FIG. 8, the instruction processing unit 15 first determines whether the execution mode is either navigation mode or simulation mode (step S51). If the instruction processing unit 15 determines that the execution mode is the navigation mode, it makes the state acquiring unit 16 acquire a state (an actual current time and point), and obtains the state (step S52). If the instruction processing unit 15 determines that the execution mode is the simulation mode, it requests the state generating unit 17 to generate a state (a virtual current time and point), and obtains the state (step S59).

Then, the instruction processing unit 15 determines whether or not the current position is on the specified route in the instruction indicated by the instruction cursor. If the processing unit 15 determines that the current position is not on the route, it complements the information about the route of the structured navigation data (step S53). When the instruction processing unit 15 complements the information about the route, it retrieves a route from the current position to a near point on the specified route. If a plurality of retrieval results exist, the instruction processing unit 15 inquires of the user which result to select by using a menu, or selects one of them by using a suitable evaluation index. The instruction processing unit 15 then additionally describes the retrieved or selected route to the corresponding portion of the structured navigation data, and attaches a flag indicating "addition" to the instruction of that route.

If the instruction processing unit 15 determines that the execution mode is the navigation mode (step S54), it obtains the information corresponding to the information separately set by the user (step S55). Assuming that the user makes a presetting such that traffic information is used, the instruction processing unit 15 makes the state acquiring unit 16 acquire the traffic information (such as the information about a traffic jam, a traffic regulation, an accident, etc.), and obtains the traffic information (step S55).

The instruction processing unit 15 then complements the information about a route based on the information obtained in step S55, etc. for the route to which the flag indicating "addition" is attached (step S56). In this complementing process, if the flag of the route specified by the instruction indicated by the instruction cursor is "addition", if a traffic jam, regulation, or accident occurs at the nearest indispensable point or on the nearest indispensable route, which is included in the instructions subsequent to that indicated by the instruction cursor, and if an automatic route change setting separately made by the user is ON, the instruction processing unit 15 retrieves a route from the current position to the indispensable point or route. If a plurality of retrieval results exist, the instruction processing unit 15 inquires of the user which result to select by using a menu, or selects one of them by using a suitable evaluation index. The instruction processing unit 15 then modifies the corresponding portion of the structured navigation data by describing the retrieved or selected route therein, and attaches a flag indicating "addition" to the instruction of the route.

If the time and/or point described in the instruction indicated by the instruction cursor matches an actual current time and point (in the navigation mode) or a virtual current time and point (in the simulation mode) (or the time and/or point is within an area including an error caused by sampling, etc.), the instruction processing unit 15 passes the navigation information to the navigation outputting unit 18 (step S57), and updates the point of the instruction cursor to that of the next instruction (step S58). The instruction processing unit 15 repeats the above described process until there is no instruction left (step S59).

Process Performed by the State Acquiring Unit 16

The state acquiring unit 16 acquires a state such as a current time and point, or various information such as traffic information, etc. The state acquisition process and the information acquisition process, which are performed by the state acquiring unit 16, are respectively shown in FIGS. 9 and 10.

Figure 10:
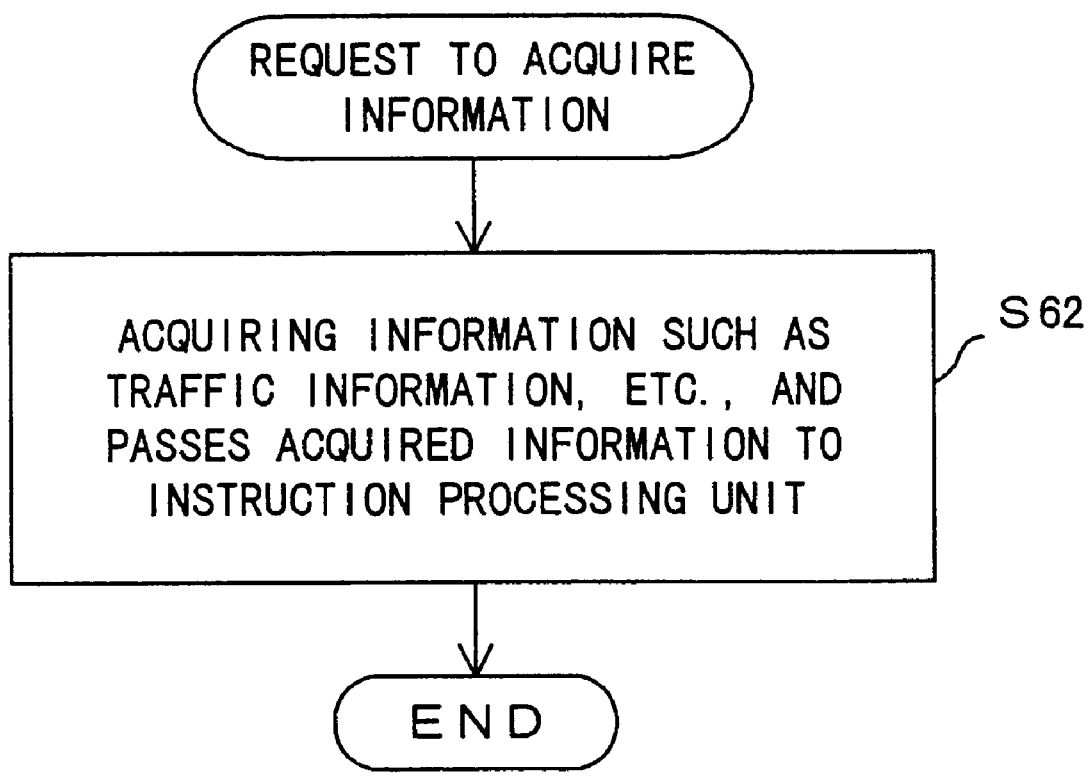
FIG. 10 is a flowchart showing the information acquiring process performed by the state acquiring unit.

As shown in FIG. 9, upon receipt of the request to acquire a state, which is issued from the instruction processing unit 15, the state acquiring unit 16 acquires an actual current time and point, and passes the acquired time and point to the instruction processing unit 15 (step S61). Additionally, as shown in FIG. 10, upon receipt of the request to acquire information from the instruction processing unit 15, the state acquiring unit 16 acquires the information such as traffic information, etc. depending on need by using a suitable communication means, and passes the acquired information to the instruction processing unit 15 (step S62).

Process Performed by the State Generating Unit 17

The state generating unit 17 prepares and generates the values required for the simulation mode, such as a virtual current time and point, etc. The state preparation process and the state generation process, which are performed by the state generating unit 17, are respectively shown in FIGS. 11 and 12.

Figure 11:
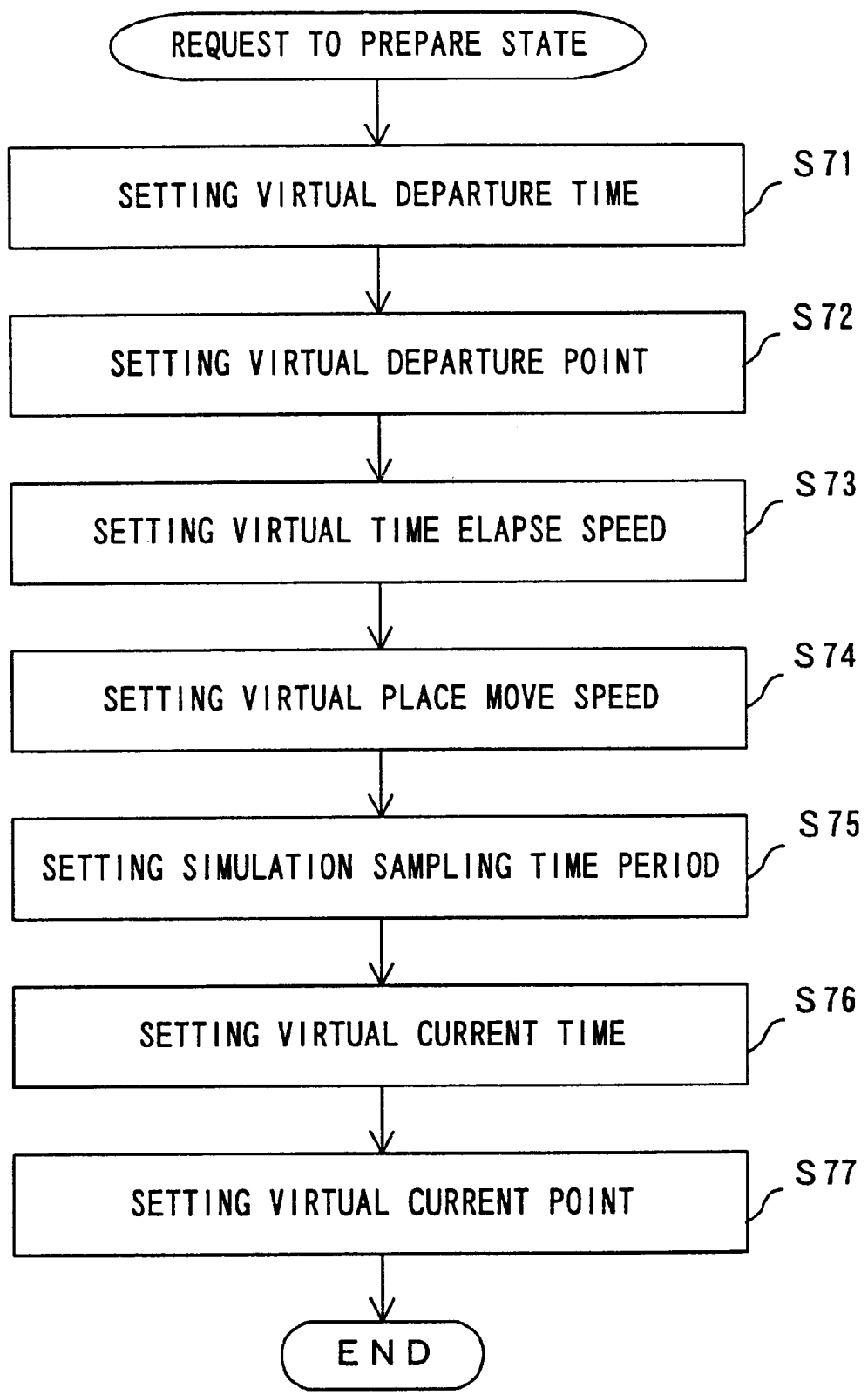
FIG. 11 is a flowchart showing the state preparing process performed by a state generating unit.

In the state preparation process performed by the state generating unit 17, a virtual departure time is set to either of an actual current time and a time that the user separately sets, which is selected by the user or the system (step S71), upon receipt of the request to prepare a state from the instruction processing unit 15, as shown in FIG. 11. Next, the state generating unit 17 performs the process for setting a virtual departure point to a point that the user or the system selects from among an actual current point, a point that the user separately sets (such as a user home), and the initial point that first appears in the structured navigation data (step S72).

Next, the state generating unit 17 sets a virtual time elapse speed to either of a default virtual time elapse speed set by the system and a virtual time elapse speed that the user separately sets, which is selected by the user or the system (step S73). Additionally, a virtual place move speed for each place move means such as walking, a bicycle, a car, etc. is set to either of a default virtual place move speed that the system sets and a virtual place move speed that the user separately sets, which is selected by the user or the system (step S74).

Then, a simulation sampling time period is set to either of a default simulation sampling time period that the system sets and a simulation sampling time period that the user separately sets, which is selected by the user or the system (step S75). Next, the state generating unit 17 sets the virtual departure time to a virtual current time (step S76), and the virtual departure point to a virtual current point (step S77).

Figure 12:
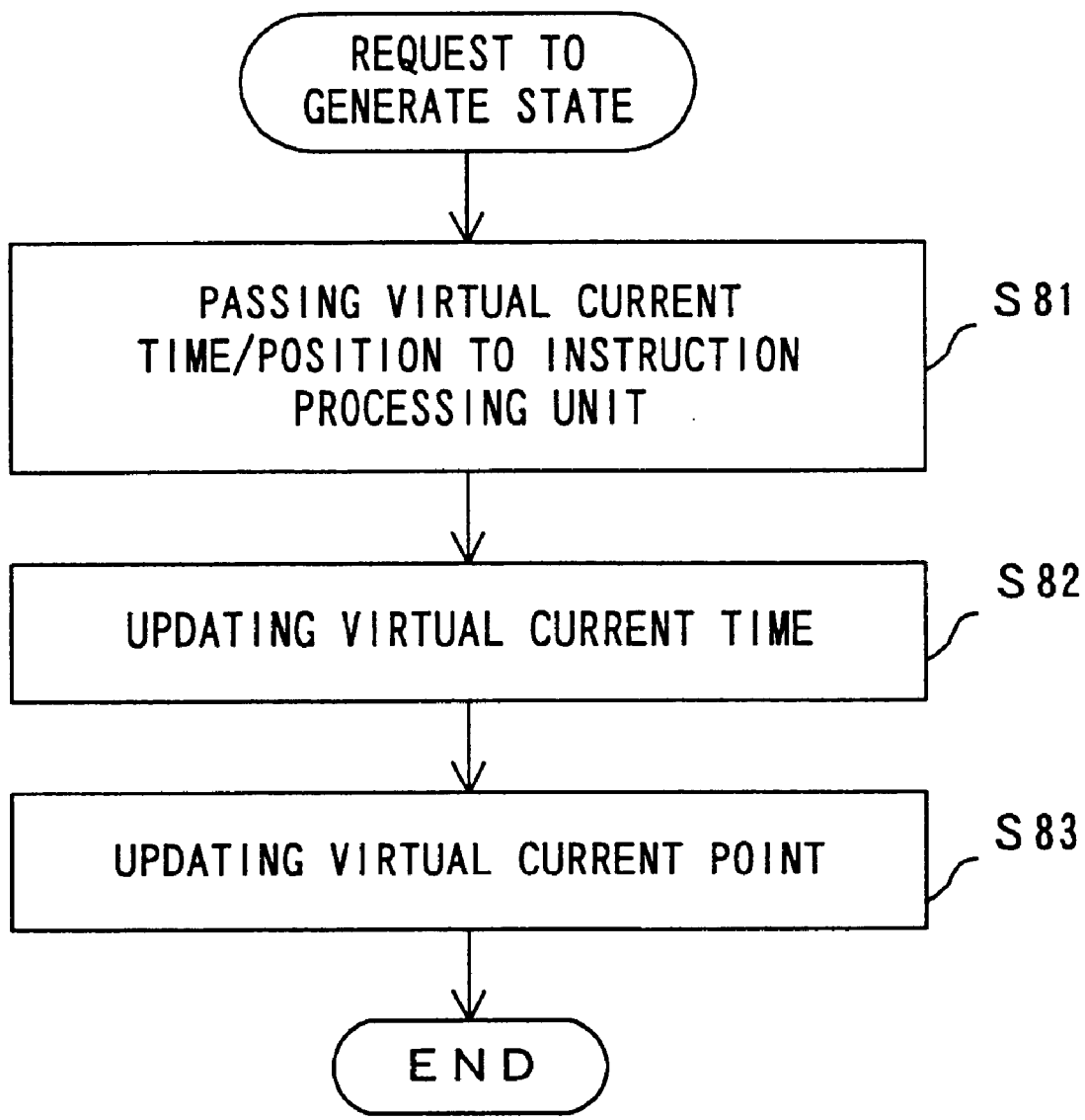
FIG. 12 is a flowchart showing the state generating process performed by the state generating unit.

In the state generation process performed by the state generating unit 17, as shown in FIG. 12, upon receipt of the request to generate a state from the instruction processing unit 15, a virtual current time and point are passed to the instruction processing unit 15 (step S81), and the simulation sampling time period is added to the virtual current time, so that the virtual current time is updated (step S82). Furthermore, the virtual current point is updated (step S83). Namely, the virtual current point is updated to a point obtained by being proceeded on the route that the instruction currently being executed specifies, by the distance calculated by multiplying the virtual place move speed of the place moving means that the instruction currently being executed specifies, by the simulation sampling time period. Note that, however, the virtual current point is updated to the end point of the route if it is beyond the range of the route.

Process Performed by the Navigation Outputting Unit 18

The navigation outputting unit 18 outputs navigation (information) based on a naviscript. FIG. 13 shows the flow of the process performed by the navigation outputting unit 18. Upon receipt of the request to output navigation from the instruction processing unit 15, the navigation outputting unit 18 outputs the corresponding navigation (step S91).

By the way, the above described naviscript is described in an XML. However, an instruction sequence may be described based on an arbitrary specification which is describable as a pair of a name which can identify the type of each information and its contents, instead of the XML.

For example, the above described format of structured data corresponds to one of such specifications. Accordingly, if the instruction sequence is given in the format of structured data initially, it may be input to the instruction processing unit 15 unchanged.

Semi-automatic Generation of a Naviscript

As referred to in the explanation of FIG. 2, a naviscript can be edited by a normal text editor or a naviscript editing tool using a translator 43 equipped with a capability for converting a naviscript into the information of a point or a route on a map. Or, a naviscript can be semi-automatically generated based on a route on which a user actually walks or drives a car.

A script semi-automatically generating unit 19 is intended to semi-automatically generate a naviscript by obtaining times at respective points on a route, position information such as latitude, longitude, etc., and time series data of information for guidance, etc. Since the naviscript is described in a markup language such as the XML, etc. as described above, it can be created by a general-purpose text editor, word processor, etc. By enabling a naviscript to be semi-automatically generated based on a route on which a user actually moves, even a person unfamiliar with a markup language etc. can create the naviscript with ease.

FIGS. 14A and 14B explain the process for semi-automatically generating a naviscript. Here, assume to generate a naviscript for a route from a point "A" to a point "C" via a facility "B", and to actually move along this route by carrying a user terminal 10. In this case, the script semi-automatically generating unit 19 obtains as time series data the time at a specified point and point information, and a varying time and the point information such as latitude, longitude, etc. from the state acquiring unit 16. Furthermore, the navigation information such as voice data, image data, etc. are inserted in suitable times and/or points according to user instructions.

When the time series data shown in FIG. 14B are obtained in this way, a tag is attached to each data, which is then converted into text data. This text data is defined to be a naviscript. With this process, a naviscript like the following can be semi-automatically generated.

```
<naviscript>
    <navi>
        <inst id = "inst-01">
            <time> 10:00      </time>
            <point>
                <longitude>  E132.00.00   </longitude>
                <latitude>   N37.11.11    </latitude>
            </point>
            <info>
                <voice src = "aaa.wav"> </voice>
                <image src = "xxx.jpb"> </image>
            </info>
        </inst>
        <inst id = "inst-02">
            <time> 12:00      </time>
            <point>
                <longitude>  E132.22.22   </longitude>
                <latitude>   N37.33.33    </latitude>
            </point>
            <info>
                <voice src = "bbb.wav"> </voice>
```

-continued

```
            <image src = "yyy.gif"> </image>
        </info>
    </inst>
    <inst id = "inst-03">
        <time>    16:30      </time>
        <point>
            <longitude>  E132.44.44   <longitude>
            <latitude>   N37.55.55    </latitude>
        </point>
    </inst>
  </navi>
</naviscript>
```

Note that the script semi-automatically generating unit 19 may be arranged not only in the user terminal 10, but also in the center 40 or a different portable terminal, etc.

Example of Applying the Present Invention to a PC

Figure 15:
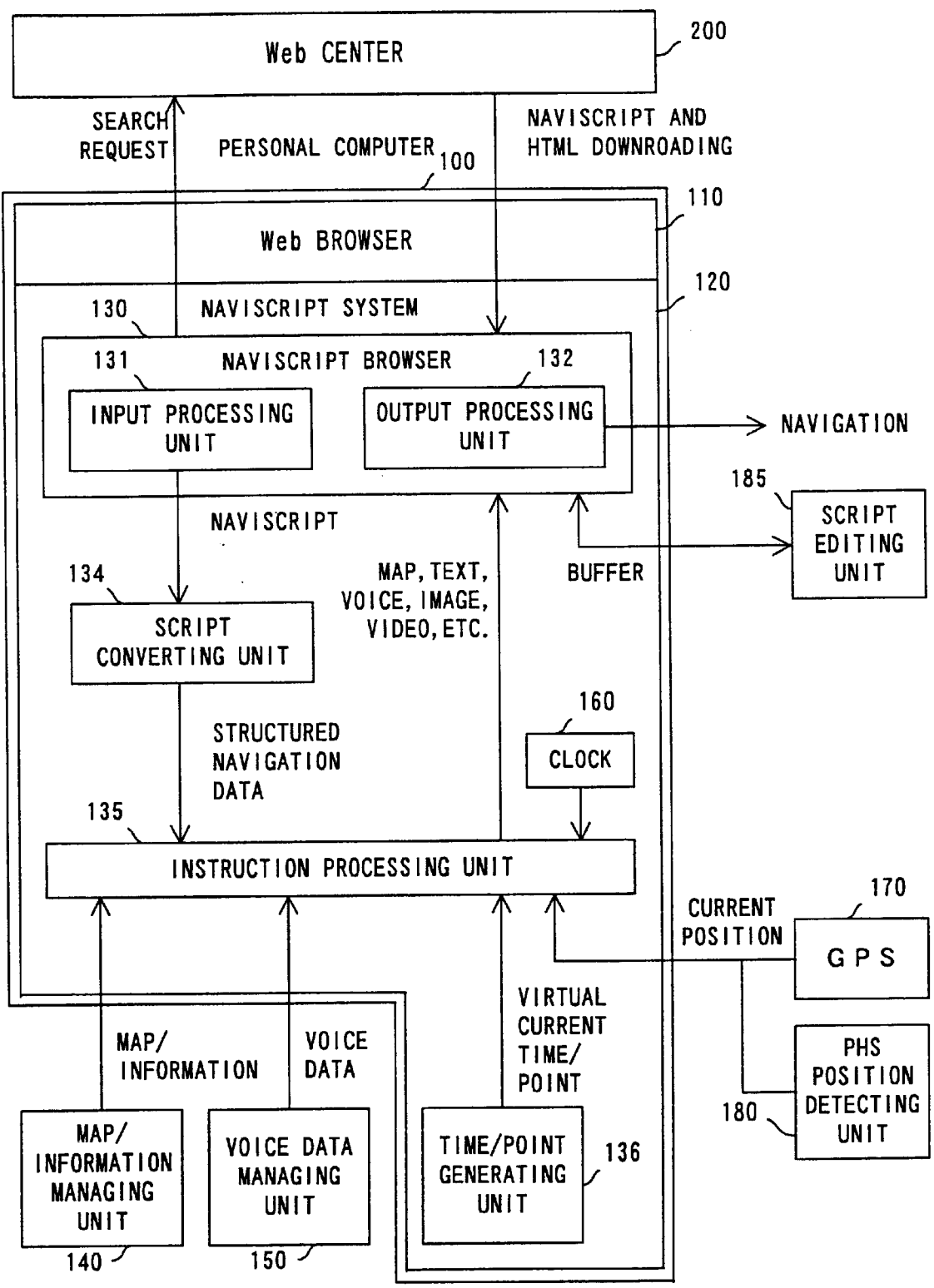
FIG. 15 exemplifies the system configuration in the case where the present invention is applied to a portable personal computer.

Provided next is the explanation about a case where the present invention is applied to a portable PC (Personal Computer). FIG. 15 exemplifies the configuration of this system. A personal computer 100 corresponds to the user terminal 10 shown in FIG. 1. A Web center 200 corresponds to the center 40 shown in FIG. 1. An input processing unit 131 corresponds to the operation inputting unit 11, the network accessing unit 12, and the medium accessing unit 13, which are shown in FIG. 1. An output processing unit 132 corresponds to the navigation outputting unit 18 shown in FIG. 1. Similarly, a script converting unit 134 corresponds to the script converting unit 14. An instruction processing unit 135 corresponds to the instruction processing unit 15. A time/point generating unit 136 corresponds to the state generating unit 17. A map/information managing unit 140 and a voice data managing unit 150 correspond to the database unit 20. A clock 160 and a GPS (Global Positioning System) 170 or a PHS position detecting unit 180 correspond to the state acquiring unit 16.

A naviscript system 120 for navigation is built, for example, into a Web browser 110 of the personal computer 100 as plug-in software.

Figure 16:
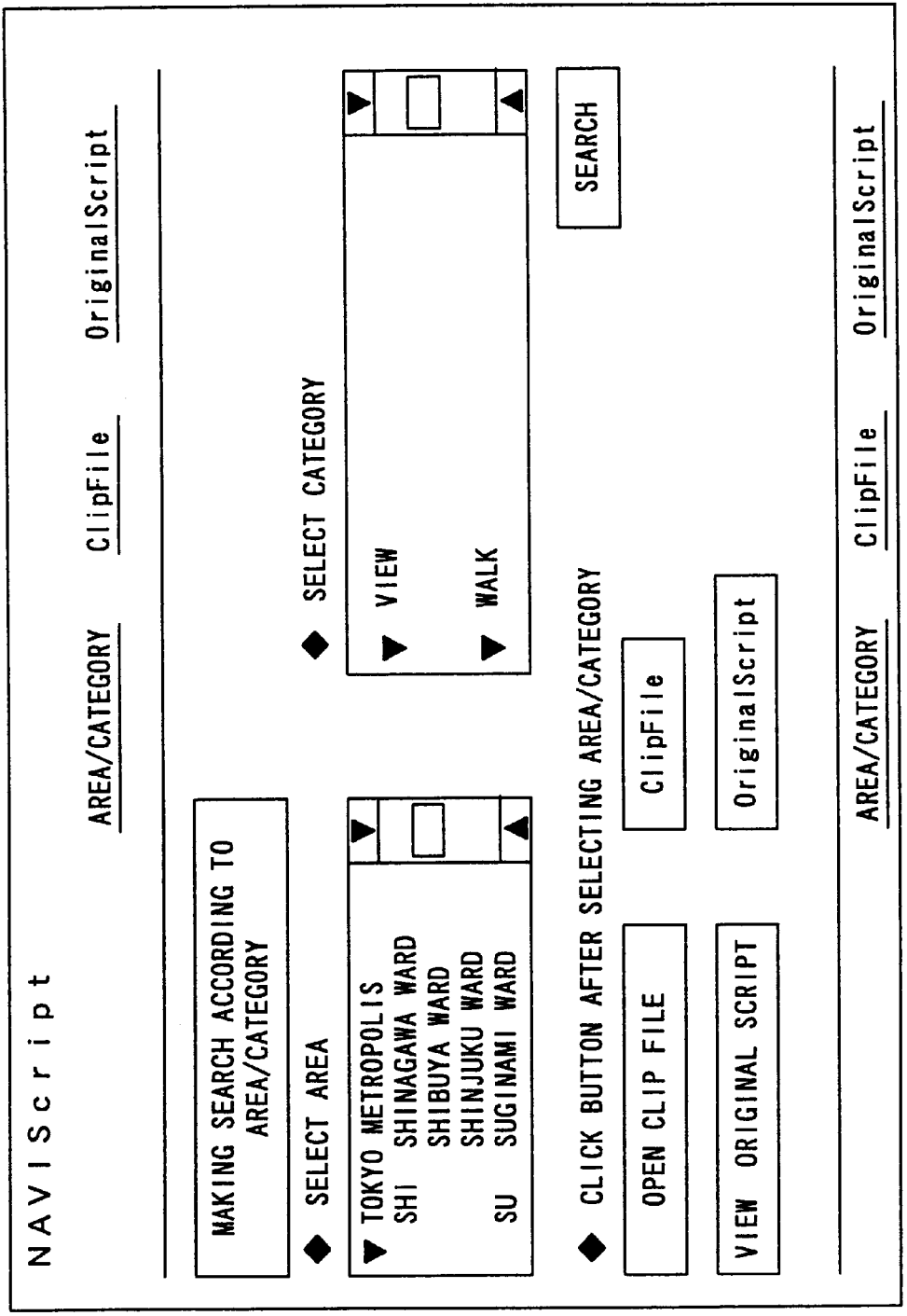
FIG. 16 exemplifies a menu screen for retrieving a naviscript.

FIG. 16 shows an example of a home page screen of a naviscript service provided by a Web center. Supposing that the URL of the home page of the naviscript service is specified on the screen of the Web browser 110, a menu screen like the one shown in FIG. 16 and described in an HTML (HyperText Markup Language) is delivered from the Web center 200, and displayed on the display screen of the personal computer 100.

Assume to select Shibuya Ward as an area, to click a retrieval button after selecting "view" as a category, and to transmit a retrieval request to the Web center 200 via the Web browser 110 on the screen shown in FIG. 16. In this case, the HTML source displaying the screen shown in FIG. 17 is transmitted from the Web center 200, so that the screen shown in FIG. 17 is displayed by the Web browser 110. Here, two naviscript information items are displayed as retrieval results.

When a user selects, for example, a course No. 1 on the screen shown in FIG. 17 and clicks the corresponding button, the naviscript for navigating the course from "Tokyo ○○ City" to "National Noh Theater" via "□□ Communication Center" is downloaded from the Web center 200 to the personal computer 100. As a result, the naviscript system 120 is activated.

Figure 18:
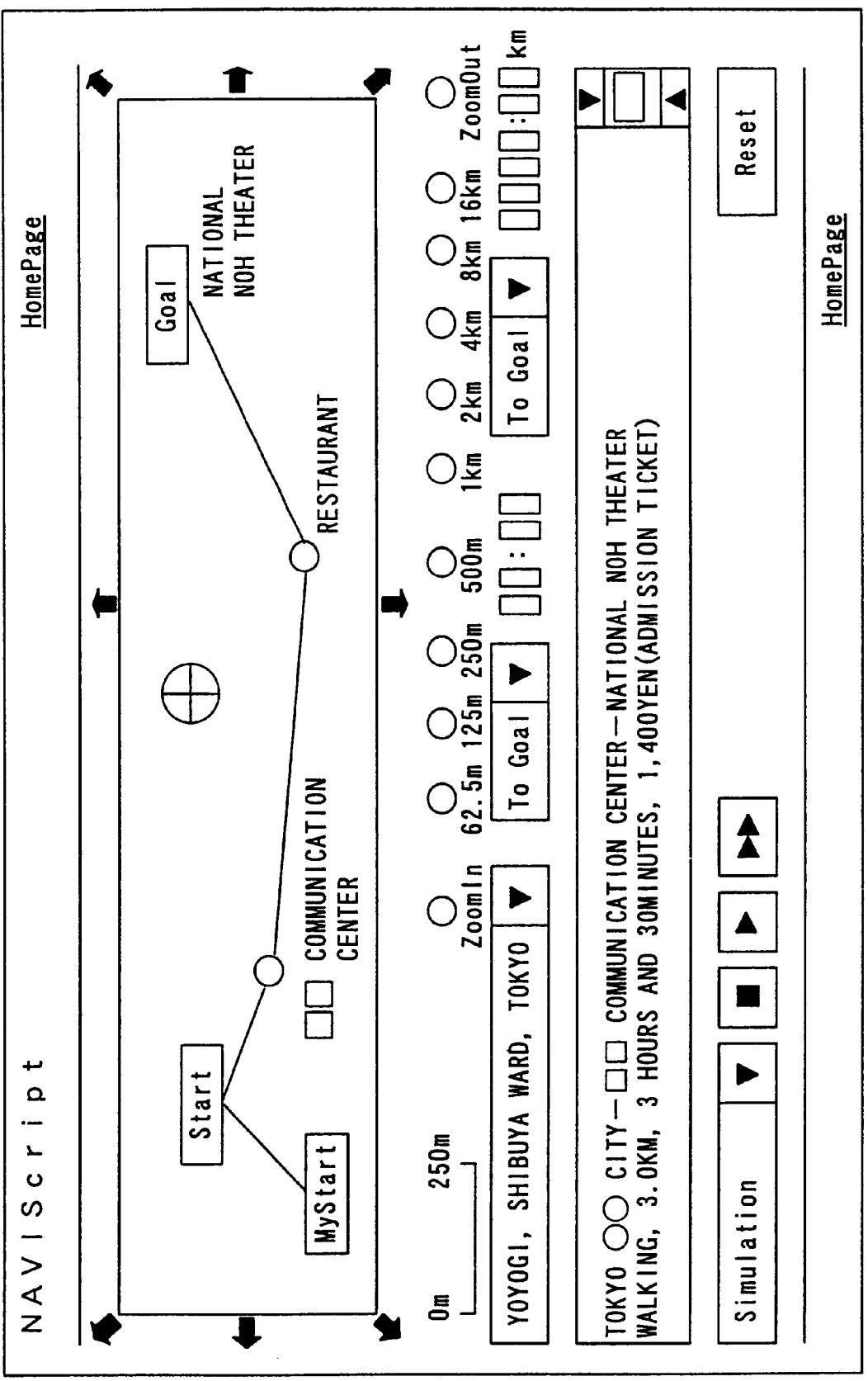
FIG. 18 exemplifies a screen on which navigation and operations are performed based on a naviscript.

Note that the naviscript system 120 may be activated by Web browser 110 accessing a file based on a particular file extension (such as ".nav") given to a naviscript after being downloaded. FIG. 18 exemplifies the screen displayed by a naviscript browser 130. This screen is displayed by being embedded into the screen displayed by the Web browser 110.

The naviscript for the course, which starts from "Tokyo ○○ City" and is received by the input processing unit 131 of the naviscript browser 130 from the Web center 200 via the Web browser 110, is passed to the script converting unit 134. The script converting unit 134 converts the naviscript into structured navigation data, and passes the converted data to the instruction processing unit 135. The instruction processing unit 135 performs the following process as a preparation process of instruction execution.

First of all, the instruction processing unit 135 determines whether the execution mode set by a user is either navigation mode or simulation mode. If the instruction processing unit 135 determines that the execution mode is the navigation mode, it issues a request to acquire a state to the clock 160 and the GPS 170 or the PHS position detecting unit 180, obtains an actual current time/point as a state, and adds the instruction for departing from the actual current position to the beginning of the structured navigation data.

Next, the instruction processing unit 135 adds a flag indicating "original" to all of the information items such as a time, a point, a route, navigation information, etc. of each instruction within the structured navigation data, and retrieves from the map/information managing unit 140 an attribute or attributes yet to be described among various attributes relating to a place (such as latitude, longitude, altitude, a name, an address, a telephone number, a zip code, etc.) by using described attributes as keys. For example, if only an area such as "Shinjuku Ward" is specified, the attributes of places representative of this area, such as Shinjuku Station, Shinjuku Ward Office etc. are retrieved. If a plurality of retrieval results exist at this time, the instruction processing unit 135 inquires of a user which result to select by using a menu, etc., or selects one of them by using a suitable evaluation index, and describes the retrieved or selected attribute in the corresponding portion of the structured navigation data (if a plurality of retrieval results exist also in subsequent processes, they are processed in a similar manner). Note that such a complementing process is normally performed for a naviscript created by a user himself. If a naviscript is the one downloaded from a center, it is recognized to describe the navigation information of the entire course from the beginning. Accordingly, this process is omitted.

Next, the instruction processing unit 135 retrieves a route if a route is not specified in the items relating to a route within the structured navigation data or, for example, only a category such as a normal road, a toll road, a highway, time precedence, distance precedence, etc. is specified. If an entire route is specified, the instruction processing unit 135 determines whether the route is either available or unavailable. If the instruction processing unit 135 determines that the route is unavailable, it retrieves a different route. The instruction processing unit 135 additionally describes the retrieved route to the corresponding portion of the instruction, and attaches a flag indicating "addition" to the route.

Then, the instruction processing unit 135 converts all of relatively specified places into absolutely specified places, describes the converted places in corresponding portions of the structured navigation data, estimates expected arrival times at all of the places, and describes the expected time in corresponding portions of the structured navigation data.

The instruction processing unit 135 then rearranges all of the instructions in time order, and sets an instruction cursor on the initial instruction of the structured navigation data.

In the meantime, if the instruction processing unit 135 determines that the execution mode is the simulation mode, it issues a request to prepare a state to the time/point generating unit 136, further issues a request to generate a state upon completion of the process for preparing a state, obtains a virtual current time and point, and adds the instruction for departing from the virtual current point to the beginning of the structured navigation data. Thereafter, a preparation process similar to that in the navigation mode is performed.

The instruction processing unit 135 performs the following process as an execution process. Provided first is the explanation about the case where the execution mode is the navigation mode. If the instruction processing unit 135 determines that the execution mode is the navigation mode, it issues a request to acquire a state to the GPS 170 and the clock, and obtains the information about an actual current time and point.

The instruction processing unit 135 then determines whether or not the current position is on a specified route. If the instruction processing unit 135 determines that the current position is not on the route specified by the instruction indicated by the instruction cursor, it retrieves a route from the current point to a near point on the route, additionally describes the retrieved route to the corresponding portion of the instruction, and attaches a flag indicating "addition" to the route. If a plurality of retrieval results exist, one of them is selected with user specification or by using a suitable evaluation index.

For example, if a traffic information use setting that a user separately makes is ON, traffic information (such as a traffic jam, regulation, accident, etc.) is obtained from VICS (Vehicle Information Communication System). Furthermore, if an automatic route change setting that the user separately makes is ON, if the flag of the route specified by the instruction indicated by the instruction cursor is "addition", and if a traffic jam, regulation, accident, etc. occurs up to the nearest indispensable point or the nearest indispensable route, which the flag indicating "original" is attached to and included in the instructions subsequent to that indicated by the instruction cursor, the instruction processing unit 135 retrieves a route from the current point to the indispensable point or route. The instruction processing unit 135 then modifies the route by describing the retrieved or selected route in the corresponding portion of the instruction, and attaches a flag indicating "addition" to the modified route. Since the traffic information use setting or the automatic route change setting is normally used when the present invention is applied to a car navigation system, etc., a user turns off this setting when the user moves on foot as assumed in this example.

Next, if the time/point described in the instruction indicated by the instruction cursor matches an actual current time/point (or is within a range including an error caused by sampling, etc.), the instruction processing unit 135 issues a request to output navigation to the output processing unit 132, passes navigation information thereto, and updates the point of the instruction cursor to that of the next instruction. The instruction processing unit 135 repeats the above described process until there is no instruction left.

If the execution mode is the simulation mode, the instruction processing unit 135 issues a request to generate a state to the time/point generating unit 136, obtains a virtual current time/point, and determines whether or not a virtual current point is on a specified route. If the instruction processing unit 135 determines that the virtual current point is not on the route specified by the instruction indicated by the instruction cursor, it retrieves a route to the virtual current point or to a near point, additionally describes the retrieved route in a corresponding portion of the instruction, and attaches a flag indicating "addition" to the route.

If the time/point described in the instruction indicated by the instruction cursor matches the virtual current time/point (or is within a range including an error caused by sampling, etc.), the instruction processing unit 135 issues a request to output navigation to the output processing unit 132, passes navigation information thereto, and updates the point of the instruction cursor to that of the next instruction. The instruction processing unit 135 repeats the above described process until there is no instruction left.

Upon receipt of the request to prepare a state from the instruction processing unit 135, the time/point generating unit 136 sets as a virtual departure time either of an actual current time and a time that the user separately sets, which is selected by the user or the system, sets as a virtual departure point either of an actual current point or a point that the user separately sets, which is selected by the user or the system, and sets as a virtual time elapse speed either of a default virtual time elapse speed that the system sets and a virtual time elapse speed that the user separately sets, which is selected by the user or the system. The time/point generating unit 136 further sets as a virtual place move speed either of a default virtual place move speed that the system sets and a virtual place move speed that the user separately sets, and sets as a simulation sampling time period either of a default simulation sampling time period that the system sets and a simulation sampling time period that the user separately sets, which is selected by the user or the system. Additionally, the time/point generating unit 136 respectively sets the virtual departure time and the virtual departure point to the virtual current time and the virtual current point.

Furthermore, the time/point generating unit 136 performs the following process as the state generation process. Upon receipt of the request to generate a state from the instruction processing unit 135, the time/point generating unit 136 passes the virtual current time/point to the instruction processing unit 135, and updates the virtual current time by adding the simulation sampling time period to the virtual current time. Still further, the time/point generating unit 136 updates the virtual current point to a point proceeded by a distance calculated by multiplying the virtual place move speed of the place moving means specified in the instruction currently being executed by the simulation sampling time period. However, if the calculated point is beyond the range of the route, the time/point generating unit 136 updates the virtual current point to an end point of the route.

Upon receipt of the request to output navigation from the instruction processing unit 135, the output processing unit 132 outputs navigation information according to the instruction indicated by the instruction cursor. As a result, the course navigation to the National Noh Theater is made on the screen shown in FIG. 18.

That is, if the execution mode is the navigation mode, the output processing unit 132 displays the outline of a route and a distance or time required to reach a destination, or performs navigation vocally and/or by displaying a navigation message or image on the screen shown in FIG. 18 according to the instructions proceeding from the current time or point, while a user is moving on the route that the user himself selects.

If the execution mode is the simulation mode, the output processing unit 132 displays a navigation message or image on the screen shown in FIG. 18 or performs voice navigation according to instructions, based on a set virtual current time/point, and virtual time elapse speed.

Example of Applying the Present Invention to a Car Navigation System

Next, an example of applying the present invention to a navigation system is provided as another preferred embodiment. FIG. 19 exemplifies the system configuration in the case where the present invention is applied to a car navigation system. A center 210 corresponds to the center 40 shown in FIG. 1. A navigation outputting unit 302 corresponds to the navigation outputting unit 18 shown in FIG. 1, and the remaining portion of an input/output processing unit 301 corresponds to the operation inputting unit 11, the network accessing unit 12, and the medium accessing unit 13 shown in FIG. 1. A script converting unit 303 corresponds to the script converting unit 14. An instruction processing unit 304 corresponds to the instruction processing unit 15. A time/point generating unit 305 corresponds to the state generating unit 17. A map/information managing unit 310 and a voice data managing unit 320 correspond to the database unit 20. A clock 160, a GPS 170, and a VICS 190 correspond to the state acquiring unit 16.

The input/output processing unit 301 specifies with a menu, etc. the course on which a user desires to drive, and issues a retrieval request to the center 210. After the input/output processing unit 301 downloads a desired naviscript from the center 210, it passes the naviscript to the script converting unit 303. The script converting unit 303 converts the naviscript into structured navigation data, and passes the converted data to the instruction processing unit 304. Thereafter, once a navigation start instruction is issued, the instruction processing unit 304 prepares for an instruction process based on the structured navigation data, and executes instructions.

There is a significant difference from a conventionally normal car navigation system. That is, with a conventional method, a user must set points and a route by himself. However, according to the present invention, a recommended course, etc. can be downloaded with ease. Additionally, with the conventional method, a route to a specified destination is navigated vocally or by being displayed on a screen in an inflexible manner based on current point information and map information. Meanwhile, according to the present invention, navigation is output according to a naviscript. Therefore, also adequate sightseeing navigation and guidance can be made according to a point or a route to be passed through by a tour such as a bus tour. Furthermore, flexible navigation such as navigation to a restaurant at lunchtime and navigation to a parking lot, etc. can be made on demand.

Especially, with the conventional car navigation system, only navigation in terms of places is made. With a naviscript according to the present invention, also navigation in terms of time can be made according to a current time or an elapsed time. Furthermore, a user can create a naviscript that the user himself or an acquaintance uses, set the created naviscript in a car navigation system, and operate the system.

Example of Applying the Present Invention to a PHS

Figure 20:
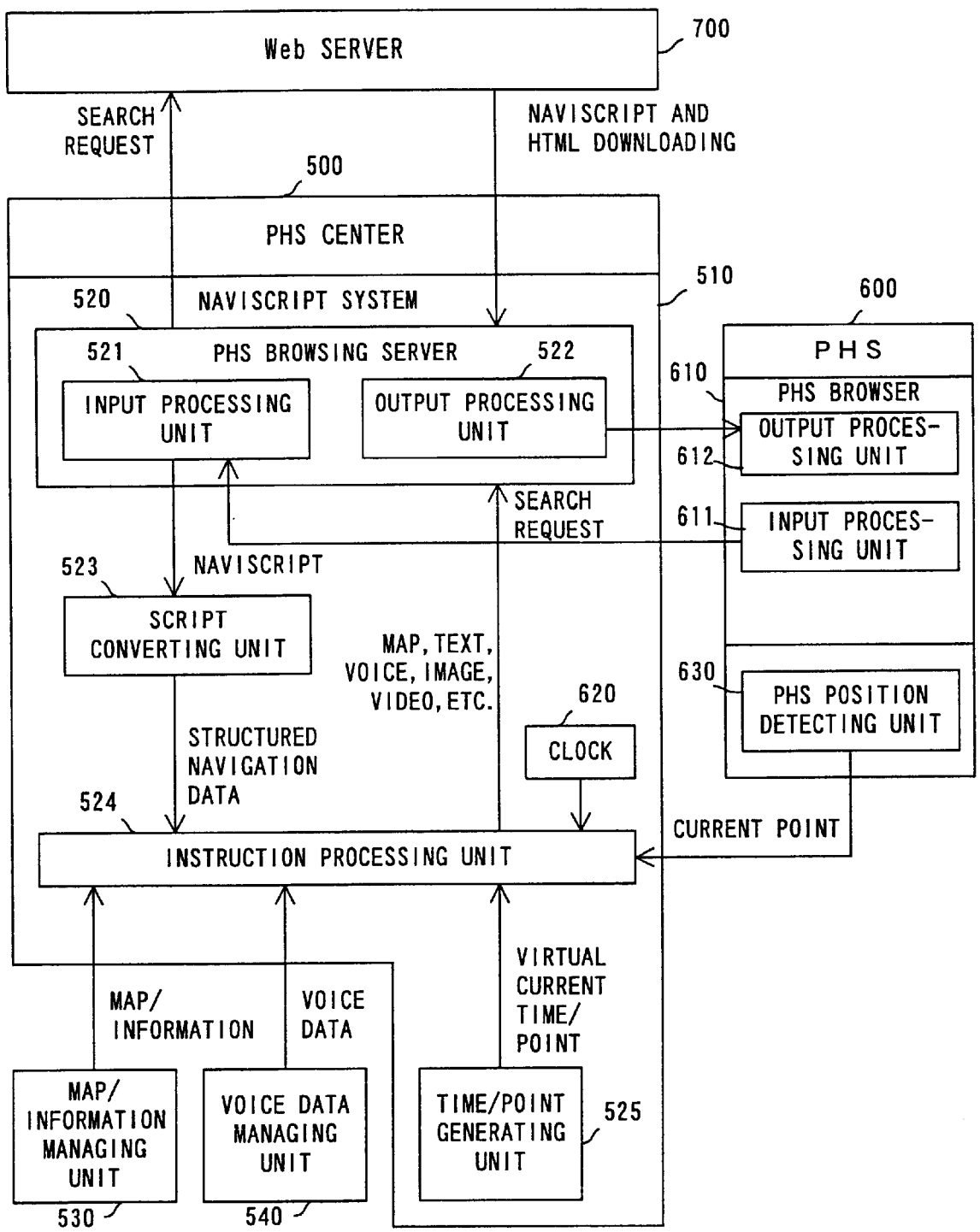
FIG. 20 exemplifies the system configuration in the case where the present invention is applied to a PHS.

FIG. 20 exemplifies the system configuration in the case where the present invention is applied to a PDC or a PHS. In this case, a naviscript 510 is built in a center 500. A PHS browser 610 of a PHS 600 comprises an input processing unit 611 and an output processing unit 612.

Assume that a user issues a request to retrieve a naviscript to a Web server 700 to which naviscripts are recorded, by using the PHS browser 610 of the PHS 600 via a PHS browsing server 520 within a PHS center 500. An output processing unit 522 within the PHS browsing server 520 downloads a desired naviscript from the Web server 700, and passes the downloaded naviscript to the input processing unit 521. The input processing unit 521 passes the naviscript to the script converting unit 523. The script converting unit 523 parses the naviscript, and converts it into structured navigation data. When the user uses the naviscript in the navigation mode, the instruction processing unit 524 obtains the current state (current time/point) of the user from a clock 620 and a PHS position detecting unit 630 of the PHS 600, and complements the route information of the structured navigation data. The instruction processing unit 524 then obtains required map/information and voice data from a map/information managing unit 530 and a voice data managing unit 540 based on the structured navigation data according to the state, and passes the obtained information and data to an output processing unit 522. The output processing unit 522 outputs navigation by making it viewable on a display screen of the PHS browser 610, etc. via the PHS browsing server 520.

In the simulation mode, the instruction processing unit 524 complements the route information of the structured navigation data by obtaining a virtual current time/point from a time/point generating unit 525, and outputs navigation by making it viewable on the display screen of the PHS browser 610 in a similar manner as in the navigation mode.

Example of Applying the Present Invention to a Driving Managing System

Provided next is the explanation about an example of the case where the present invention is applied to a driving managing system.

There is a conventional driving managing system which comprises: an inputting unit for inputting data describing an itinerary of a trip desired by a user, a service timetable, or a route; a driving management database describing reservation states of respective highways and facilities, etc., and data such as a traffic jam on a road or in a parking lot, regulations, accident, weather, etc.; and a coordinating unit for making a comparison and coordination between the data of an input desired itinerary/route and that of the driving management database, for modifying the itinerary/route data on demand according to the result of the comparison/coordination, and/or for updating the data of the driving management database; and an outputting unit for outputting the resultant itinerary/route data.

There is a point/route navigating apparatus, which is another implementation of a conventional technique, for performing various types of navigation in a car navigation system, a PC, a PDA, a PDC, a PHS, etc. Such an apparatus comprises: an inputting unit for inputting a point/route (sequence) desired by a user, and an executing unit for performing navigation according to the input point/route (sequence).

Since the format of the itinerary/route data for a reservation in the conventional driving managing system is different from that of the point/route data for navigation in the conventional point/route navigating apparatus, these data must be separately created, managed, and operated, which causes an inconvenience to a developer, an operator, and a user. Additionally, because a data format is different depending on each driving managing system, many types of data must be created, managed, and operated, which also causes an inconvenience to a developer, an operator, and a user.

By applying the present invention to a driving managing system, the formats of data input for making reservations in various driving managing systems can be made common to those of the data input for performing navigation in various point/route navigating apparatuses.

FIG. 21 exemplifies the configuration in the case where the present invention is applied to a driving managing system. A driving managing center 1000 and a terminal 1010 used by a user are interconnected by a network, and transmit/receive a naviscript. A driving management database 1004 obtains various information items such as a road state, a reservation state of each facility from various information providing sources 1020, and manages the obtained information. The terminal 1010 itself may be a portable information device, or an information device to be built into a car navigation system, etc.

The driving managing center 1000 comprises: a receiving unit 1001 for receiving a naviscript transmitted from the terminal 1010; a converting unit 1002 for converting a received naviscript into structured navigation data; a coordinating unit 1003 for making a comparison and coordination between the converted structured navigation data and the data stored in the driving management database 1004; an inversely converting unit for inversely converting the coordinated structured navigation data into a naviscript; and a transmitting unit 1006 for returning the converted naviscript to the terminal 1010.

The terminal 1010 comprises: an input processing unit 1011 for inputting a naviscript desired by a user from a source in a network 1030, a medium 1031 such as a CD-ROM, a magnetic disk, etc., or a keyboard, and the like; a transmitting unit 1012 for transmitting the input naviscript to the driving managing center 1000; a receiving unit for receiving the naviscript which is modified and transmitted by the driving managing center 1000; a converting unit 1014 for converting the received naviscript after being modified into structured navigation data which can be executed by the local terminal itself; an execution processing unit 1015 for generating navigation (information) based on the converted structured navigation data; and an output processing unit 1016 for outputting the generated navigation (information).

The input processing unit 1011 within the terminal 1010 obtains from the network 1030 or reads from the medium 1031 such as a CD-ROM, a magnetic disk, etc. a desired naviscript which describes the destination currently being headed and a scheduled itinerary or route of a trip or an operation, or inputs user instruction information with a keyboard.

An example of a naviscript that a user desires is provided below. The contents of the naviscript indicate an overnight trip to the Lake Yamanaka, and specify a course which is bound from Numazu to Gotenba on Tomei Highway by car, drops in at Fuji ○○ Land, and reaches Lake Yamanaka ○○ Lodge for an overnight stay on December 23rd. A required time is scheduled to be 6 hours and 30 minutes.

```
<naviscript version = "0.3">
    <title>      example                  </title>
    <copyright>  All Rights Reserved,
                 Copyright (C) FujiLabo Ltd. 1998.
                                          </copyright>
<navi>
    <title>      Overnight Stay at Lake Yamanaka
</title>
    <date>       1998/12/23               </date>
    <duration>   6 hour 30 min            </duration>
    <distance>   100.0 km                 </distance>
    <cost>       15,000 yen               </cost>
    <seq>
        <inst ref = "inst-point-Numazu">
        <inst ref = "inst-point-Gotenba">
        <inst ref = "inst-point-Gotenba ○○
```

-continued

```
Intersection">
        <inst ref = "inst-object-Fuji ○○ Land">
        <inst ref = "inst-object-Lake Yamanaka ○○
Lodge parking lot">
    </seq>
</navi>
<inst id = "inst-point-Numazu">
    <time>
        10:00
    </time>
    <point>
        <name>       Numazu               </name>
        <category>   IC                   </category>
    </point>
    <route>
        <means>      car                  </means>
        <name>       Tomei Highway        </name>
        <category>   highway              </category>
    </route>
</inst>
<inst id = "inst-point-Gotenba">
    <time>
        10:30
    </time>
    <point>
        <name>       Gotenba              </name>
        <category>   IC                   </category>
    </point>
    <route>
        <means>      car                  </means>
        <category>   prefectural road     </category>
    </route>
</inst>
<inst id = "inst-point-Gotenba ○○ Intersection">
    <time>
        10:30
    </time>
    <point>
        <name>       Gotenba ○○ Intersection  </name>
        <category>   intersection             </category>
    </point>
    <route>
        <means>      car                  <means>
        <name>       Route 136            </name>
        <category>   national road        </category>
    </route>
</inst>
<inst id = "inst-object-Fuji ○○ Land">
    <time>
        11:00
    </time>
    <object>
        <name>       Fuji ○○ Land         </name>
        <category>   amusement park       </category>
    </object>
    <route>
        thesame
    </route>
</inst>
<inst id = "inst-object-Lake Yamanaka ○○ Lodge
parking lot">
    <time>
        16:00
    </time>
    <object>
        <name>       Lake Yamanaka ○○ Lodge parking
lot                                       </name>
        <category>   parking lot          </category>
    </object>
</inst>
</naviscript>
```

When the naviscript that the user desires is input, the transmitting unit 1012 transmits this naviscript to the driving managing center 1000.

Within the driving managing center 1000, the receiving unit 1001 receives the naviscript transmitted from the terminal 1010, and the converting unit 1002 converts the received naviscript into structured navigation data.

Assume that the following data are stored in the driving management database 1004 within the driving managing center 1000. Data1 and data2 exemplify route data, data3 exemplifies point data, and data4 and data5 exemplify facilities data. A maximum number of cars/people indicates the maximum number of cars or people that can utilize a road or a facility. A reserved number of cars/people indicates the number of cars/people that make reservations. Jam percentage 100% represents the state where the reserved number of cars/people that make reservations reaches the maximum number, and no more use is allowed.

```
<data1> main number              1234567890-01
subnumber                19981218-14301500
type 01                  route
type 02                  highway
name                     Tomei Highway
section                  Numazu-Gotenba
direction                up
date                     1998/12/18
time                     14:30–15:00
reserved number of cars  1,234
maximum number of cars   5,000
jam percentage           27 []
traffic jam              0[km]/0[min]
regulation               none
accident                 none
weather                  light rain
temperature              15[C]
wind velocity            5[m]
<data2> main number              1234567890-01
subnumber                19981223-10001030
type01                   route
type02                   highway
name                     Tomei Highway
section                  Numazu-Gotenba
direction                up
date                     1998/12/23
time                     10:00–10:30
reserved number of cars  5,000
maximum number of cars   5,000
jam percentage           100[]
traffic jam
regulation
accident
weather
temperature
wind velocity
<data3> main number              2345678901-01
subnumber                19981223-10301100
type 01                  point
address                  ○○ Gotenba City,
                         Shizuoka Prefecture
name                     Gotenba ○○ Intersection
direction                up on Route 136
date                     1998/12/23
time                     10:30–11:00
traffic jam
regulation
accident
weather
temperature
wind velocity
<data4> main number              4567890123
subnumber                19981223
type 01                  facility
```

```
type 02                    amusement park
name                       Fuji ○○ Land
address                    ○○, Shizuoka Prefecture
date                       1998/12/23
time                       10:00–20:00
reserved number of people  1,000
maximum number of people   1,000
jam percentage             100[]
weather
temperature
wind velocity
<data5> main number                3456789012
subnumber                  19981223
type 01                    parking lot
address                    ○○, Shizuoka Prefecture
name                       Lake Yamanaka ○○ Lodge
                           parking lot
date                       1998/12/23
time                       15:00–10:00 (next day)
reserved number of cars    11
maximum number of cars     20
jam percentage             55[]
. . .
```

The coordinating unit 1003 makes a comparison and coordination between the structured navigation data received from the converting unit 1002 and the data such as the states of highways, the states of facilities, a traffic jam on a road or in a parking lot, a regulation, an accident, weather, which are described in the driving management database 1004, modifies the structured navigation data based on the result of the comparison and coordination, and/or updates the data stored in the driving management database 1004.

For example, the coordinating unit 1003 makes a comparison between the above described naviscript that the user desires and <data2> stored in the driving management database 1004, determines that the jam percentage of Tomei Highway is already 100% and this highway is unavailable, and also determines that the jam percentage of the reservation state of Fuji ○○ Land is 100% and admission is not allowed. Therefore, the coordinating unit 1003 modifies the corresponding portion of the converted structured navigation data, and/or changes the data of the driving management database 1004.

In this case, the contents are modified so that a national road is used instead of Tomei Highway, and Fuji ○○ Land is not dropped in. In the above described examples of the naviscript and the data of the driving management database 1004, the following portion (indicated by the corresponding description of the naviscript) of the structured navigation data

```
<route>
    <means>        car              </means>
    <name>         Tomei Highway    </name>
    <category>     highway          </category>
</route>
    is modified as follows:
<route>
    <means>        car              </means>
    <name>         Route 246        </name>
    <category>     national road    </category>
</route>
    Additionally, the following portion is deleted.
<inst id = "inst-object-Fuji ○○ Land">
    <time>
        11:00
```

-continued
```
        </time>
        <object>
            <name>      Fuji ○○ Land          </name>
            <category>  amusement park        </category>
        </object>
        <route>
            thesame
        </route>
    </inst>
```

The inversely converting unit 1005 converts the structured navigation data modified by the coordinating unit 1003 into a naviscript. An example of the naviscript which is modified by the coordinating unit 1003 and inversely converted by the inversely converting unit 1005 is provided below. The following naviscript indicates the course from Numazu to the Lake Yamanaka for an overnight stay via Gotenba ○○ Intersection by using Routes 246 and 136.

```
<naviscript version = "0.3">
    <title>         example                       </title>
    <copyright>     All Rights Reserved,
        Copyright (C) FujiLabo Ltd. 1998 </copyright>
<navi>
    <title>     Lake Yamanaka Overnight Stay      </title>
    <date>      1998/12/23                        </date>
    <duration>  6hour30min                        </duration>
    <distance>  100.0km                           </distance>
    <cost>      15,000yen                         </cost>
    <seq>
        <inst ref = "int-point-Numazu">
        <inst ref = "inst-point-Gotenba">
        <inst   ref = "inst-point-Gotenba    ○○
Intersection">
        <inst ref = "inst-object-Fuji ○○ Land">
        <inst ref = "inst-object-Lake Yamanaka ○○
Lodge parking lot">
    </seq>
</navi>
<inst id = "int-point-Numazu">
    <time>
        10:00
    </time>
    <point>
        <name>      Numazu          </name>
        <category>  IC              </category>
    </point>
    <route>
        <means>     car             </means>
        <name>      Route 246       </name>
        <category>  national road   </category>
    </route>
</inst>
<inst id = "inst-point-Gotenba">
    <time>
        10:30
    </time>
    <point>
        <name>      Gotenba         </name>
        <category>  IC              </category>
    </point>
    <route>
        <means>     car             </means>
        <category>  prefectural road </category>
    </route>
</inst>
<inst id = "inst-point-Gotenba ○○ Intersection">
    <time>
        10:30
    </time>
    <point>
        <name>   Gotenba ○○ Intersection   </name>
        <category> intersection             </category>
```

-continued
```
    </point>
    <route>
        <means>     car             </means>
        <name>      Route 136       </name>
        <category>  national road   </category>
    </route>
</inst>
<inst id = "inst-object-Lake Yamanaka ○○ Lodge
parking lot">
    <time>
        16:00
    </time>
    <object>
        <name> Lake Yamanaka ○○ Lodge Parking Lot
                                                </name>
        <category>      parking lot         </category>
    </object>
</inst>
</naviscript>
```

The transmitting unit 1006 returns the converted naviscript after being modified to the terminal 1010. Within the terminal 1010, the receiving unit 1013 receives the naviscript transmitted from the driving managing center 1000, the converting unit 1014 converts the received naviscript into structured navigation data, the execution processing unit 1015 generates navigation (information) based on the structured navigation data, and the output processing unit 1016 outputs the generated navigation information with a display, a printer, a speaker, etc.

Figure 22:
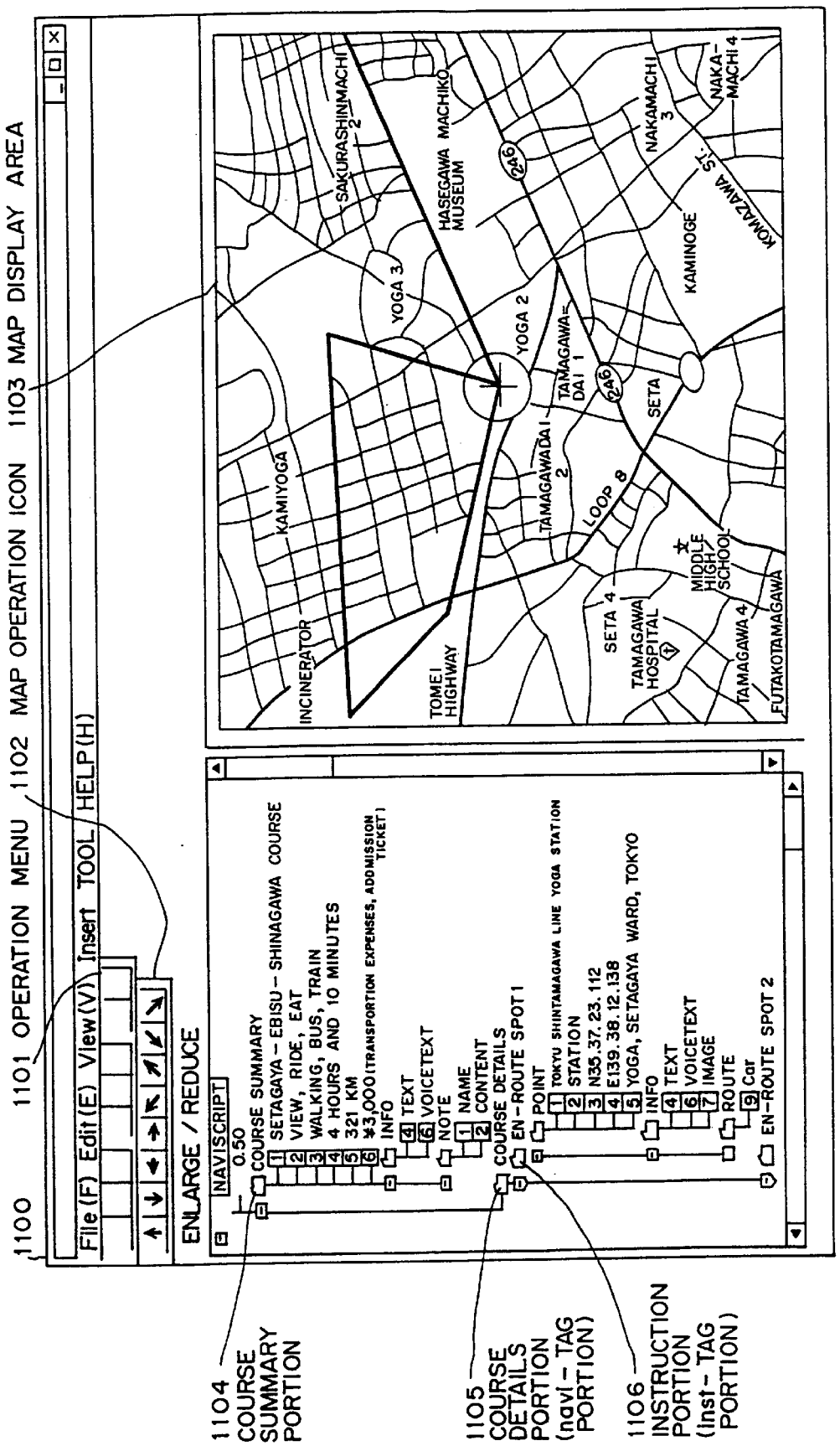
FIG. 22 exemplifies a naviscript editor screen displayed by a terminal.

FIG. 22 exemplifies a naviscript GUI editor screen displayed on the terminal 1010. An editor screen 1100 is used to create a naviscript that a user desires, and comprises an operation menu 1101 for selecting and instructing various types of editing operations, and a map operation icon 1102 for moving a display area on a map displayed on a map display area 1103. The user creates his or her desired naviscript by using the GUI which links with the map information displayed in the map display area 1103. The naviscript is represented as a tree structure composed of a course summary portion 1104, a course details portion (navi-tag portion) 1105, (each) instruction portion (inst-tag portion) 1106, etc., and is displayed on the left-hand side of the map display area 1103.

Figure 23:
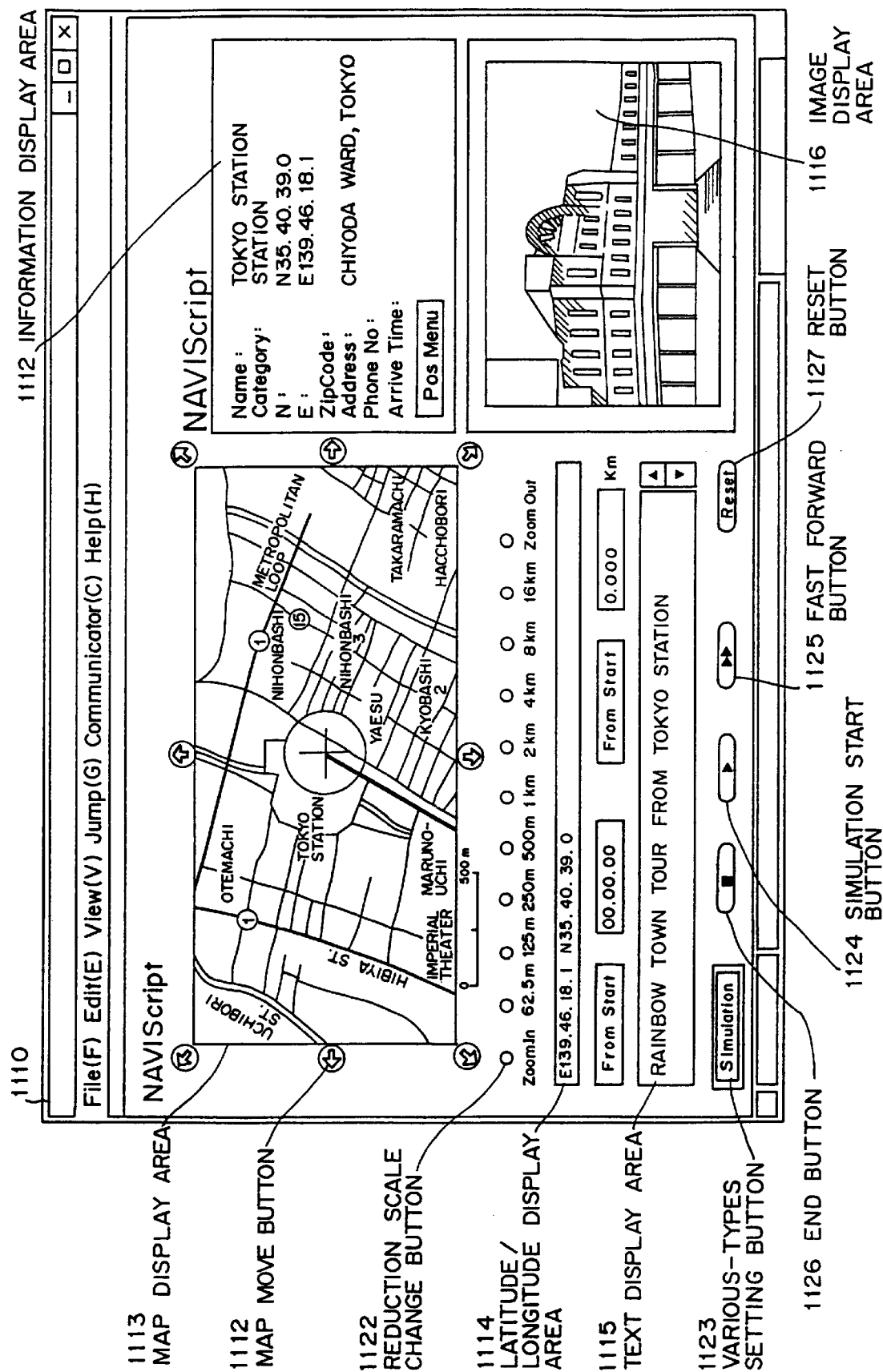
FIG. 23 exemplifies a naviscript browser screen displayed by the terminal.

An example of a naviscript browser screen displayed on the terminal 1010 is illustrated in FIG. 23. The browser screen 1110 is displayed when the naviscript after being modified, which is transmitted from the driving managing center 1000, is verified in the simulation mode or executed in the navigation mode. By way of example, areas such as an information display area 1112 for displaying position information at each point, a map display area 1113 for displaying a current position and route of a user on a map, a latitude/longitude display area 1114, a text display area 1115 for displaying text data information included in navigation information, and an image display area 1116 for displaying image data information included in navigation information, and a map moving button 1121 for moving a display area on a map, a reduction scale changing button 1122 for changing a reduction scale of a map display, a various-types setting button 1123 for setting simulation mode, navigation mode, etc., a simulation start button 1124, a fast-forward button 1125, an end button 1126, a reset button 1127, etc. are arranged on the browser screen 1110. As a user moves, also the position of an icon indicating the current point on a map displayed in the map display area 1113 moves, associated navigation information is displayed in the image display area 1116, etc., and voice navigation information is sometimes output from a speaker.

Figure 24:
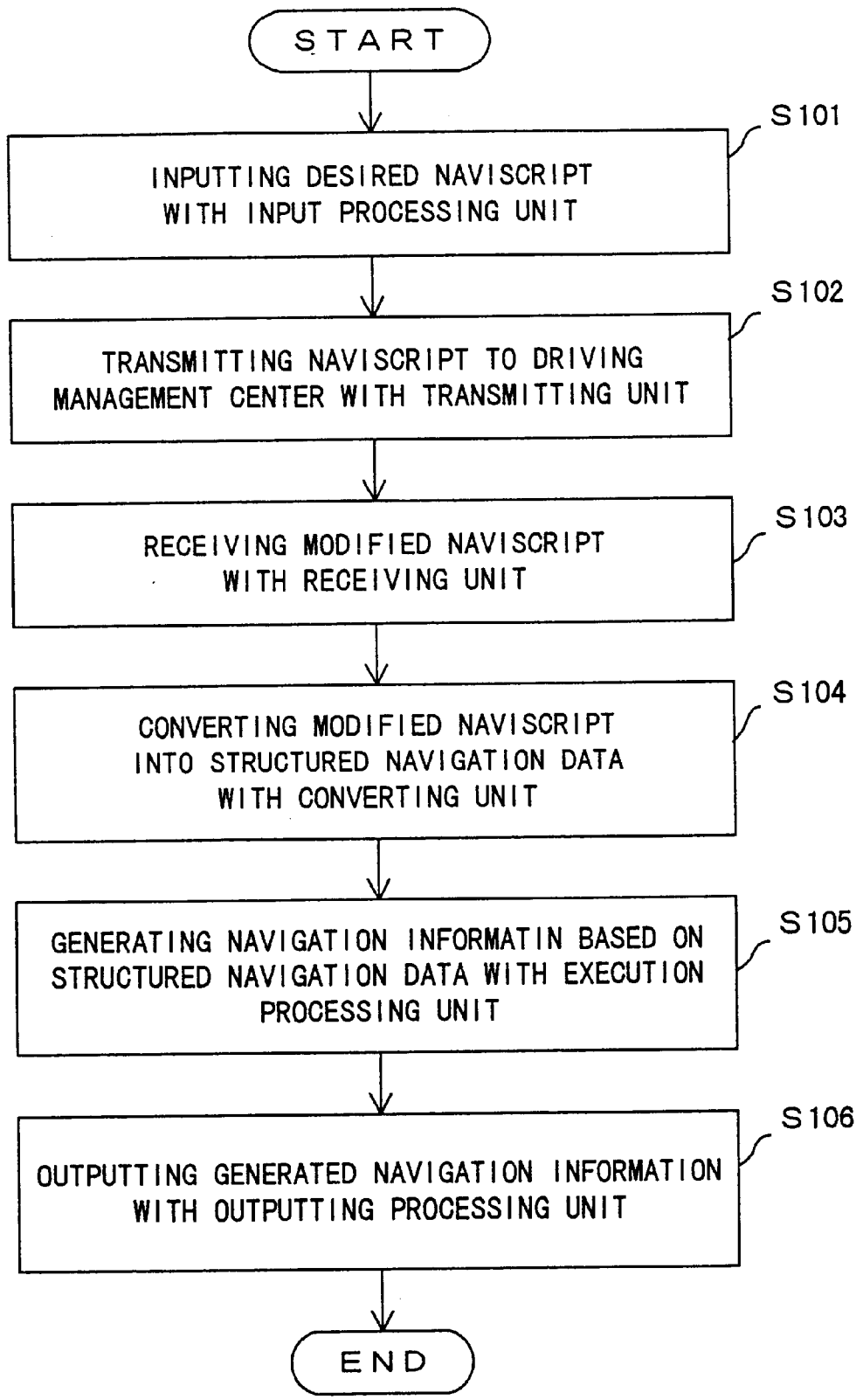
FIG. 24 is a flowchart showing the process performed by the terminal.

FIG. 24 shows the flow of the process performed by a terminal when the present invention is applied to a driving managing system. When the terminal 1010 inputs a naviscript that a user desires with the input processing unit 1011 (step S101), the transmitting unit 1012 transmits the naviscript to the driving managing center 1000 (step S102). Additionally, the terminal 1010 receives a modified naviscript from the driving managing center 1000 with the receiving unit 1013 (step S103), and the converting unit 104 converts the received naviscript into structured navigation data to be used in the local terminal 1010 with the use of the converting unit 1014 (step S104). The execution processing unit 1015 then creates navigation information based on the structured navigation data (step S105), and the output processing unit 1016 outputs the generated navigation information (step S106).

Figure 25:
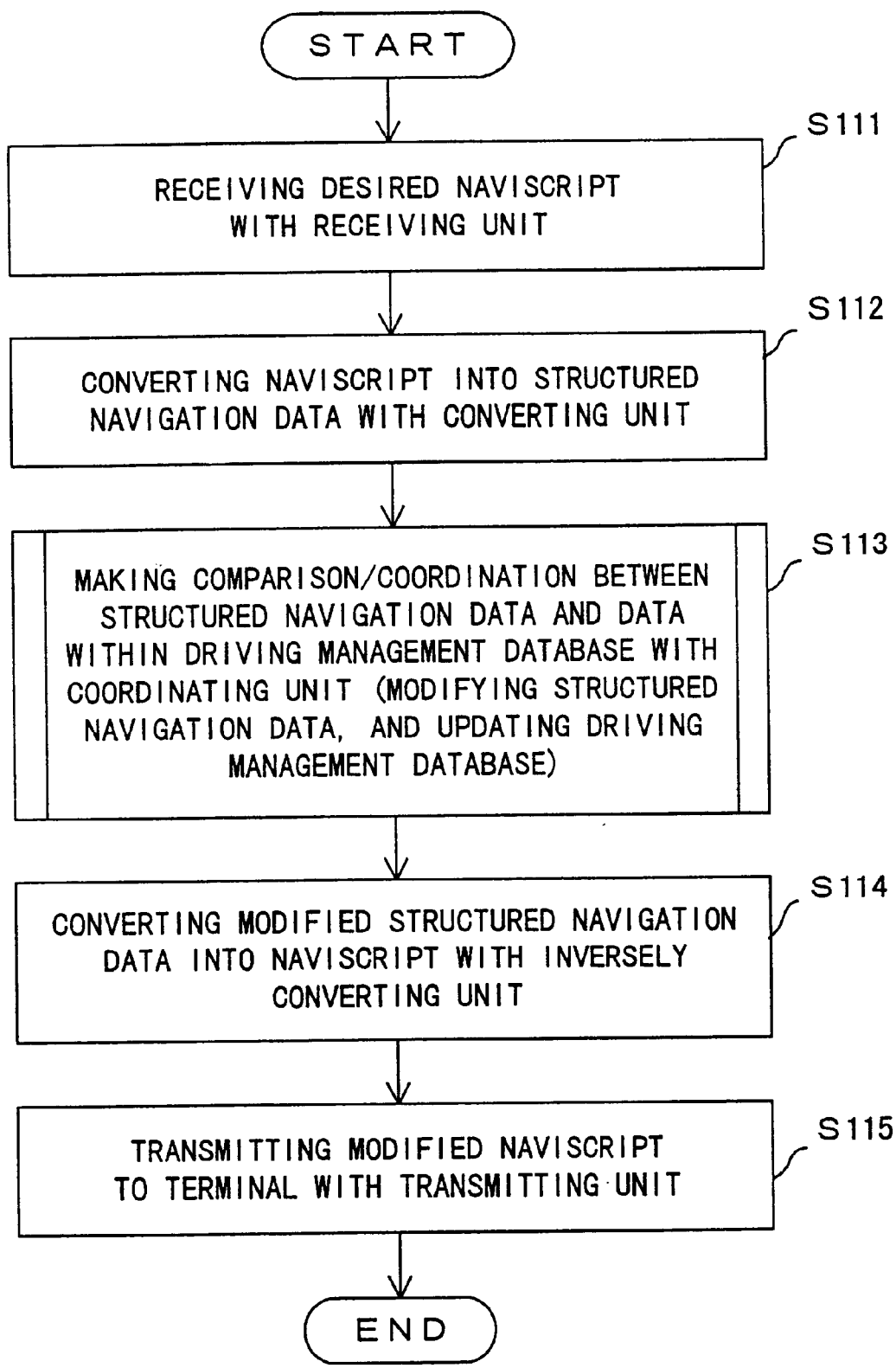
FIG. 25 is a flowchart showing the process performed by a driving managing center.

FIG. 25 shows the flow of the process performed by a driving managing center when the present invention is applied to the driving managing system. The driving managing center 1000 receives a naviscript that a user desires from the terminal 1010 with the receiving unit 1001 (step S111), and the converting unit 1002 converts the received naviscript into structured navigation data (step S112). The coordinating unit 1003 makes a comparison/coordination between the structured navigation data and the data stored in the driving management database 1004. The coordinating unit 1003 then modifies the structured navigation data according to the result of the comparison/coordination, and updates the data stored in the driving management database depending on need (step S113). The inversely converting unit 1005 inversely converts the coordinated structured navigation data into a naviscript (step S114). The transmitting unit 1006 then returns the naviscript to the terminal 1010 (step S115).

Figure 26:
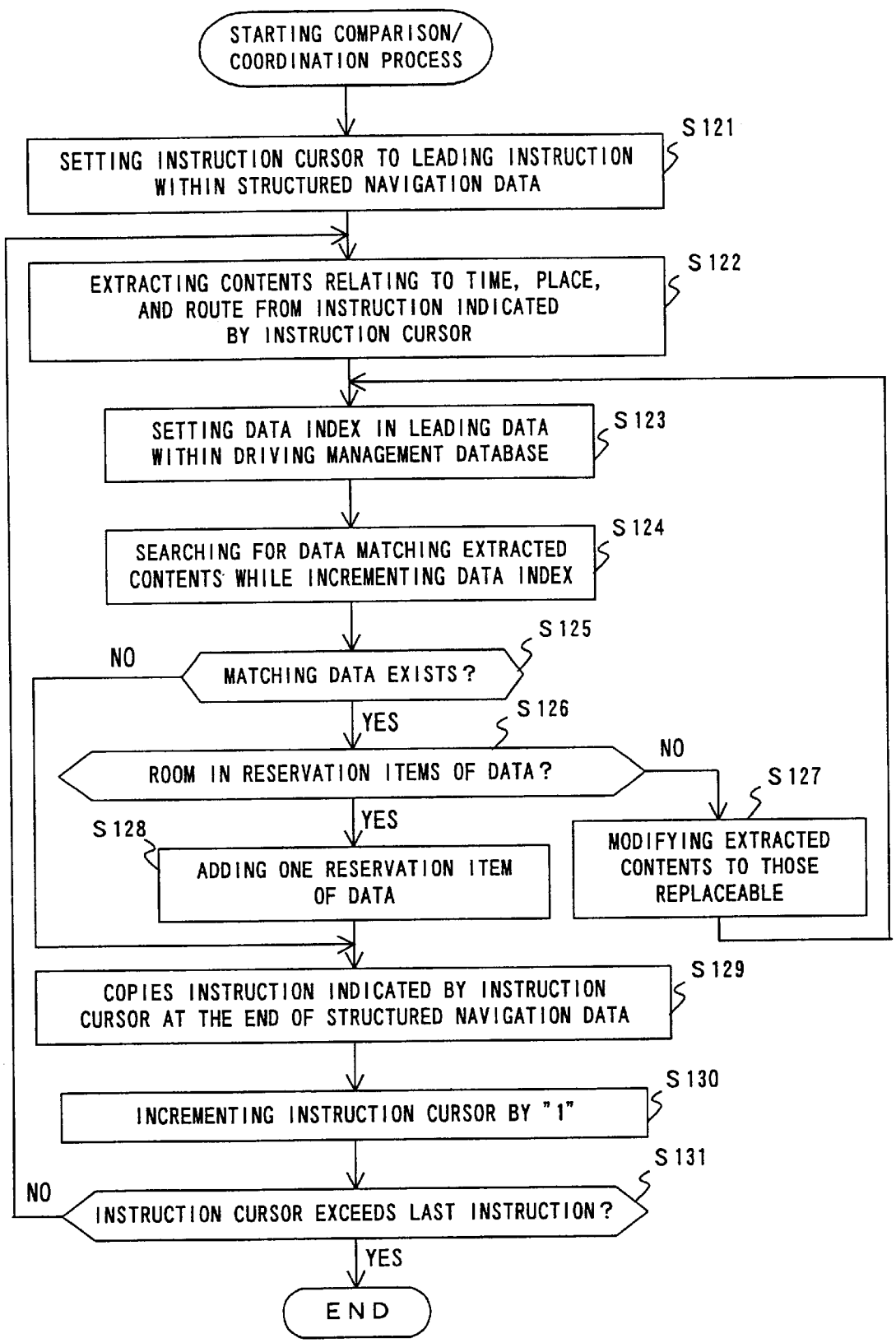
FIG. 26 is a flowchart showing the comparison/coordination process performed by the driving managing center.

FIG. 26 shows the flow of the comparison/coordination process (step S113 of FIG. 24) performed within the driving managing center 1000. The coordinating unit 1003 sets the instruction cursor to the leading instruction of structured navigation data (step S121), and extracts the contents relating to time, a place, and a route from the instruction indicated by the instruction cursor (step S122).

The coordinating unit 1003 sets a data index in the leading data within the driving management database 1004 (step S123), and retrieves the data matching the contents extracted from the instruction while incrementing the data index (step S124). The coordinating unit 1003 determines whether or not matching data exists (step S125). If the coordinating unit 1003 determines that matching data exists, it further determines whether or not there is a room in reservation items of the data (step S126). If the coordinating unit 1003 determines that there is no room in the reservation items, it modifies the extracted contents to those replaceable (step S127). The process then goes back to step S123. If the coordinating unit 1003 determines that there is a room in the reservation items, it adds one more reservation item of the data (step S128), and copies the instruction indicated by the instruction cursor at the end of the modified structured navigation data (step S129). If no matching data exists in step S125, the process goes to step S129.

Next, the coordinating unit 1003 increments the instruction cursor by 1 (step S130), and determines whether or not the instruction cursor exceeds the last instruction (step S131). If the instruction cursor does not exceed the last instruction, the process goes back to step S122. If the instruction cursor exceeds the last instruction, the process is terminated.

As described above, the present invention is applied to a driving managing system, so that naviscripts are transmitted/received between the driving managing center 1000 and the terminal 1010. As a result, itinerary/route data for reservations in various driving managing systems and point/route data for navigation in various point/route navigating devices can be made common. Additionally, the driving managing center 1000 makes coordination between a naviscript, which is desired by a user and transmitted from the terminal 1010, and the driving data managed by the driving management database 1004, and returns the coordinated naviscript. Consequently, the user can utilize the navigation information in which various items of driving management information are reflected. Namely, the following effects can be promised by applying the present invention to the driving managing system.

(a) The itinerary/route data for reservations in various driving managing systems and the point/route data for navigation in various point/route navigating devices can be made common.

(b) Since a naviscript is text data that can be described by using a combination of a name which can identify the type of each information and the contents thereof, it can be easily read, written, retrieved, and processed.

(c) Anybody can provide and utilize a naviscript by using a network or an electronic medium anywhere at any time.

(d) Both actual navigation at a moving site and simulated navigation at a user home or company can be made.

Example of Applying the Present Invention to a Time Coordinating System During a Move Provided next is the explanation about an example of applying the present invention to a time coordinating system during a move.

A conventional navigation system or scheduler, etc. never automatically proposes a method for coordinating time. When a user cannot move on schedule, he or she must manually retrieve a state or information to reset the schedule.

Assume that a user must move to a point A by a time T so as to attend the meeting held at the point A. In this case, if there is a device which proposes or warns the user each time by automatically determining whether or not the user can walk from the current point C to the point A in time at a normal pace or at a quick pace, or whether or not the user cannot walk to the point A in time even at a quick pace, etc., it is very helpful to the user. By applying the present invention to such a time coordinating system during a move, the above described objective can be achieved. Namely, a new schedule can be proposed to a user or a schedule can be automatically reset by automatically retrieving a state or information.

Figure 27:
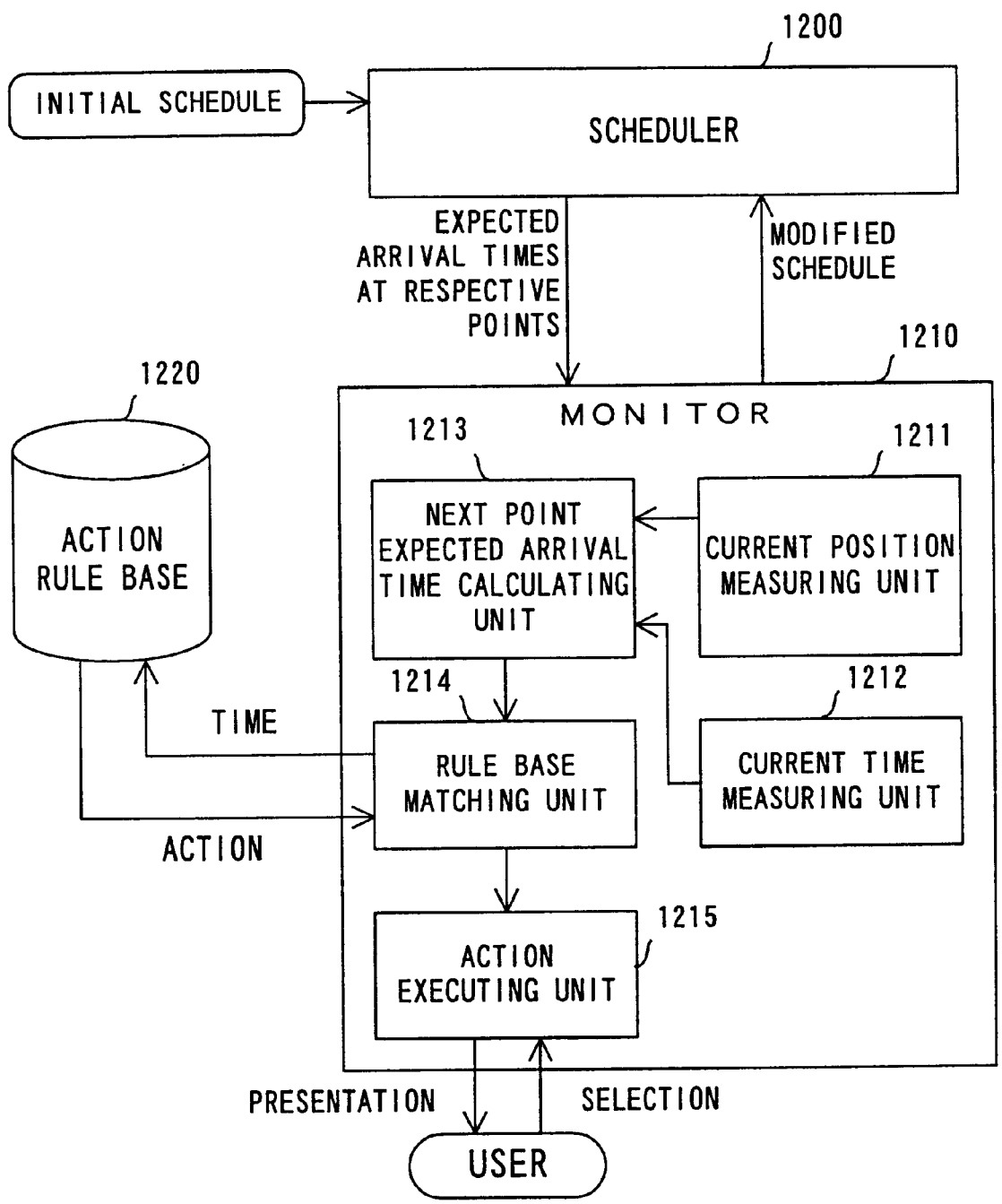
FIG. 27 exemplifies the system configuration in the case where the present invention is applied to a time coordinating system during a move.

FIG. 27 exemplifies the configuration of the time coordinating system during a move, to which the present invention is applied. This system comprises a scheduler 1200 for managing an action timetable based on a schedule described by a naviscript; an action rule base 1220; and a monitor (monitoring/executing device) 1210 for monitoring a current position/time, and for presenting/executing an action of a rule if the rule matching the action rule base 1220 exists. An action to be executed is described according to whether or not there is enough time before an arrival time in the action rule base 1220.

The scheduler 1200 calculates expected arrival times at respective points from a current place to a destination based on an input schedule. The monitor 1210 comprises a current position measuring unit 1211 for measuring the current position of a user; a current time measuring unit 1212 for measuring a current time; a next point expected arrival time calculating unit 1213 for calculating an expected arrival time at each point from the current point; a rule base matching unit 1214 for making a matching between the expected arrival time at the next point and rules within the action rule base 1220; and an action executing unit 1215 for executing an action to be executed by a user according to a corresponding rule (depending on whether or not the user reaches by an expected arrival time).

The flow of the process performed by this system is explained below. First of all, assume that:

the information at an "i"th point is point_{i};

a move method from the "i"th point to an "i+1"th point is means_{i, i+1};

an expected arrival time at the "i+1"th point is time_{i+1}; and a flag for setting the speed of the move method to a normal speed (normal-speed) or a maximum speed (max-speed).

Also assume that:

the information at a current point is point_{now}, which exists between point_{i} and point_{i+1} without losing generality;

the move method from the current point to the "i+1"th point is means_{now, i+1}; and an expected arrival time at the "i+1"th point is time_{i+1,speed} based on the assumption that the speed of the move method is "speed".

The scheduler 1200 inputs as an initial schedule the information at respective points, the move method to the respective points, the current time (initially, the time at the first point (departure place)), and the speed of the move method (normal/maximum). For example, if a move method is walking, the normal speed of the move method is a speed at which a user walks at a normal pace, while the maximum speed is a speed at which the user walks at a quick pace. If the move method is a train or a bus, there is no need to make a distinction between the normal and the maximum speeds.

The information that the scheduler 1200 inputs as the initial schedule is as follows.

point_{1}, point_{2}, . . . , point_{n}, means_{1,2}, means_{2,3}, . . . , means_{n−1,n}, time_{1}, . . . , time_{j}, . . . , time_{k}, . . . speed where time {1} indicates that a departure time is specified, and time_{j} and time_{k} respectively indicate that the arrival times at the "j"th and "k"th points are specified. The scheduler 1200 calculates the expected arrival times at unspecified points among those at the respective points from a departure place to a destination, and transmits the calculated times to the monitor 1210. Namely, the following times are transmitted in this case.

time_{2}, time_{3}, . . . , time_{n}

The initial schedule may sometimes be modified by the monitor 1210. If an input schedule is that modified by the monitor 1210, the input of the scheduler 1200 includes the information about the respective points from a current point to a destination, a move method to the respective points, the current time, the speed of the move method. Namely:

point_{now}, point_{i+1}, . . . , point_{n}, means_{now,i+1}, means_{i+1,i+2}, . . . , means_{n−1,n}, time_{now}, speed The output of the scheduler 1200 includes expected arrival times.

time_{i+1}, time_{i+2}, . . . , time_{n}

The monitor 1210 obtains the current time and point (here, the current point is assumed to be point_{now} existing between point_{i} and point_{i+1}) at predetermined time intervals, at predetermined distance intervals and/or for predetermined places with the use of the current time measuring unit 1212 and the current position measuring unit 1211.

The next point expected arrival time calculating unit 1213 calculates an expected arrival time time_{i+1,normal-speed} when the speed of a move method is normal, and an expected arrival time time_{i+1,max-speed} when the speed of the move method is maximum, from the current point to the next point based on the information of the current time and point.

The rule base matching unit 1214 makes a matching between the expected arrival time at the calculated normal/maximum speed and the rules within the action rule base 1220, and extracts a matching rule. The action executing unit 1215 executes the action described in the extracted rule in accordance with the rule.

An example of the rules stored in the action rule base 1220 is provided below.

```
if (time_{i+1,normal} <= time_{i+1})
    action(output(Well ahead of schedule))
if (time_{i+1,max} <= time_{i+1} < time_{i+1,normal})
    action(output(Behind schedule unless going faster))
if (time_{i+1} < time_(i+1,max})
    action(output(Behind schedule));
        ask($1:Rescheduling at normal speed?;
            $2:Rescheduling at maximum speed?;
            &3:Canceling this schedule?);
        if ($1) action(schedule(point_{now},  ...,
                point_{n},
                means_{now, i+1 },  ...,
                means_{n−1, n},
                time_{now},
                normal-speed));
        if ($2) action(schedule(point_{now},  ...,
                point_{n},
                means_(now, i+1},
                means_{n−1, n},
                time_{now},
                max-speed));
        if ($3) action(clear-schedule);)
```

The contents of this rule indicate as follows. If a user moves from the current point to the next point at a normal speed and if the user reaches the next point well ahead of schedule, the action executing unit 1215 displays the message "Well ahead of schedule" on a display screen, etc. based on the action specified by the corresponding rule, and/or vocally outputs the message.

If the user can reach the next point by the expected arrival time not at the normal speed but at the maximum speed, the action executing unit 1215 displays and/or vocally outputs the message "Behind time unless going faster".

Additionally, if the user cannot reach the next point even at the maximum speed, the action executing unit 1215 displays the message "Behind schedule", and further displays an inquiry message for prompting the user to select a coordination method after that. The inquiry messages used in this example are menus making the following inquiries.

"Rescheduling at a normal speed?",
"Rescheduling at a maximum speed?,
"Canceling this schedule?"

If the user selects the message "Rescheduling at a normal speed", the action executing unit 1215 modifies the subsequent schedule, and transmits the modified schedule to the scheduler 1200. The scheduler 1200 calculates the expected arrival times at the respective points from the current point to the destination at the normal speed based on the modified schedule, and returns the calculated times to the monitor 1210. In this case, the expected arrival time at the destination is behind the initial schedule.

If the user selects the message "Rescheduling at the maximum speed", the action executing unit 1215 modifies the subsequent schedule to that at the maximum speed, and transmits the modified schedule to the scheduler 1200. The scheduler 1200 calculates the expected arrival times at the respective points from the current point to the destination at the maximum speed, and returns the calculated times to the monitor 1210.

If the user selects the message "Canceling this schedule", the action executing unit 1215 clears the schedule information, and cancels the schedule.

FIG. 28 exemplifies the display screen of the monitor 1210. This display screen displays scheduled en-route spots and their expected arrival times, a move method, a map, etc. according to the schedule, and also indicates the point at which a user currently stays. The user is currently moving from Nakameguro Station of the subway to Nakameguro Station of the Tokyu Toyoko Line according to the move schedule from Makuhari Building to the Kawasaki Plant, which is shown in FIG. 28. Also the current time in this situation is displayed. Although the user is scheduled to take the train which starts from Nakameguro Station of the Tokyu Toyoko Line at 9:34 in this case, it is evident at the current time point (9:40) that the user should miss the train. Therefore, a message indicating that the user is not in time at the next point (the train starting from Nakameguro Station at 9:34) is displayed on the screen according to the corresponding rule within the action rule base 1220.

Figure 29:
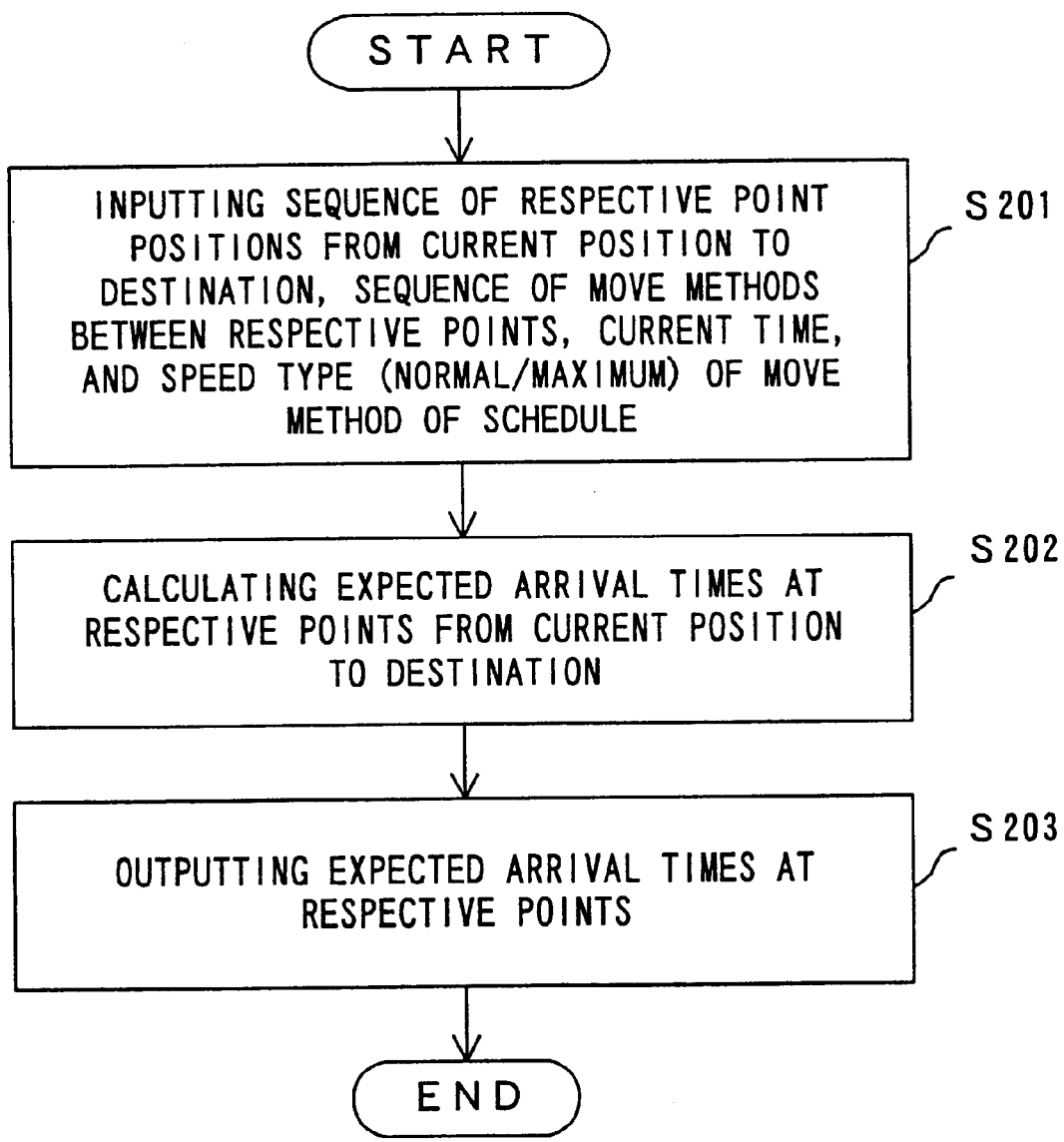
FIG. 29 is a flowchart showing the process performed by a scheduler.

FIG. 29 shows the flow of the process performed by the scheduler 1200. The scheduler 1200 inputs a sequence of positions of the respective points from the current point to the destination of the schedule, a sequence of move methods between the respective points, the current time, and the speed types (normal/maximum) of the move methods (step S201). The scheduler 1200 calculates expected arrival times at the respective points from the current point to the destination (step S202), and outputs the expected arrival times at the respective points (step S203).

Figure 30:
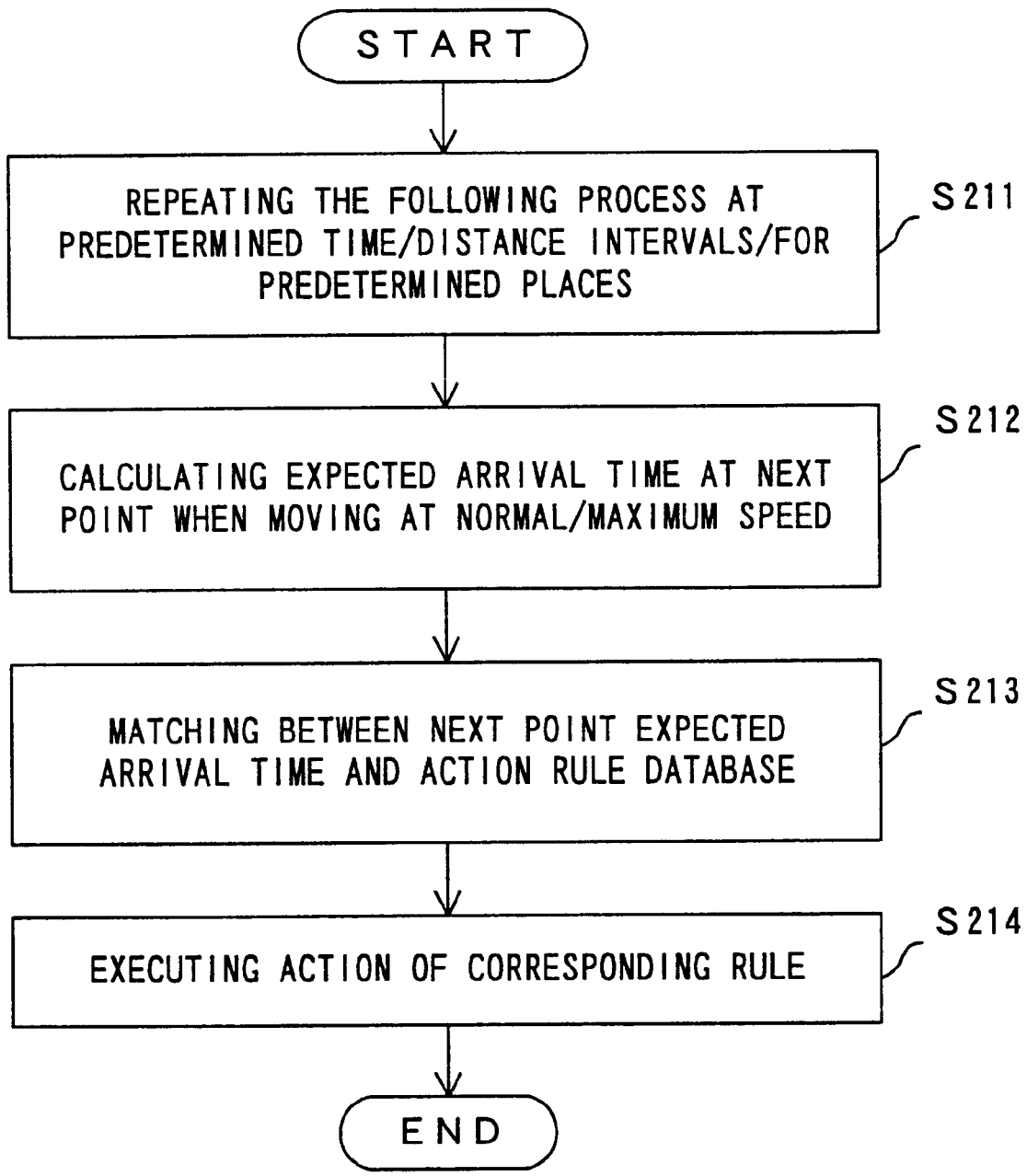
FIG. 30 is a flowchart showing the process performed by a monitor.

FIG. 30 shows the flow of the process performed by the monitor 1210. The monitor 1210 repeats the operations performed in steps S212 to S214 at predetermined time intervals, at predetermined distance intervals and/or for predetermined places (step S211). The monitor 1210 calculates the expected arrival time at the next point in the case that a user moves at a normal and a maximum speed (step S212). The monitor 1210 then makes a matching between the expected arrival time at the next point and the rules within the action rule base 1220 (step S213), and executes the action of the corresponding rule (step S214).

Navigation Plan Creating and Information for Guidance Managing System

The method for creating a naviscript was described earlier. Provided below are the explanations about a method for managing various guidance data (information items for guidance) corresponded to points or times, and a method for making a combination of information items for guidance (hereinafter referred to as a navigation plan).

Conventionally, there are several systems for creating a navigation route to a destination. For example, with a car navigation system, route navigation is created based on the map information such as a distance, an intersection name, etc. that the map itself originally possesses, when a destination is specified. However, there was no navigation system which creates route information including the explanatory information about shops, hotels, sightseeing facilities, etc. are created. As is often the case, however, navigation information such as sightseeing information, route information, etc. are demanded.

Additionally, a number of information databases relating to shops, hotels, and sightseeing facilities conventionally existed. However, most of them classify their information into categories, so that the information are not managed in an effective form of implementing route navigation. Since required contents of information for guidance like sightseeing information, etc. vary depending on a season or an attribute of a person receiving the information for guidance, it is desirable to easily create information for guidance or a navigation plan, which corresponds to the attribute. Therefore, a system which efficiently and easily creates a navigation plan such as a sightseeing navigation plan, a route navigation plan, etc., and a system which manages the information for guidance for creating the navigation plan are demanded.

With this system, for example, a user sets the route of a sightseeing tour by himself, and obtains the information for guidance corresponding to the attribute of the user at the respective points on the arbitrarily set route, from the navigation information database managing the information for guidance like an explanation of a tour conductor, so that the user can create a navigation plan. Additionally, the created navigation plan is executed by the user portable terminal while the user actually moves on the route, so that the user can enjoy the sightseeing of the individual tour plan even if a tour conductor does not attend.

Additionally, with the conventional car navigation system, navigation such as "Turn to the left 300 m ahead", "Turn to the right at ○○ Intersection", etc. based on map information is performed, which is less natural and less understandable than the navigation made by a man in some cases. As a route navigation plan, not map information such as an intersection name, etc. but navigation information using a landmark such as a building, a signboard, etc., for example, "Turn to the left after passing through a big ΔΔ signboard" is adopted, so that the route navigation similar to that made by a man, which is natural and understandable, can be easily created.

FIG. 31 exemplifies the configuration of the navigation plan creating and information for guidance managing system. This system comprises a navigation plan creating device 1300 and an information for guidance database managing device 1310.

The information for guidance database managing device 1310 manages an information for guidance database 1311 storing information for guidance attached to a point or time in map data, a schedule, a timetable, a calendar, etc. and a navigation plan.

The navigation plan creating device 1300 comprises: an information for guidance attaching unit 1301 for attaching information for guidance to map/schedule data stored in the information for guidance database 1311 and for making an association between them; a condition setting unit 1302 for setting a condition such as a time period during which information for guidance is valid, a valid attribute, etc; a route setting unit 1303 for setting a route of a navigation plan; an information for guidance extracting unit 1304 for extracting information for guidance required for a navigation plan from the information for guidance database 1311; and a navigation plan creating unit 1305 for creating a navigation plan based on the extracted information for guidance.

A terminal 1320 comprises: a navigation plan executing unit 1321 for executing a received navigation plan according to a user point/time; a presenting unit 1322 for presenting navigation information to the user; current point obtaining unit 1323 for obtaining the current point of the user; and a time measuring unit 1324 for obtaining current time. The terminal 1320 is, for example, a car navigation device, a PC, a PDA, a PHS, a PDC, etc.

Figure 32:
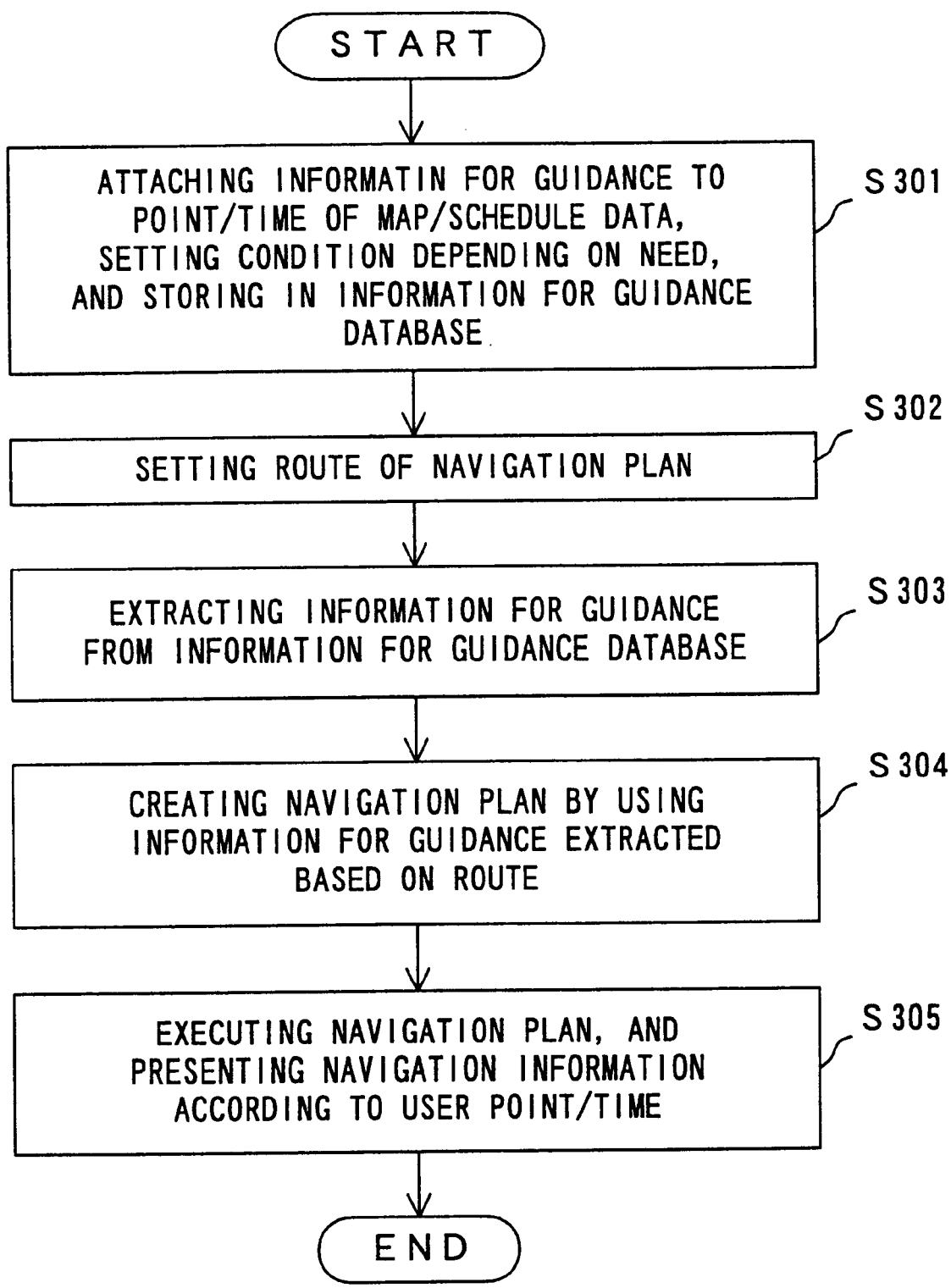
FIG. 32 is a flowchart showing the process for creating a navigation plan.

FIG. 32 summarizes the flow of the processing performed by this system. The information for guidance attaching unit 1301 attaches information for guidance to a point/time of map/schedule data. Here, "attach" means that information for guidance is associated with a particular point on a screen such as a map, a schedule, a calendar, etc. As occasion demands, the condition setting unit 1302 sets a time condition such as a time period during which attached information for guidance is valid or an attribute condition such as a user type, etc., and stores a set condition in the information for guidance database 1311 (step S301).

The route setting unit 1303 sets a route of a navigation plan. To set a route, points/areas to be included in the route are selected on the map data displayed on a display device, etc., and time/attribute conditions of a navigation plan are further set (step S302).

The information for guidance extracting unit 1304 extracts from the information for guidance database 1311 the information for guidance corresponding to the points/areas and the time/attribute conditions, which are set for the route of the navigation plan (step S303), and the navigation plan creating unit 1305 creates a navigation plan by using the extracted information for guidance based on the set route (step S304). The terminal 1320 executes the created navigation plan and presents the navigation information according to the user point or time (step S305).

Figure 33A:
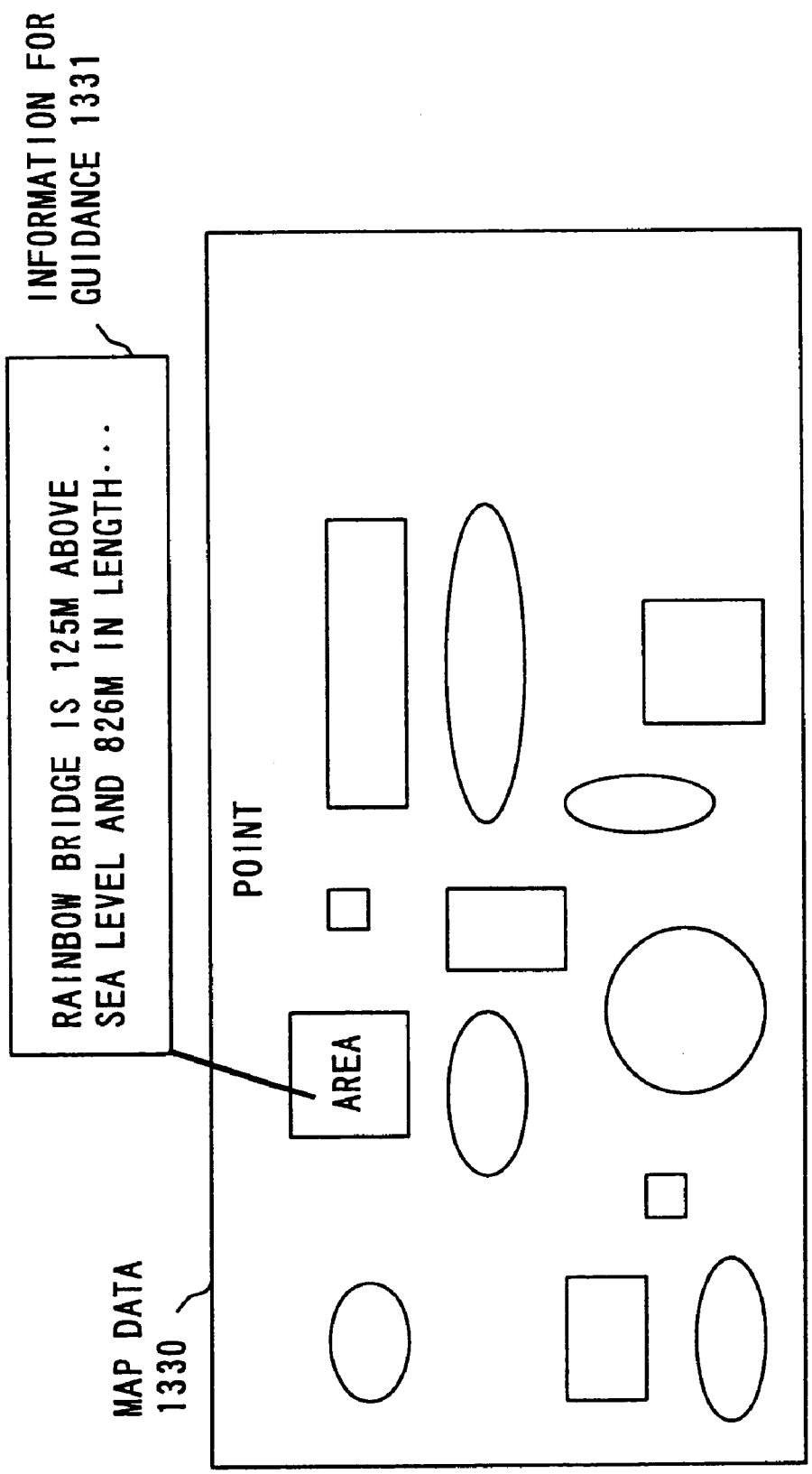
FIG. 33A shows the process for attaching navigation information to map data.

FIGS. 33A and 33B exemplify the process for attaching navigation information. Graphic areas such as rectangles, ellipses, etc. indicate ranges where information for guidance are valid, and can be arbitrarily set by a user.

The point to which information for guidance is attached is specified by designating the point and area represented as a graphic such as a rectangle, an ellipse, etc. on the screen displaying the map data 1330 as shown in FIG. 33A, by designating a facility object such as a building, a road, etc. on a map, or by directly describing the place in a naviscript, etc. For example, a range where the Rainbow Bridge is seen is set as a rectangle on the map data 1330, and the information for guidance 1331 of the Rainbow Bridge is attached thereto. Additionally, as shown in FIG. 33B, a time slot of the schedule data 1341 in the form of one day is specified, and the information for guidance 1342 and 1343 are attached thereto. Or, a date (one or a couple of dates) of the schedule data 1344 in the form of one month is specified, and the navigation information for guidance 1345 is attached thereto.

Figure 34:
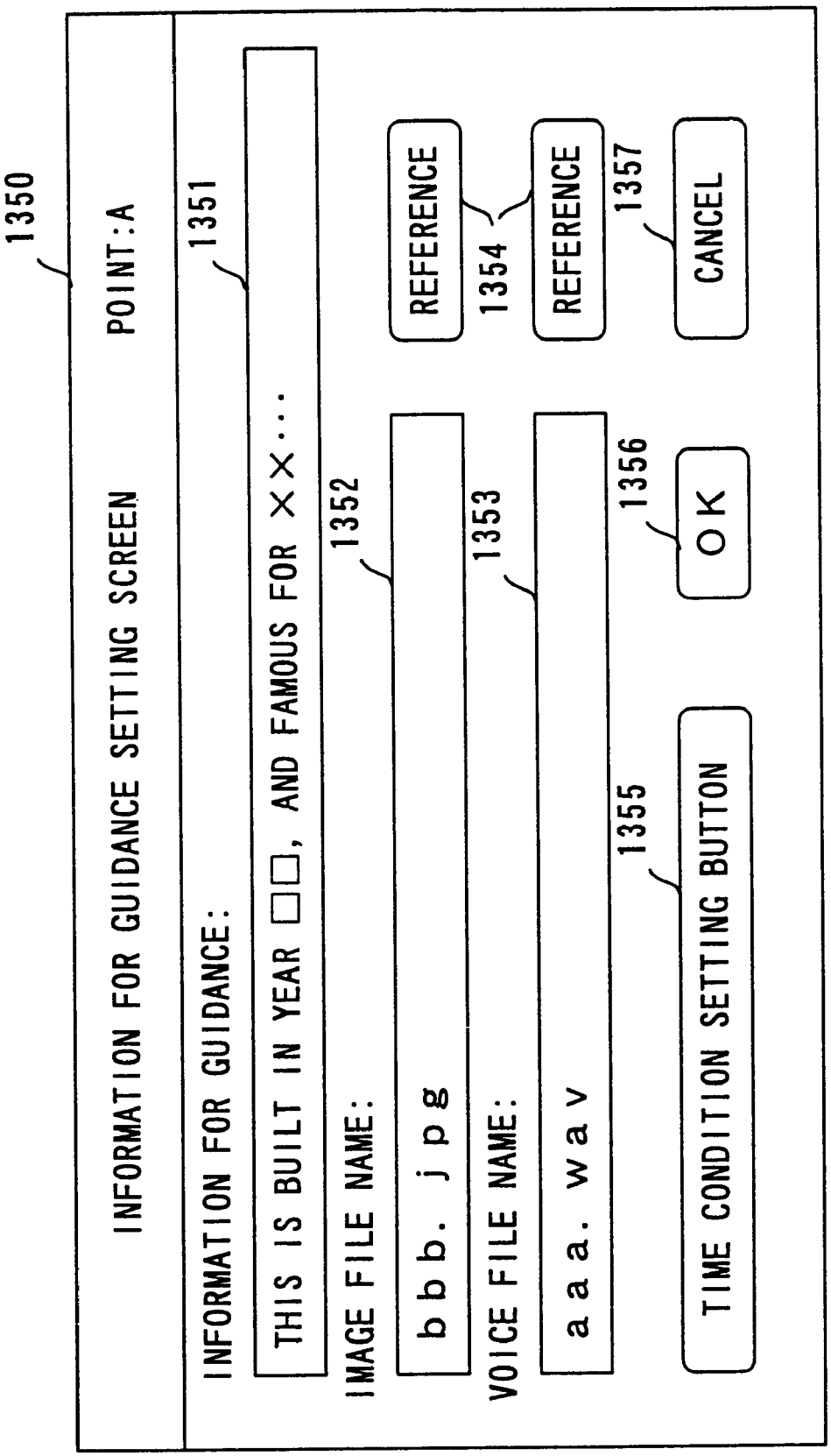
FIG. 34 exemplifies a navigation information setting screen.

Specifically, assuming that a point A is specified on the map data displayed on a display device, the information for guidance setting screen shown in FIG. 34 is displayed by the information for guidance attaching unit 1301. The information for guidance setting screen 1350 includes an information for guidance input field 1351 for directly inputting information for guidance, an image file name input field 1352 for inputting the name of a file to be used if information for guidance is image data, a voice file name input field 1353 for inputting the name of a voice data file, a reference button 1354 for referencing a specified file, a time condition setting button 1355 for setting a time condition, etc., an OK button 1356, and a cancel button 1357.

The contents of attached information for guidance are sightseeing navigation information, for example, "This was built in the year □□, and is famous for XX . . . ", etc. The information for guidance may be directly input from the information for guidance input field 1351, the information created by a travel agent may be used, or the information for guidance may be input by specifying its file name. Furthermore, voice or image information may be attached in addition to text data. In this case, a required file name (such as "bbb.jpg", "aaa.wav", etc.) is specified in the image file name input field 1352 or the voice file name input field 1353. Such information for guidance is created also for other specified points or areas in a similar manner.

If a time restriction is imposed on information for guidance, the time condition setting button 55 is clicked to start up the condition setting unit 1302. Then, a time condition such as a time period during which information for guidance is actually presented, a date, a time period during which information for guidance is valid, etc. are set on another setting screen (not shown). Furthermore, a direction accessing the area to which information for guidance is to be attached, etc. is specified, and also a condition of presenting the information for guidance only when being accessed from a particular direction, etc. may be set.

Figure 35:
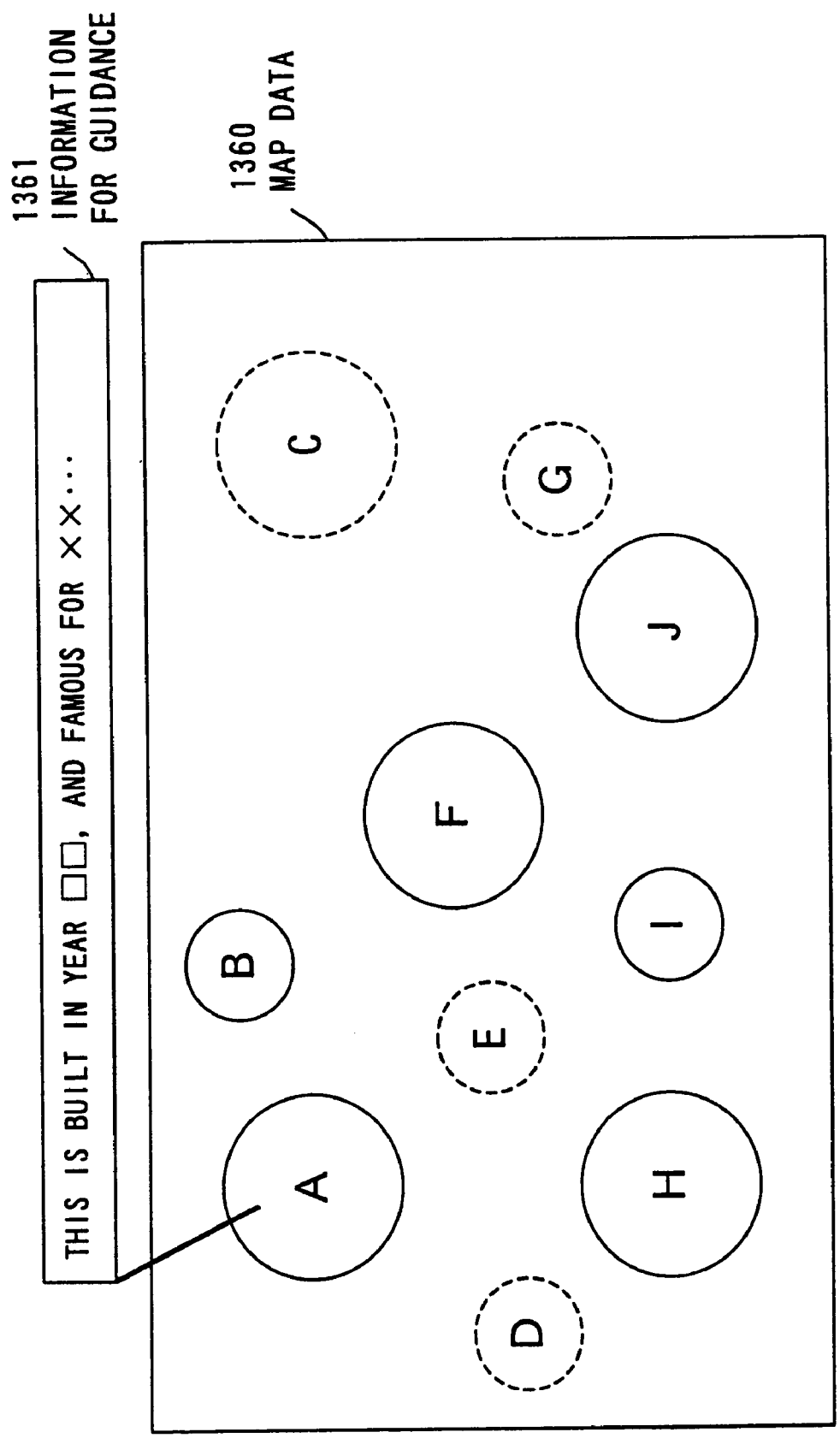
FIG. 35 exemplifies the process for attaching navigation information.

FIG. 35 shows an example of the information for guidance attachment process in the case where the information for guidance 1361 as the sightseeing navigation contents "This was built in the year □□, and is famous for XX . . . " are attached to the point A on the map data 1360.

An example where the result of the information for guidance attachment process is represented by a naviscript is provided below. The contents of the naviscript mean that the information for guidance is presented as text data "This was built in the year □□, and is famous for XX . . . " within a radius of 1 km from a point A (input and named by a user) at the latitude N35.11.11.111, the longitude E135.22.22.222, and at an address 1-1, ΔΔ, ○○ City, and the voice and the image data stored in the files "aaa.wav" and "bbb.jpg" are output. The information of the latitude, the longitude and the address of the point A may be described by obtaining the data that the map data originally hold.

```
<naviscript>
    <inst>
        <point>
            <name>      A           </name>
            <latitude> N35.11.11.111 </latitude>
            <longitude> E135.22.22.222 </longitude>
            <address>  1-1,   ΔΔ,   ○○   City
        </address>
        </point>
        <info area="1km">
            <text>This was built in the □□, and famous for XX...                          </text>
            <voice src = "aaa.wav/">
            <image src = "bbb.jpg/">
        </info>
    </inst>
```

The information for guidance attached to map or schedule data are stored in the information for guidance database

1311, and managed by the information for guidance managing device 1310. The information for guidance attached to the map or the schedule data can be displayed as a guidance sheet. By representing information for guidance as a guidance sheet, it becomes easier to verify the correspondence between the contents of attached information for guidance and map/schedule data.

Figure 36A:
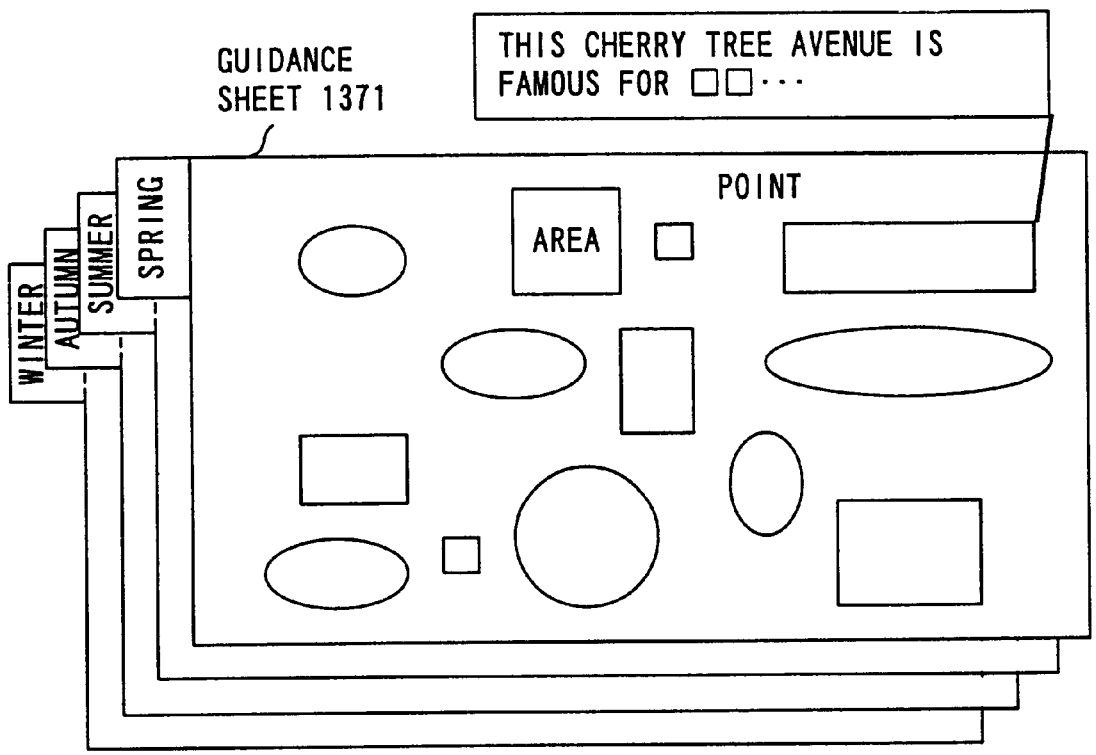
FIG. 36A shows a first example of navigation sheets.
Figure 36B:
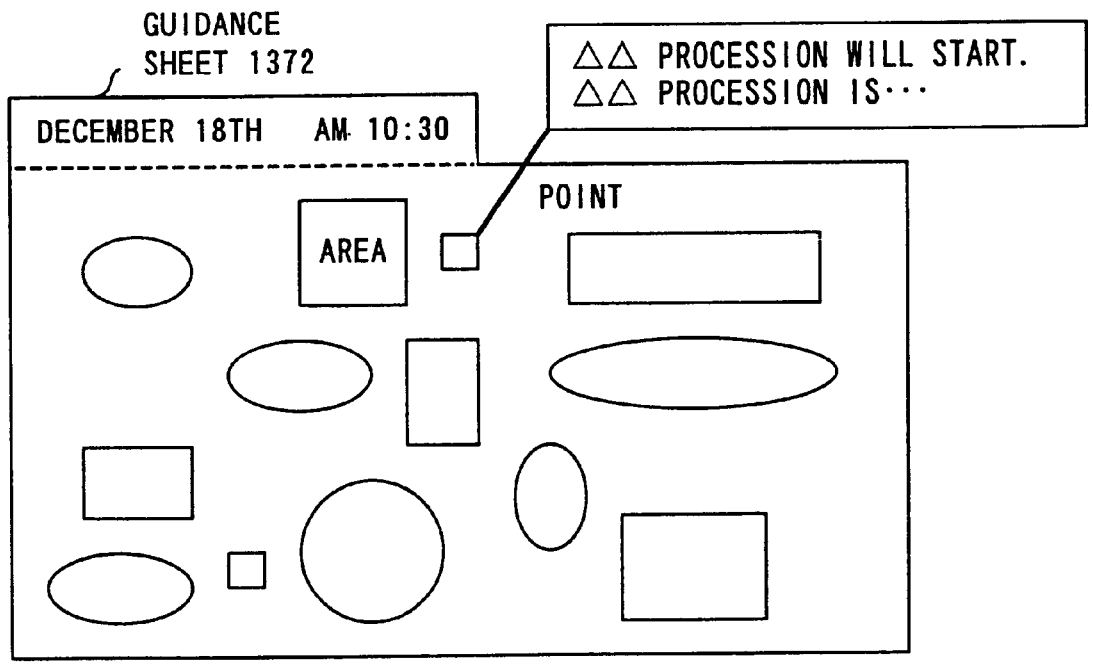
FIG. 36B shows a second example of a navigation sheet.
Figure 37:
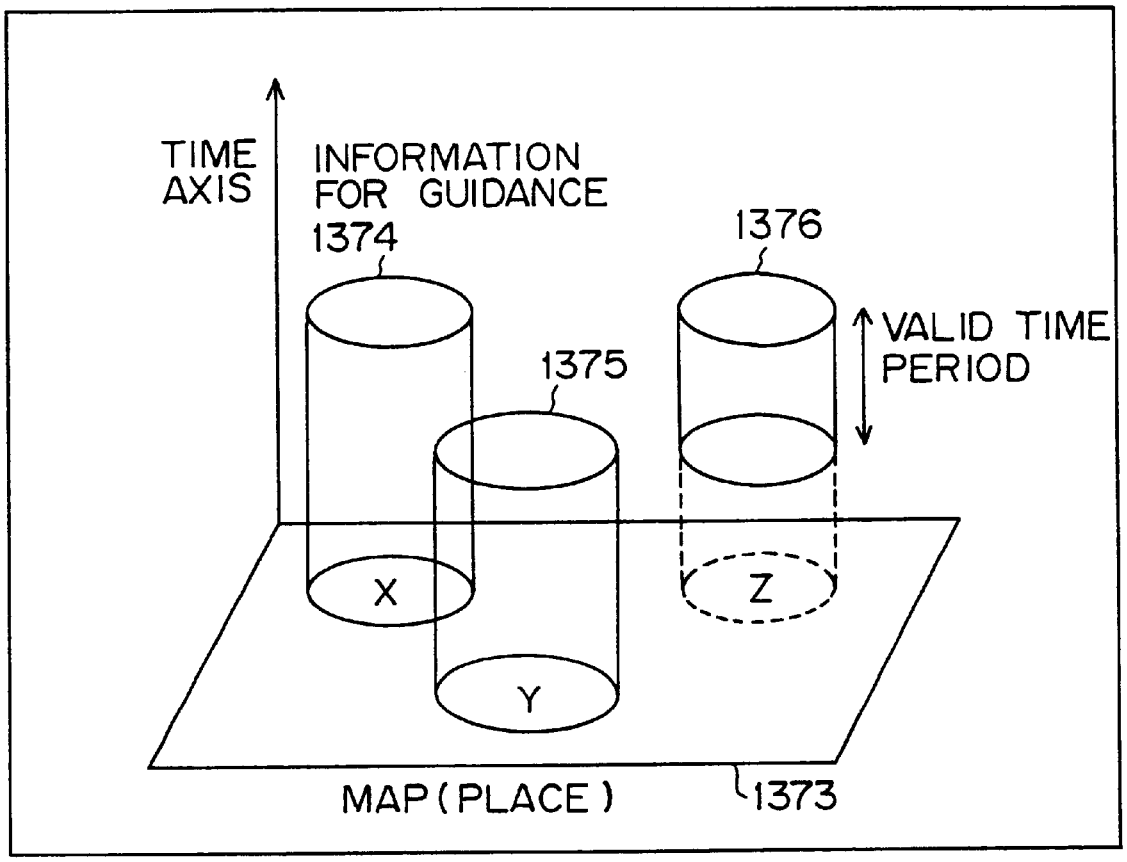
FIG. 37 exemplifies navigation information display.

FIGS. 36A and 36B exemplify guidance sheets. Guidance sheets 1371 can be displayed for the respective seasons as shown in FIG. 36A, or a guidance sheet 1372 can be displayed in a way such that the sheet varies as time elapses as shown in FIG. 36B. Additionally, a guidance sheet can be displayed for each user attribute such as age, sex, objectives, etc. Also the correspondence between the time-conditional information for guidance and a point to be attached can be displayed as a guidance sheet which represents the correspondence in a three-dimensional space including the time axis shown in FIG. 37.

When a navigation plan is created, the route setting unit 1301 first specifies a route that a user desires. The route is specified, for example, by using a method with which system automatically retrieves a route and sets the route if a departure point and a destination are specified, a method with which a user selects a point/road on a map screen with the use of a pointing device to set a route, a method for setting a route by correcting an optimum route along a line that a user draws on a map screen, etc.

Figure 38A:
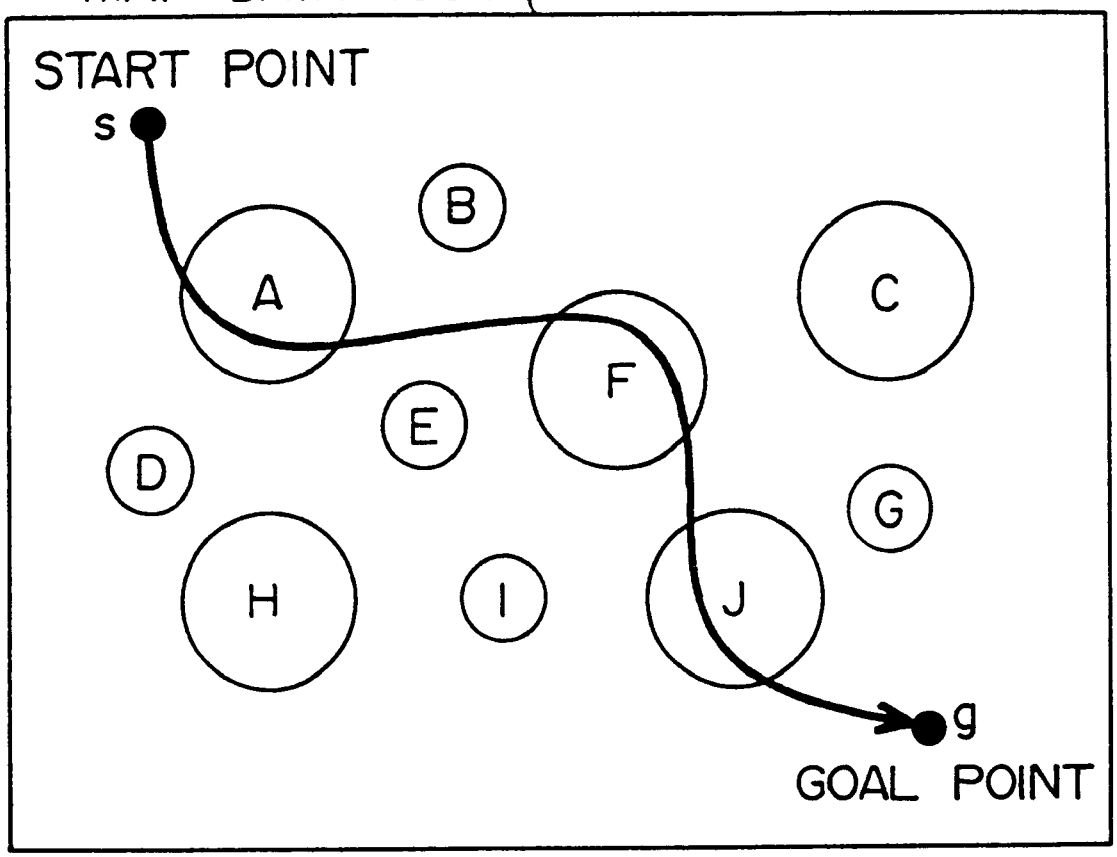
FIG. 38A shows a first example of a route.

The set route passes through some of the areas on the map data, to which the information for guidance are attached beforehand. Assume that there is map data 1380 on which information for guidance are attached to the areas including the points A to J as shown in FIG. 38A. Also assume that a user specifies the route from a start point "s" to a goal "g", which is shown in FIG. 38A in order to create a navigation plan on the map data 1380. At this time, the areas that the route passes through are A, F and J. The information for guidance extracting unit 1304 extracts the information for guidance about the areas A, F and J from the information for guidance database 1311. The navigation plan creating unit 1305 creates a navigation plan (from the start point "s" to the goal point "g" via the points A, F and J) by using the extracted information for guidance based on the specified route. Then, a naviscript is created, for example, by giving a name "AFJ Tour" to the plan.

A navigation plan is represented by a naviscript, so that the navigation plan can be delivered via a network or an electronic medium. As a result, a navigation service that anybody can utilize anywhere can be realized.

Exemplified below is a navigation plan which is created based on the route shown in FIG. 38A and represented by a naviscript.

```
<naviscript>
    <navi>
        <title>      AFJ Tour           </title>
        <category> historic spots tour </category>
        <transport>   car              </transport>
        <duration>    3 hours          </duration>
        <cost>        3,000 yen        </cost>
    <par>
        <inst>
            <point>
                <name>     A    </name>
                <latitude>N35.11.11.111</latitude>
                <longitude>   E135.22.22.222
                                  </longitude>
                <address> 1-1, ▲▲, ○○ City
                                  </address>
            </point>
            <info area="1.0km">
                <text> This was built in the □□,
        and is famous for XX...           </text>
                <voice src = "aaa.wav"/>
                <image src = "bbb.jpg"/>
            </info>
        </inst>
        <inst>
            <point>
                <name>     F    </name>
                <latitude>N35.33.33.333</latitude>
                <longitude> E135.44.44.444
                                  </longitude>
                <address> 2-2, ▲▲, ○○ City
                                  </address>
            </point>
            <info area="2.0km">
                <text> ...           </text>
                <voice src = "ccc.wav"/>
                <image src = "ddd.jpg"/>
            </info>
        </inst>
        <inst>
            <point>
                <name>     J    </name>
                <latitude>N35.55.55.555</latitude>
                <longitude> E135.59.59.999
                                  </longitude>
                <address> 3-3, ▲▲, ○○ City
                                  </address>
            </point>
            <info area="1.0km">
                <text> ...           </text>
                <voice src = "eee.wav"/>
                <image src = "fff.jpg"/>
            </info>
        </inst>
        ...
    </par>
    </navi>
</naviscript>
```

The initial portion from <title> to </cost> indicates the summary of the entire navigation plan, and the portion from <par> indicates individual navigation information. The summary is added to endow the sequence of navigation information from <par> with some meaning, and to facilitate the understanding of the sequence. By way of example, for a sightseeing tour, the contents of navigation can be known at a glance.

When the user terminal 1320 receives the navigation plan, the navigation plan executing unit 1321 executes the navigation plan according to the current point from the current point information obtaining unit 1323 and the current time from the time measuring unit 1324. The presenting unit 1322 presents the navigation information in real time.

Suppose that the information indicating that the current point of a user is within 1 km of a point F is transmitted from the current point obtaining unit 1323. In this case, the navigation plan executing unit 1321 executes the portion of the point F of the navigation plan, and presents the information for guidance about the point F to the user. Note that the information for guidance with a condition restricting execution time is not presented when the navigation plan is actually executed if the condition is not satisfied.

Additionally, the navigation plan executing unit 1321 can also simulate a created navigation plan by executing the plan independently of the information from the current point obtaining unit 1323 or the time measuring unit 1324.

By the way, a range where information for guidance is valid is sometimes specified as a point instead of an area shown in FIG. 38A. In this case, the navigation plan creating device 1300 sets an area having predetermined area in the vicinity of a specified route and extracts the information for guidance about points within the area so as to present the information for guidance attached to the points close to the specified route.

Figure 38C:
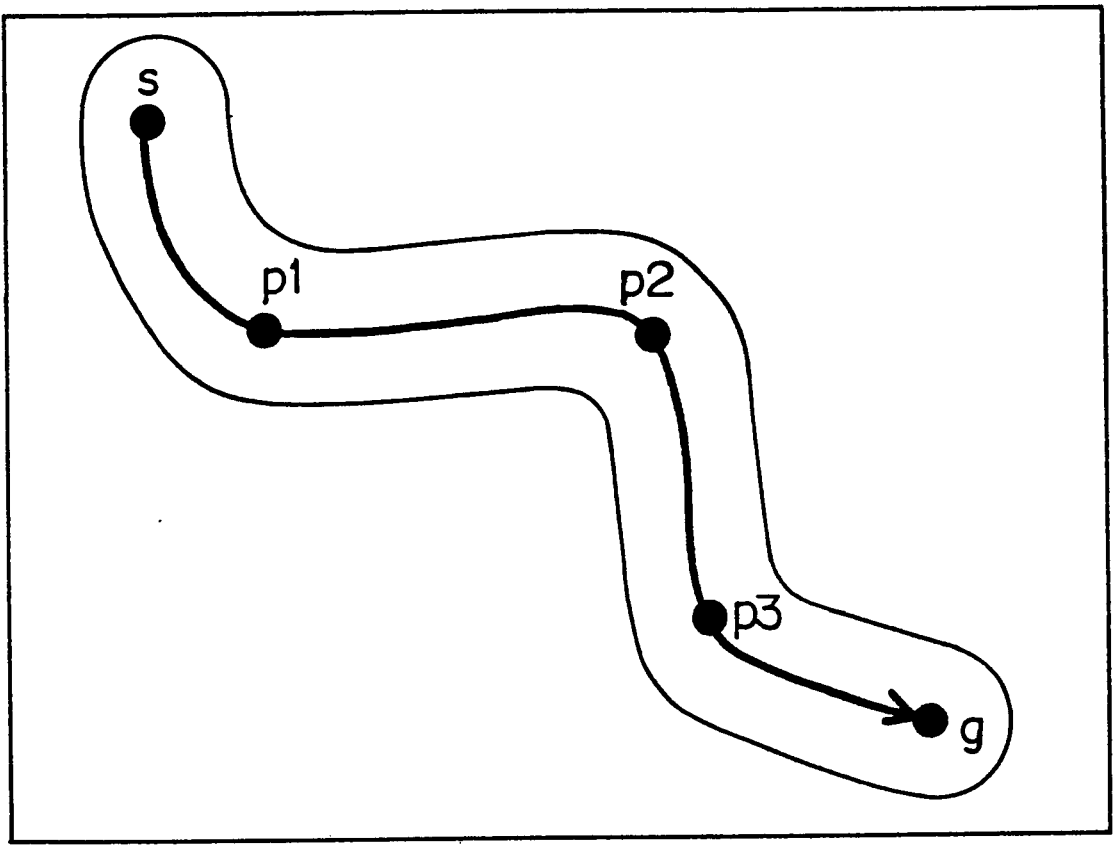
FIG. 38C shows a first expanded route.
Figure 38D:
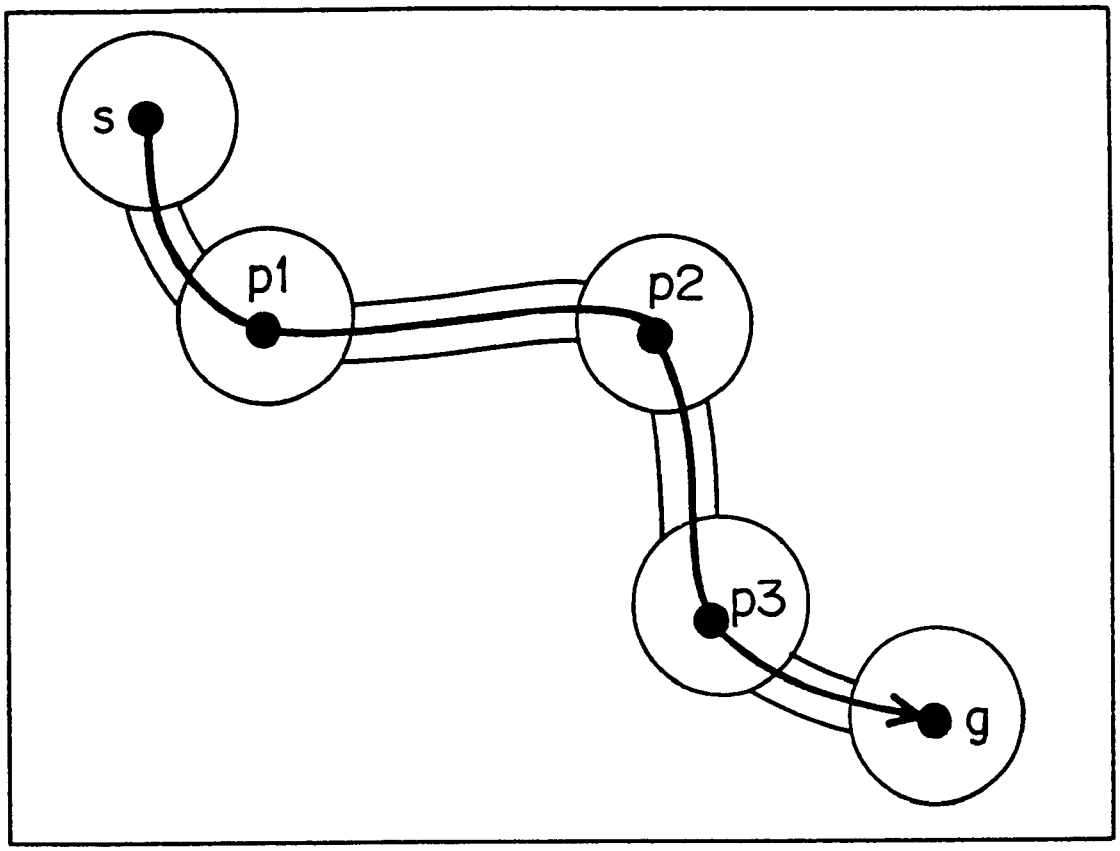
FIG. 38D shows a second expanded route.

For example, if a route from a start point "s" to a goal "g" via points p1, p2, and p3 is specified as shown in FIG. 38B, the route setting unit 1303 expands the route in its periphery as shown in FIGS. 38C and 38D.

Additionally, the information for guidance database 1311 includes a point database 1381 and a schedule database 1382, which are shown in FIG. 38E. The point database 1381 stores information for guidance such as shops 1391, restaurants 1392, parks 1393, gas stations 1394, fire hydrants 1395, etc., while the schedule database 1382 stores the information for guidance attached to schedule data.

At this time, the information for guidance extracting unit 1304 extracts from the point database 1381 the information for guidance about the points included in the area on the expanded route, and the navigation plan creating unit 1305 creates a navigation plan by using the extracted navigation information. In this way, even if information for guidance is attached to a point on a map, a suitable navigation plan can be created.

Explained next is the case where a navigation plan is used for route navigation as another use method. Assume to prepare the navigation data which are represented as a big signboard of ○○, "a big triangular building", etc. using landmarks, and attached to the points on the map data 1390 in order to make route navigation for an intersection or a branch road, in the information for guidance database 1311. Here, if a user requests the route navigation from "ΔΔ Station" to the destination shown in FIG. 39, the route setting unit 1303 creates a route, and the information for guidance extracting unit 1304 extracts information for guidance for the respective points on the route. For a point not included in the information for guidance database 1311 (a point at which no landmark exists), information for guidance is created by using the information that the map data originally possesses (an intersection name, and the like). The navigation plan creating unit 1305 creates a navigation plan by combining the information guidance and turn directions, etc.

Figure 39:
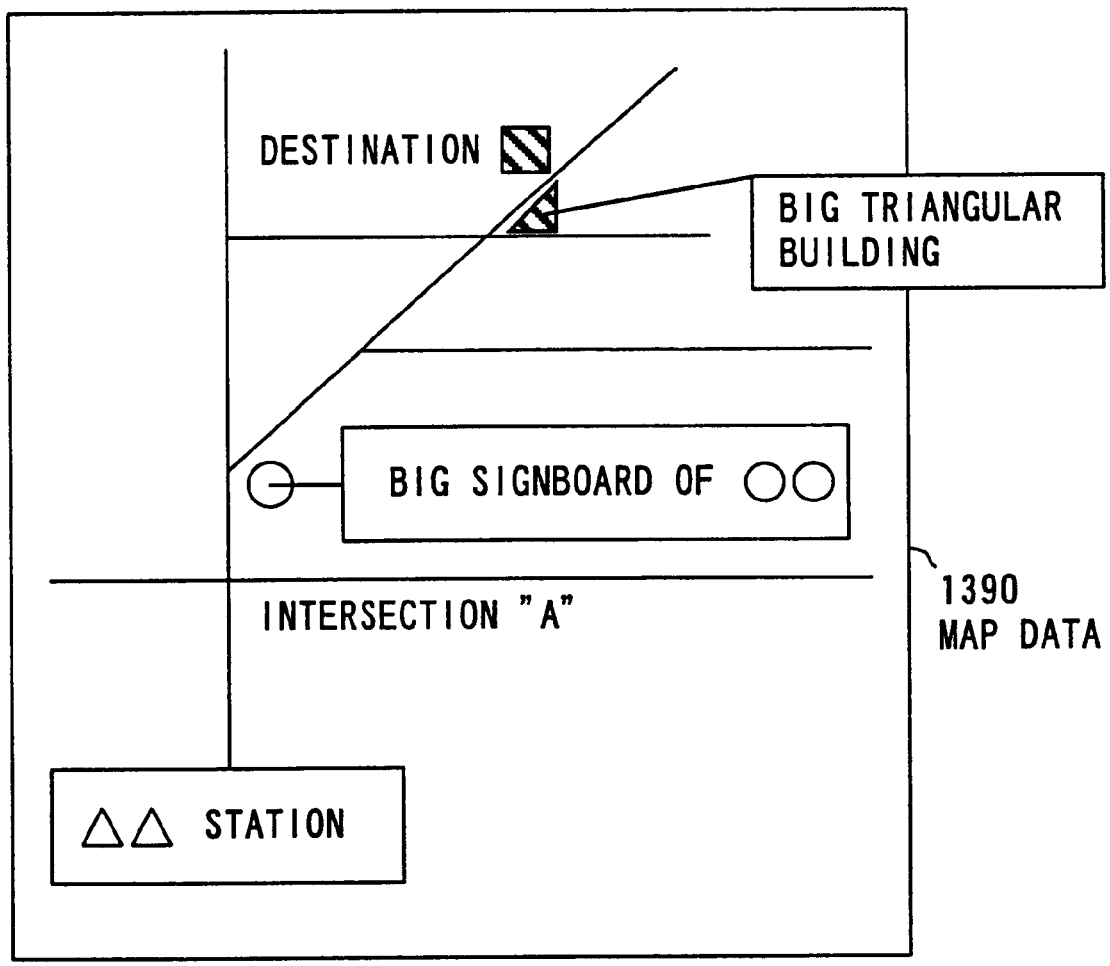
FIG. 39 exemplifies map data for route navigation.

To provide the map shown in FIG. 39 as a navigation plan, it may be sufficient to display the information guidance extracted from the information for guidance 1311, the information for guidance that the map originally possesses, and the route. To make further detailed navigation, information for guidance such as a turn direction, etc. must be added.

The user carries the terminal 1320 storing the created navigation plan, and starts to walk from the ΔΔ Station being the departure point. When being notified that the user approaches a certain point from the current point obtaining unit 1323, the navigation plan executing unit 1321 presents the information for guidance attached to the point at the corresponding point on the route. In this way, route navigation, for example, "Go straight from the Station, pass through the intersection A, proceed obliquely right at the big signboard of ○○, and pass the intersection at which the big triangular building exists, so that the destination can be found" is made by presenting the route navigation information at the respective points. As described above, not only point and intersection names as conventional, but also route navigation that a user can easily understand can be created and delivered.

Additionally, the navigation information managing device 1310 manages navigation information or navigation plans as a database, so that information for guidance or a navigation plan can be efficiently created and delivered. Furthermore, information for guidance and navigation plans are altogether managed, so that it becomes easy to retrieve, evaluate, etc. information for guidance or a navigation plan.

Specifically, the information for guidance database 1311 together stores navigation data such data requiring almost the same time or cost, routes passing through the same point, data classified according to a user attribute or a season, etc., which leads to an increase in a retrieval efficiency.

Furthermore, if a navigation plan which directly matches is not stored, a navigation plan satisfying the request is created by combining stored navigation plans. Supposing that there are navigation plans for the routes "A, B, C, D, E" and "K, L, C, X, Y, Z", a navigation plan for a route "A, B, C, X, Y, Z" is created based on the common point C. Still further, a particular navigation plan can be called by attaching a code to information for guidance or a navigation plan, and by inputting the code.

As described above, this system can easily create a navigation plan, easily access information for guidance having the contents like sightseeing navigation, and make retrieval.

System for Processing Information with a Time/Point Condition

Provided below is the explanation about a system for processing information with a time/point presentation condition.

Conventionally, when a user retrieves required information, for example, when the user retrieves the information about a certain point and restaurants close to that point, a method for making retrieval by restricting a condition with an area name, etc. based on the information list of restaurants, is normally used. Additionally, there is a method for providing information according to a user taste such as a push technique, agent technique, etc. Furthermore, there is a technique relating a portable information system for determining the point data of a user with a GPS receiver, for retrieving from a database with a retrieval key information about the data obtained by arbitrarily combining a point, orientation, proceeding direction, eye direction, speed, altitude, date, time, etc., which are obtained from the user point, and for outputting the retrieved information (Published Japanese Translation of PCT International Publication for Patent Application No. 8-510578, GPS Retrieving Apparatus). Still further, a technique for transmitting information at a particular time is general.

However, there is no system which imposes a time/point restriction on information itself as a condition of presentation, etc. of the information, and processes the information according to the presentation condition (a time/point restriction). The validity or the value of information varies depending on when and where the information is received. Therefore, if it is possible to present the information at the most effective time or point, the efficiencies of both of receiving and transmitting sides increase.

However, if a presentation condition such as a time or a point, etc. is not described in information itself, a system side must classify and arrange presentation conditions, which leads to a heavy load on a man or a system executing automatic processing. Accordingly, it is difficult to provide a service according to a suitable time or point. Additionally, if a terminal side extracts the information that a user desires to be presented from information of a large amount, it imposes a heavy operation load on the user. To automate this process, various pieces of hardware such as a time/point determining unit, a suitable information extracting unit, etc.

and software are required. Therefore, it is disadvantageous to a terminal whose memory, throughput, etc. are restricted.

This system is intended to process information with an absolute or relative time/point condition like a naviscript, and to present the information only to a user satisfying the condition.

FIG. 40 exemplifies the configuration of the system for processing information with a time/point presentation condition. This system comprises: a processing device 1400 having an information retrieving unit 1401, a target user retrieving unit 1402, a range condition processing unit 1403, a relative condition processing unit 1404, and an information transmitting unit 1405; a conditional information database 1410 for storing information with a presentation condition on which a time/point restriction is imposed; a time measuring unit 1411 for measuring time; an estimating module 1412 for estimating a time/point, which is specified relatively in a condition; various sensors 1413 for transmitting various measured values or data; a point information managing system 1415 for identifying the point of users, etc.; and a terminal 1430.

The information retrieving unit 1401 within the processing device 1400 obtains a time from the time measuring unit 1416, and retrieves the information with the condition corresponding to the time. The target user retrieving unit 1402 retrieves a target user satisfying a condition on which a point restriction is imposed based on the point information obtained from the point information managing system 1415. If a condition includes time/point range (area) specification, the range condition processing unit 1403 controls the presentation of information within the range according to the specification. The relative condition processing unit 1404 retrieves information with a condition including a relatively specified time/point, and processes the condition based on the data from the estimating module 1412 and the sensors 1413. The information transmitting unit 1405 transmits information only to a user terminal 1430 which satisfies the condition according to the condition of the retrieved information.

The terminal 1430 is, for example, a PDA, a PDC, a PHS, a car navigation system, a mobile PC, a wearable computer, a radio, etc., which comprises a presenting unit 1431 for receiving information from the information transmitting unit 1405 within the processing device 1400, and for presenting the information.

This system stores information on which a time/point restriction is imposed as a presentation condition in the conditional information database 1410, retrieves information satisfying the condition based on the time measured by the time measuring unit 1411, selects users satisfying the point restriction of the condition based on the point information from the position information managing system 1415, and presents the information to the terminal 1430 of the selected users.

As described above, by timely transmitting and presenting information to an adequate user based on a presentation condition such as a time, a point, etc. which accompanies the information, a user or a system workload can be reduced, whereby also an information provider can efficiently provide information. To be more specific, it becomes possible to efficiently provide information when transmitting news, weather, an advertisement, and leisure information such as a leisure spot, a restaurant, etc., or when performing one-to-one marketing, direct marketing, schedule management, etc.

The conditional information database 1410 stores information with a presentation condition on which a time/point restriction is imposed. The conditional information can be simply described and specified by text in a predetermined format. Or, the conditional information can be created by using a GUI in a similar manner as in the above described navigation plan creating and information for guidance managing system. Additionally, an index may be automatically created by extracting from existing information a keyword regarding a time or a point. Retrieval, management, usage are facilitated by using a particularly predetermined format like a naviscript.

Specification of a time/point restriction includes the following types.

Time specification: Presenting all of people at a specified time.

Point specification: Presenting all of people belonging to a specified place.

Time and point specification: Presenting all of people belonging to a specified point at a specified time.

For more flexible condition setting/information presentation to a user, an absolute or a relative range of a time/point is allowed to be specified.

The information stored in the conditional information database 1410 includes, for example, event information (such as a concert, a sports game, fireworks, a department store sale, etc.), restaurant information, sightseeing navigation, route navigation, facility navigation, news, weather forecast, television/radio program schedule, traffic information, horoscope, attention alert, a manual, mail, etc.

Provided below are the examples of information which a time/point restriction is imposed on and is stored in the conditional information database 1410. Here, the information are represented in the form of (presentation condition: information)

(1) Conditional Information Including Absolute Time Specification (at 7 am: Today's weather is fine and occasionally cloudy, probability of rainfall is 30% . . . ).

This is an example of the case where weather forecast is presented at 7 am.

(at 4 pm: Starting a sale for 30 minutes from now).

This is an example of the case where bargain information is presented at 4 pm.

(2) Conditional Information Including Time Range Specification (between 11 and 12: Recommended restaurant information, Specialty recommended by chef of Italian restaurant ΔΔΔΔ is Milanese rice casserole.

This is an example of the case where restaurant information is presented between 11:00 and 12:00

(until 12/20: Recommended new movie, □□□□□ starring ○○ ○○○ . . . ).

This is an example of the case where movie information is presented until December 20th.

(3) Conditional Information Including Relative Time Specification

A time restriction condition may be specified also with a relative time, for example, (3 days after information A:), (1 week after the preceding display:), (3 minutes before the arrival at a point P), etc.

(4) Conditional Information Including Time Cycle Specification (every Tuesday: nonflammable garbage day).

This is an example of information presented by a municipality every Tuesday.

(every 3 hour: refresh time).

This is an example of information presented to a user driving a car at predetermined time intervals.

Similarly, a time restriction condition can be specified by using a description such as "till", "by", "about", "in", "after", "before", "since", "as", "when", "while", "now", "then", "once", "during", "within", etc.

(5) Conditional Information Including Absolute Point Restriction Specification (latitude 36.2.5, longitude 133.33.36: This is Tokyo Station).

This is an example of information presented by specifying a point with unique determinants such as latitude, longitude, an address, etc.

(6) Conditional Information Including Point Range Restriction Specification (Between the point A and the point B: Jam percentage information between "A" and "B" is . . . ).

This is an example of information presented between the point A and the point B.

Similarly, point range specification such as (a point within a radius of 500 m from a ○○ facility:), (on a highway Δ:), etc. or range specification such as "within a city", "within a shop", "within a building", "a platform of a station", etc. can be made.

(7) Conditional Information Including Relative Time Restriction Specification

Relative specification is made by a function of a matter yet to be determined. At this time its condition is not determined when the specification is described. The condition is determined when the information is actually delivered. Examples of this type of information include (1 km before the point at which you stay at 12:00:), (within a radius of 300 m from a point at which Mr. ○○ stays:), etc.

Additionally, a point restriction condition can be specified for a movement of a relationship between a man and a point as a derivative from the range specification. Examples include (when approaching Tokyo Station: a timetable of Tokyo Station), (Within Chiba City: sightseeing navigation of Chiba Prefecture), (from Nagoya area: a correspondence table between the Nagoya dialect and the standard Japanese), (toward Hokkaido: weather of Hokkaido), (apart from Tokyo: leisure spots information), etc.

Similarly, a point restriction condition may be specified by using a description such as "at", "around", "in", "to", "from", "on", "near", "under", "above", "up", "down", "for", "toward", "apart from", "through", etc.

Note that a condition restricting the number of presentation times or the number of target people can be specified in a time or point condition. For example, specification such as (3 times by May 10:), (with a limitation of 300 persons residing in the district A: (information is transmitted to 3000 persons selected at random from among target people)), etc. is made.

Provided next is the explanation about a conditional information process. The processing device 1400 performs the following process.

(1) Process for an Absolutely Specified Condition

First of all, the information/condition retrieving unit 1401 retrieves conditional information corresponding to a time, which is measured at the predetermined time intervals by the time measuring unit 1411, from the conditional information database 1410. The predetermined time interval measured by the time measuring unit 1411 is defined to be the shortest possible time interval allowed in the process performed by the information retrieving unit 1401, or a prescribed time interval. For example, the time measuring unit 1411 notifies a time every 10 minutes, so that all the information with a specified time condition, which corresponds to this time interval (10 minutes), are retrieved. Additionally, if the retrieval process requires a considerable amount of time, conditions may not be retrieved in real time but retrieved beforehand at prescribed time intervals, and then the information with the corresponding condition may be extracted each time the corresponding time is actually reached.

The target user retrieving unit 1402 obtains the current point of users from the position information managing system 1415, and retrieves the users staying at the point satisfying the place restriction condition within the information retrieved by the information/condition retrieving unit 1401. As a method for identifying the point of a user, a system having a self-position identifying system such as a GPS, etc. is made to periodically transmit its own point, or the point information managing system 1415 of a PHS or a cellular phone, etc. can be used.

The information transmitting unit 1405 transmits the retrieved information only to the user terminals 1430 retrieved by the target users retrieving unit 1402. As a method for transmitting information to particular user terminals 1430, a method for specifying the IDs of the receiving terminals 1430 and transmitting information is generally used. However, another method for transmitting information to terminals 1430 within a particular range/area can be used, for example, by making an output adjustment such that electronic waves reach only the particular range/area in a broadcasting manner.

(2) Process for a Range Condition when a Range is Specified

If the condition that the information retrieving unit 1401 retrieves from the conditional information database 1410 includes time/point range specification, the range condition processing unit 1403 performs the process as follows.

When the information satisfying the time/point restriction condition is presented to a user terminal 1430 via the information transmitting unit 1405, the range condition processing unit 1403 sets a presentation flag of this information to ON in order to prevent the information from being transmitted to the same user while the presentation flag is ON. When the user exits the range, the range condition processing unit 1403 sets the presentation flag to OFF. Or, when the user first enters this range, the information is presented only once or a predetermined number of times. When the identical information is presented a plural number of times, it can be also presented periodically at predetermined time intervals while the user stays within the range.

The capability of the range condition processing unit may be arranged within the terminal 1430. In this case, the range condition processing unit 1403 adjusts the number of presentation times in consideration of other information so that information is presented a required number of times, which suits the amount of information obtained within a unit time period. For example, if there are already three items of information for the user having the amount of information obtained within a unit time period such as 5 times a day, another item of information is adjusted to be displayed twice. As the amount of information obtained within a unit time period, the technique proposed by the Japanese Patent Application No. 10-270672 "Information Presenting Apparatus for Adjusting and Presenting Information and a Method Thereof" can be used. However, since this does not directly relate to the gist of the present invention, its detailed explanation is omitted here.

Figure 41B:
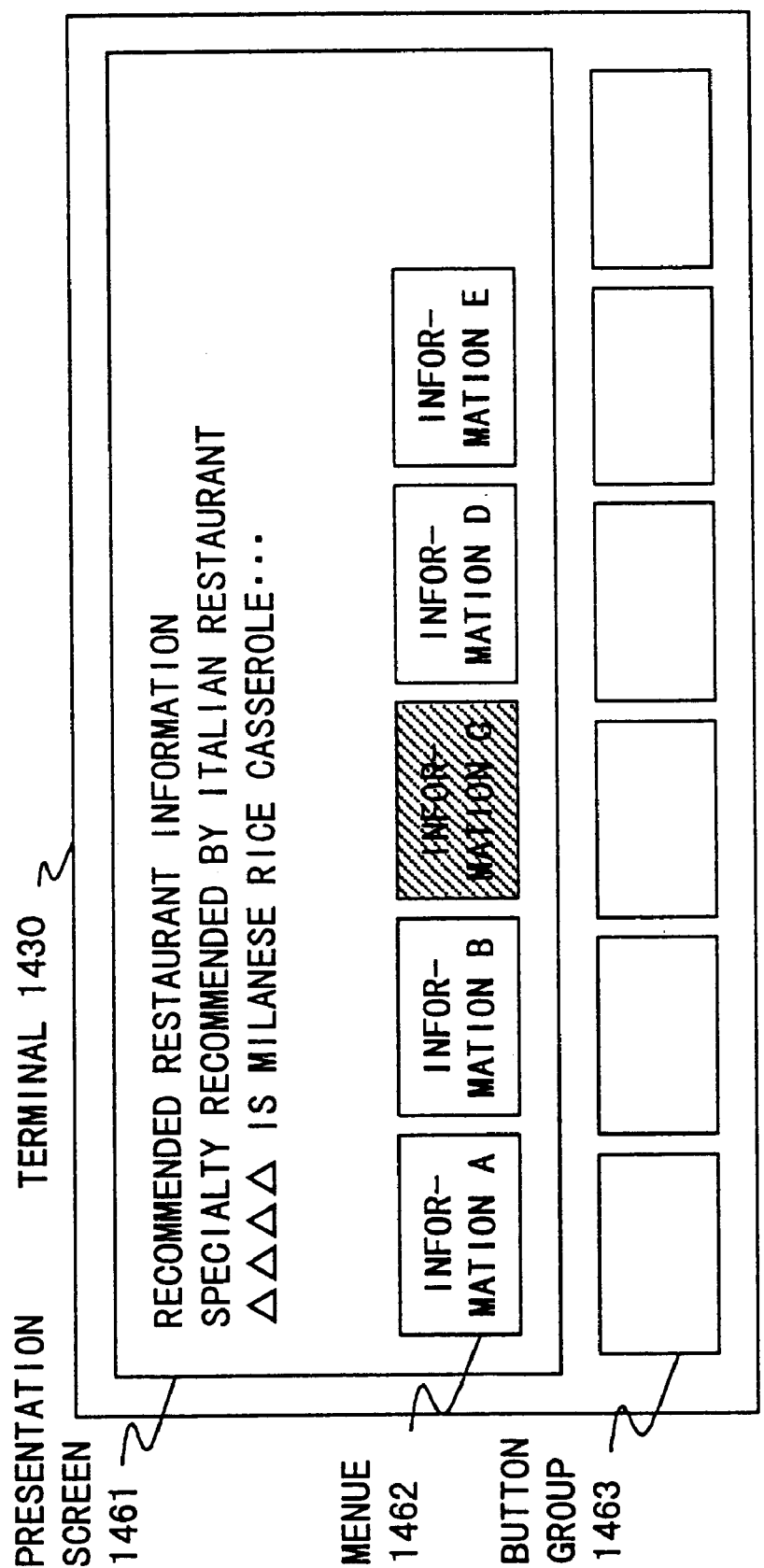
FIG. 41B shows a second example of the information presentation screen.
Figure 41C:
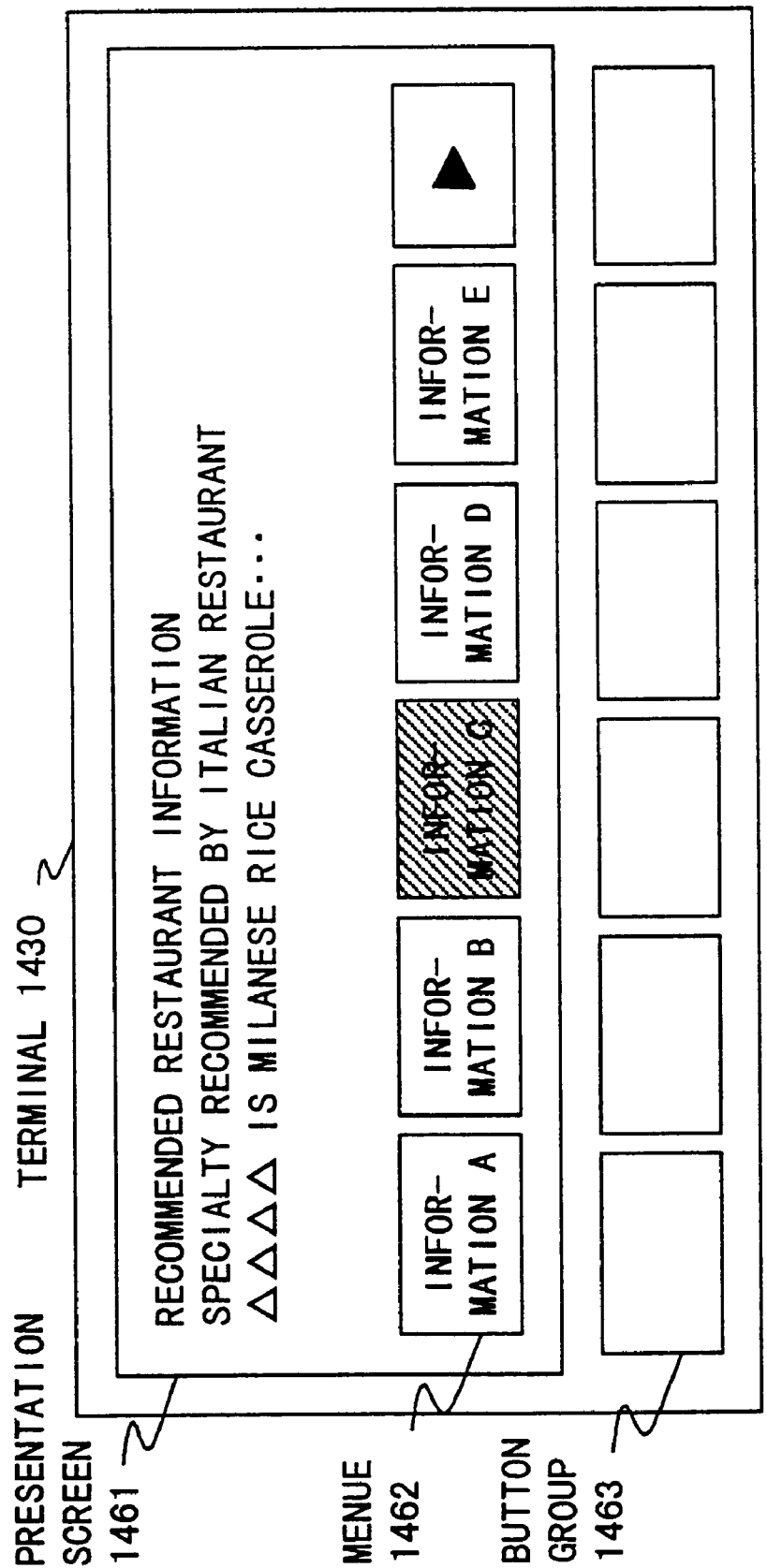
FIG. 41C shows a third example of the information presentation screen.

Additionally, the range condition processing unit 1403 continues to present the information satisfying the range restriction to the presenting unit 1431 as long as the user stays in the range specified by the information. When a plurality of items of information with the corresponding condition are transmitted, the most recently received information (information A) is overwritten and presented on a presentation screen 1461 as shown in FIG. 41A. Or, all of candidates of the information satisfying the condition are displayed as a menu 1462 as shown in FIG. 41B. Information are switched in turn by pressing a button 1463, so that required information is displayed. If all the information cannot be assigned to a displayed menu, as shown in FIG. 41C, the rightmost menu button "▶" in the menu 1462 indicates that further information candidates yet to be displayed exist. Information to be presented can be manually selected by pressing the button 1463 also in this case. Additionally, information items to be displayed are allowed to be selected, for example, by displaying the information in an order of recency of the received information items or in descending order of the priorities of the information items. As the details of the menu display method, also the technique proposed by the Japanese Patent Application No. 10-200237 "Electronic Processing Device Having a Menu Interface" can be used.

Furthermore, if running schedule information of a movie is presented during a running period, the information may be presented a prescribed number of times, for example, five times until the end of the running period, on the condition that the amount of information that a user receives has a margin. In this case, the information may be presented according to a function which presents the information more frequently as the running period approaches the end.

(3) Process for a Relatively Specified Condition

If the condition retrieved by the information retrieving unit 1401 includes a relatively specified time/point restriction, the relative condition processing unit 1404 extracts the information having this condition when the condition including the relatively specified restriction is uniquely determined, and defines the extracted information to be a presentation target. For example, if the time restriction of the presentation condition within information B is "3 days after information A", whichever day "3 days after" indicates cannot be identified. When the information A is received, the time condition of the information B is determined.

Accordingly, the relative condition processing unit 1404 extracts the information B as a presentation target upon receipt of the information A, and presents the information B 3 days after the receipt of the information A.

If the time restriction of the condition of information C is "1 week after a previous display", the condition of the information C is determined when the information C is displayed at least once. Therefore, the relative condition processing unit 1404 extracts the information C as a presentation target, and performs the presentation process. Similarly, if the point restriction of the condition within information D is "within a radius of 300 m from the point at which Mr. ○○ stays", the information D is extracted as a presentation target while the point of Mr. ○○ can be identified. The process for presenting the information D is performed during that time period.

Additionally, if the time restriction of a condition is "3 minutes before the arrival at a point P" or "1 km before the point to be stayed at 12:00", it is impossible to satisfy the condition and present the information after the arrival time at the point P or the point to be stayed at 12:00 is identified. Therefore, when the information having such a condition is presented, the relative condition processing unit 1404 applies to the condition the value calculated by the estimating module 1412 for estimating the arrival time at the point P or the point to be stayed at 12:00, and performs the presentation process.

Suppose that the presentation condition of information E is "3 minutes before the arrival at the point P", the arrival time at the point P is estimated to be 10:00, and the time 9:57 satisfies the time restriction of the condition. In this case, the relative condition processing unit 1404 determines that the time restriction of the information E is 9:57. When the time 9:57 is notified from the time measuring unit 1411, the information/condition retrieving unit 1401 retrieves from the conditional information database 1410 the information E as the information having the time condition corresponding to this time, and presents the retrieved information. Similarly, if the estimating module 1412 estimates that the point to be stayed at 12:00 is a point A, the relative condition processing unit 1404 performs the process by applying the point A to the condition, and presents the retrieved information 1 km before the point A in which the point condition is recognized to be satisfied.

Such estimation can be made if an action plan is known. Assume that, a user driving a car with a car navigation device predetermines a destination, and drives according to a calculated route. In this case, an arrival time can be estimated according to a speed per hour, jam percentage of a road, etc., and also a point to be stayed at a particular time can be approximately estimated. Additionally, if a user is moving with route information described by a naviscript, it is possible to estimate where the user stays at a specified time even if walking or by train (for example, the scheduler 1200 shown in FIG. 27 can be used).

The configuration of this system varies depending on where a time/pomt restriction of time/point-conditional information is recognized to select information and where the information is presented to a user. An example of the configuration of this system is provided below.

FIG. 42 shows a first example of the system configuration in the case where time-conditional information is selected and processed on a server side. The server side comprises the information retrieving unit 1401, the range condition processing unit 1403, the relative condition processing unit 1404, the information transmitting unit 1405, the time measuring unit 1411, the estimating module 1412, sensors 1413 in addition to the conditional information database 1410. The server side extracts the information having a corresponding time condition at predetermined time intervals, and transmits the extracted information to all of user terminals 1430 having an information reception capability. The relative condition process and the range condition process are performed on the server side. The terminals 1430 only present information to users. Remember that the range condition processing unit 1403 for performing the range condition process may be comprised on the terminal 1430 side.

FIG. 43 shows a second example of the system configuration in the case where time-conditional information is processed on a terminal side. A server side only comprises an information transmitting unit 1405 other than the conditional information database 1410. The terminal side 1430 comprises the information retrieving unit 1401, the range condition processing unit 1403, the relative condition processing unit 1404, the time measuring unit 1411, the presenting unit 1431, and an information buffer 1432. Time-conditional information transmitted from the server side are received on the terminal 1430 side. The received information are selected based on the time condition, and the selected information is presented to a user.

Since the range condition process or the relative condition process is performed on the terminal 1430 side in this case, a user can set the processing method for each of the conditions. Setting examples include "if "till" is used, notification is made 3 days or 1 day before a specified date", "displayed only once when entering a range" as the range specification, "displayed only in a determinate case (the estimating module is not used)" as the relative specification, etc. Note that the amount of information to be presented to a user and its timing may be changed by adjusting the amount of information and by assigning the priorities of time specification and the adjustment of the amount of information.

Figure 44:
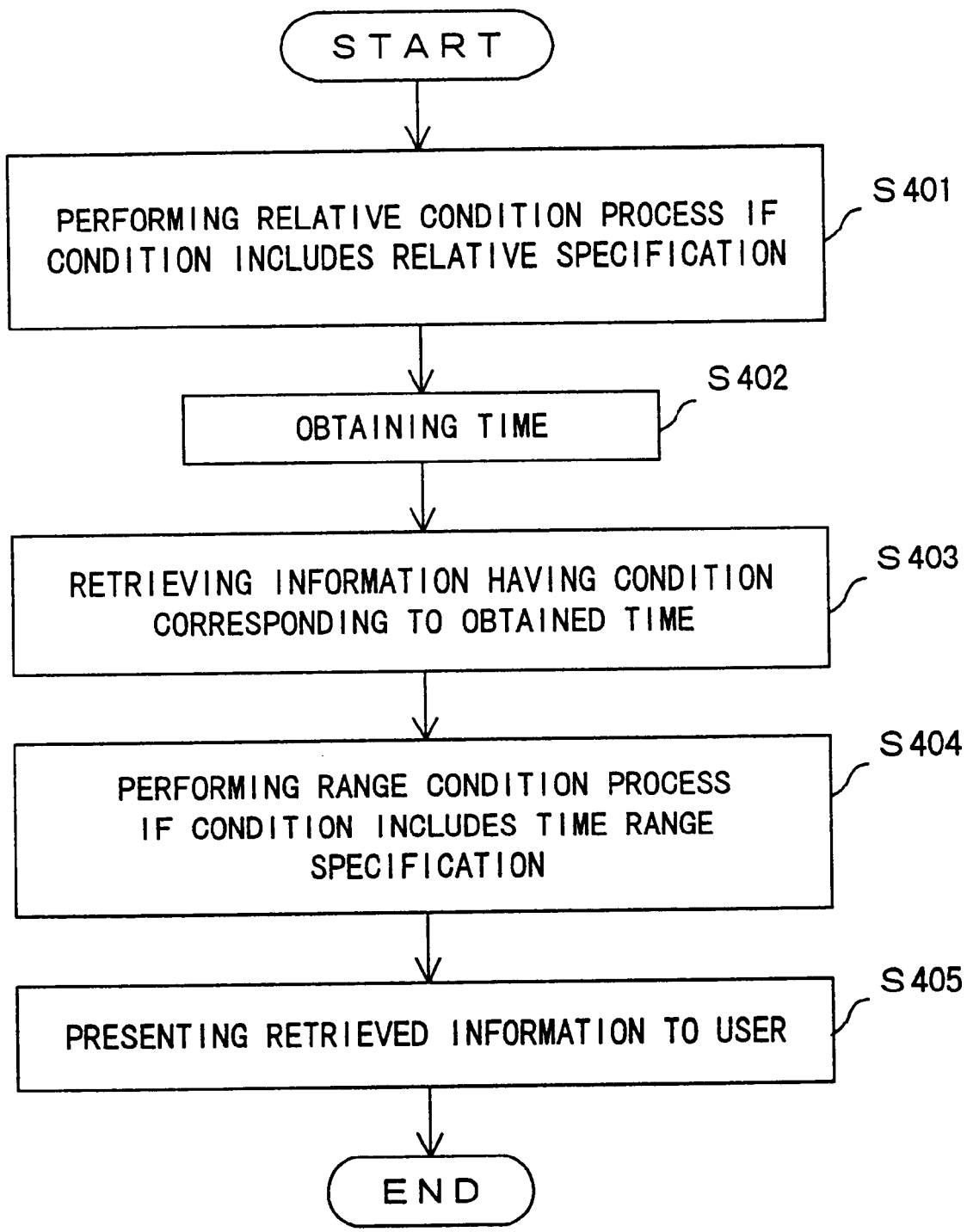
FIG. 44 is a flowchart showing the process for manipulating information with a time condition.

FIG. 44 shows the flow of the process performed when time-conditional information is processed. If the time condition assigned to the information includes relative specification, the relative condition process is performed by the relative condition processing unit 1404 (step S401). A time is obtained by the time measuring unit 1411 (step S402), and the information having the condition corresponding to the obtained time is retrieved by the information retrieving unit 1401 (step S403). If the condition of the retrieved information includes time range specification, the range condition process is performed for this information by the range condition processing unit 1403 (step S404). Then, the retrieved information is presented to the user terminal 1430 (step S405).

Steps S401 through S404 are performed on either of the server and the terminal sides, while step S405 is performed on the terminal side.

FIG. 45 shows a third example of the system configuration in the case where point-conditional information is processed on a server side. The server side comprises the target user retrieving unit 1402, the range condition processing unit 1403, the relative condition processing unit 1404, the information transmitting unit 1405, the estimating module 1412, sensors 1413, the point information managing system 1415 in addition to the conditional information database 1410. The terminal 1430 side only comprises the presenting unit 1431. The server side transmits information directly to a user at a point or within a range corresponding to a condition, and further transmits corresponding information if it receives new information or if a user range changes. Here, point-conditional information corresponding to a user point may be retrieved based on the user point, and the retrieved information may be provided. Or, a user corresponding to each point condition within the information may be retrieved, and the information may be presented to the user.

Figure 46:
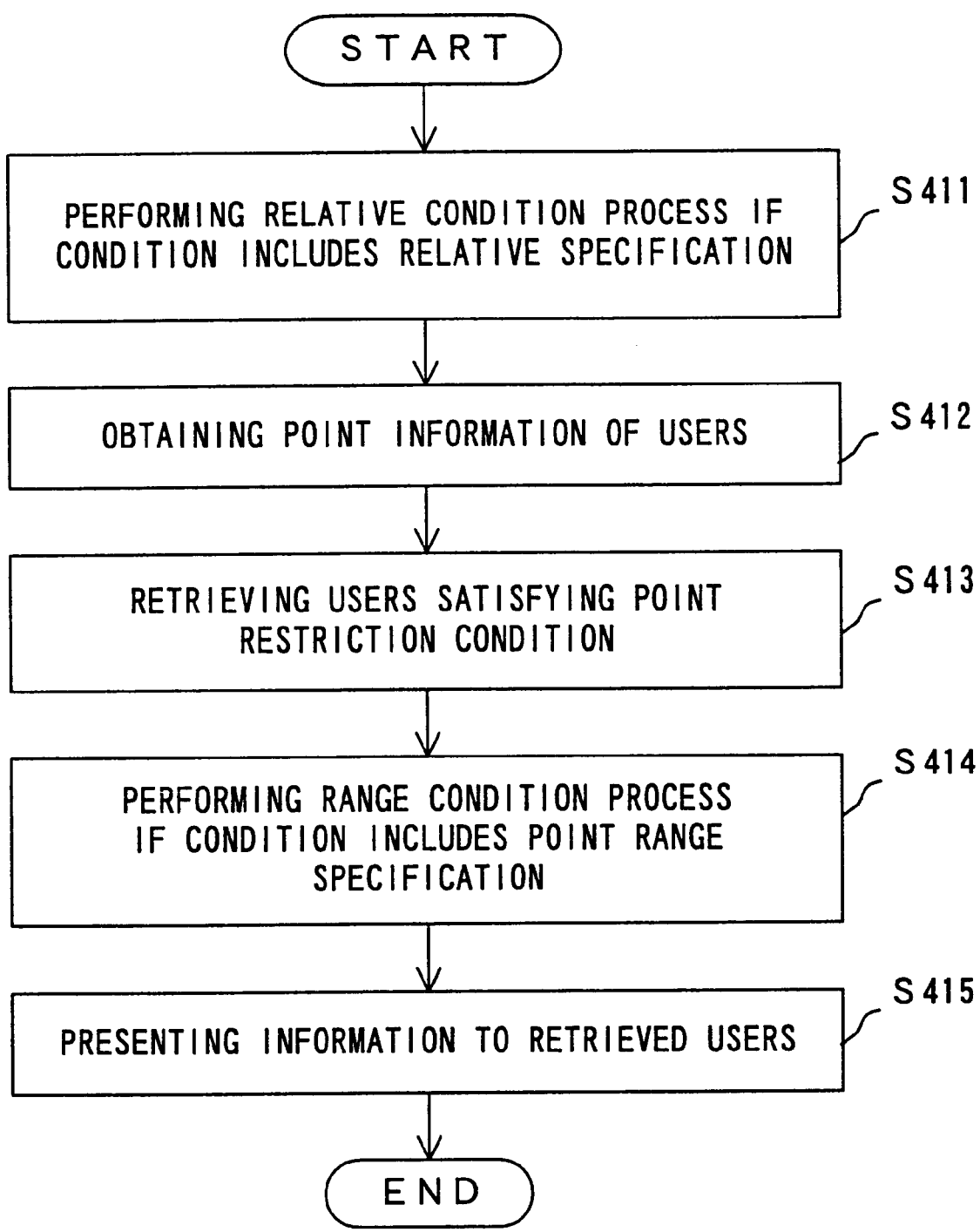
FIG. 46 is a flowchart showing the process for manipulating the information with the place condition.

FIG. 46 shows the flow of the process performed when point-conditional information is processed. If a point condition assigned to information includes relative specification, the relative condition process is performed by the relative condition processing unit 1404 (step S411). The point information of a user is obtained from the point information managing system 1415 (step S412), and a user corresponding to the point restriction is retrieved by the target user retrieving unit 1402 (step S413). If the condition of the retrieved information includes point range specification, the range condition process is performed for this information by the range condition processing unit 1403 (step S414). The information is then presented to the retrieved user (step S415).

Steps S412 through S414 are operations performed on a server side, while steps S414 and S415 are performed on a terminal side.

Figure 47:
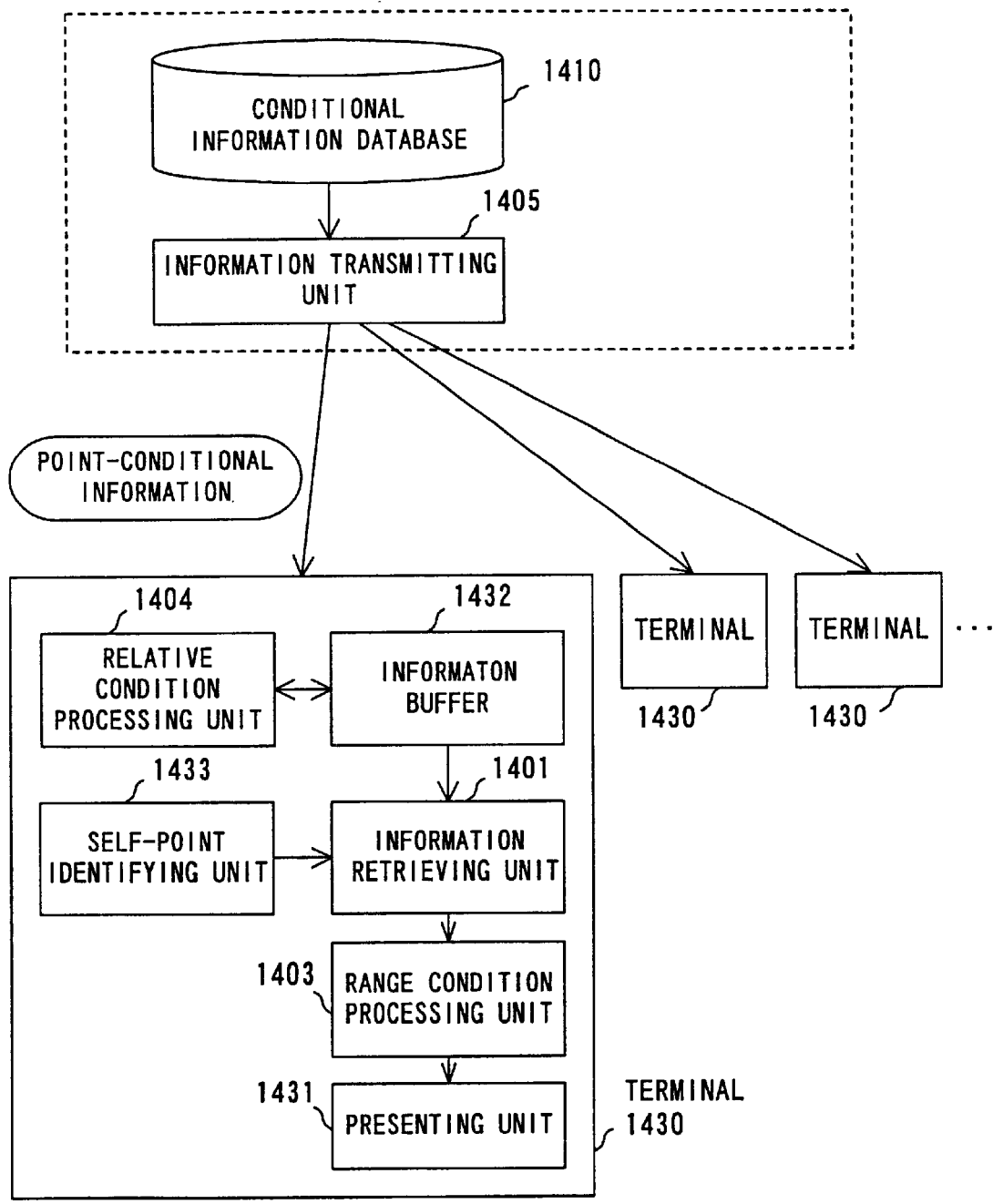
FIG. 47 exemplifies the system configuration in the case where a terminal side processes information with a place condition.

FIG. 47 shows a fourth example of the system configuration in the case where point-conditional information is processed on a terminal side. A server side comprises only the information transmitting unit 1405 other than the conditional information database 1410. The terminal side 1430 comprises the information retrieving unit 1401, the range condition processing unit 1403, the relative condition processing unit 1404, the presenting unit 1431, the information buffer 1432 for storing a process result of a relative condition, and a self-point identifying unit 1433 as a replacement of the point information managing system 1415.

Even if the server only transmits point-conditional information, the information having the place condition suitable for a user point can be presented when the terminal 1430 side comprises the self-point information identifying unit 1433 (such as a GPS device, and the like). Additionally, the user side can specify a point restriction range. By way of example, "receiving only information within a radius of 1 km from a transmitting source of point-conditional information (the center of a specified range within the information)", "presenting information only when a corresponding point exists on a route during a move, regardless of a specified point range", etc. are specified. The process of the terminal 1430 in this configuration example is similar to that explained by referring to FIG. 46.

Other examples of the system configuration in the case where time/point conditional information is processed fall into the following 4 types.

(1) System configuration where a server side identifies a time/point condition, while a terminal side does not perform a process.

(2) System configuration where a server side identifies a time condition, while a terminal side identifies a point condition.

(3) System configuration where a server side identifies a point condition, while a terminal side identifies a time condition.

(4) System configuration where a server side does not perform a process, while a terminal side identifies a time/point condition.

Even if a server only transmits time/point conditional information, the information having a time/point condition, which is suitable for a user, can be presented by the presenting unit 1431 when the terminal 1430 side comprises the self-point identifying unit 1433 (such as a GPS device, and the like).

For the identification of a time condition and that of a point condition, either may be performed ahead. However, the system load can be reduced if more efficient identification is selected based on a distribution amount of each conditional information. Accordingly, it is normally considered to be more advantageous that the identification of a time condition is made ahead. Otherwise, information may be transmitted by identifying a point condition on the server side, and information satisfying a time condition may be further identified from the transmitted information on the terminal side, so that the identified information is presented to a user.

Figure 48:
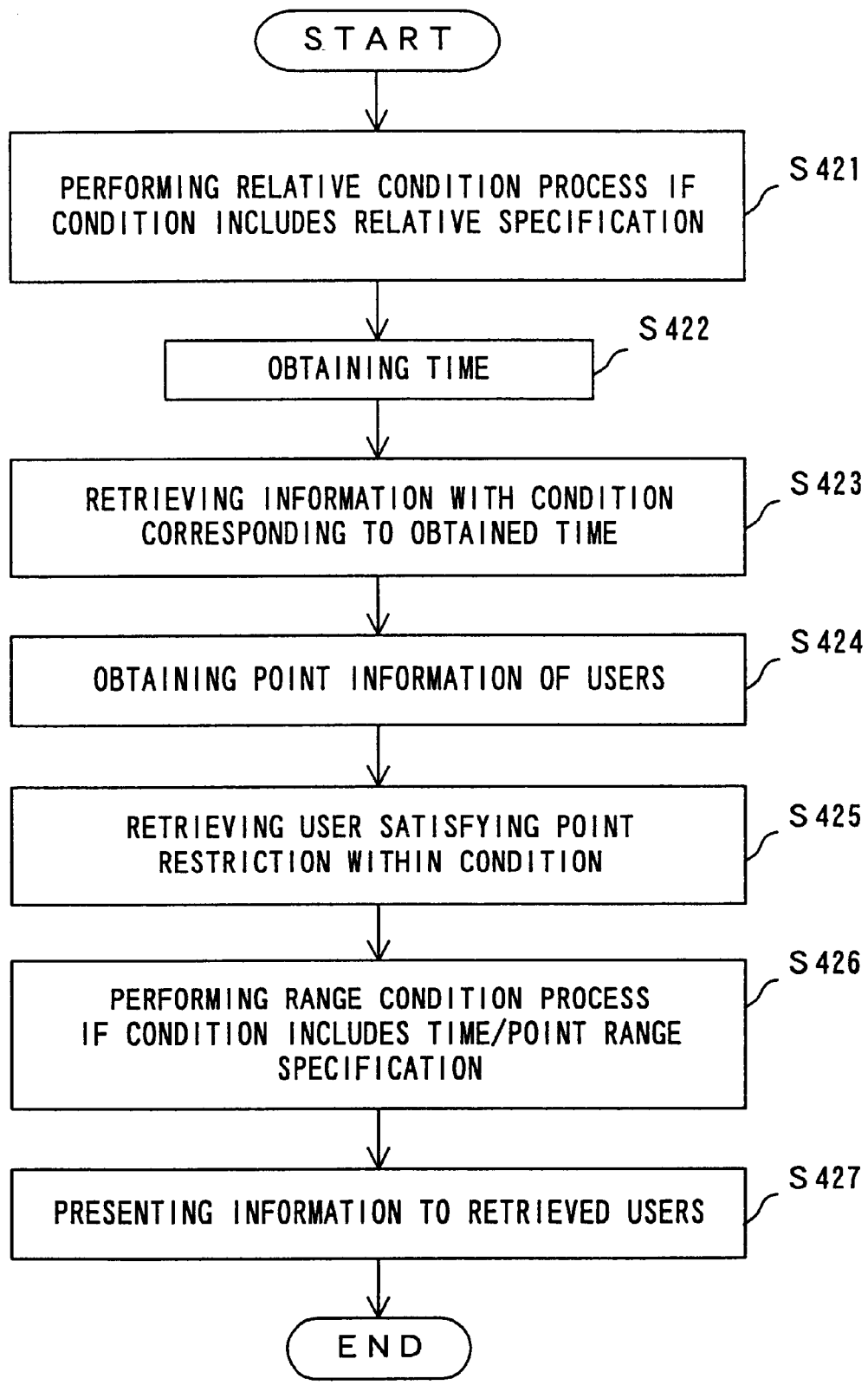
FIG. 48 is a flowchart showing the process for manipulating information with a time/point condition.

FIG. 48 shows the flow of the process performed when a server side processes time point conditional information. If the condition assigned to the information includes relative specification, the relative condition process is performed by the relative condition processing unit 1404 (step S421). Next, a time is obtained by the time measuring unit 1411 (step S422), and the information having the condition corresponding to the obtained time is retrieved by the information retrieving unit 1401 (sep S423). The point information of users is then obtained from the point information managing system 1415 (step S424), and a user satisfying the point restriction is retrieved by the target user retrieving unit 1402 (step S425). If the condition of the retrieved information includes time/point range specification, the range condition process is performed by the range condition processing unit 1403 (step S426). The information is transmitted to the terminal 1430 of the selected user, and the selected information is presented by the presenting unit 1431 (step S427).

Figure 49:
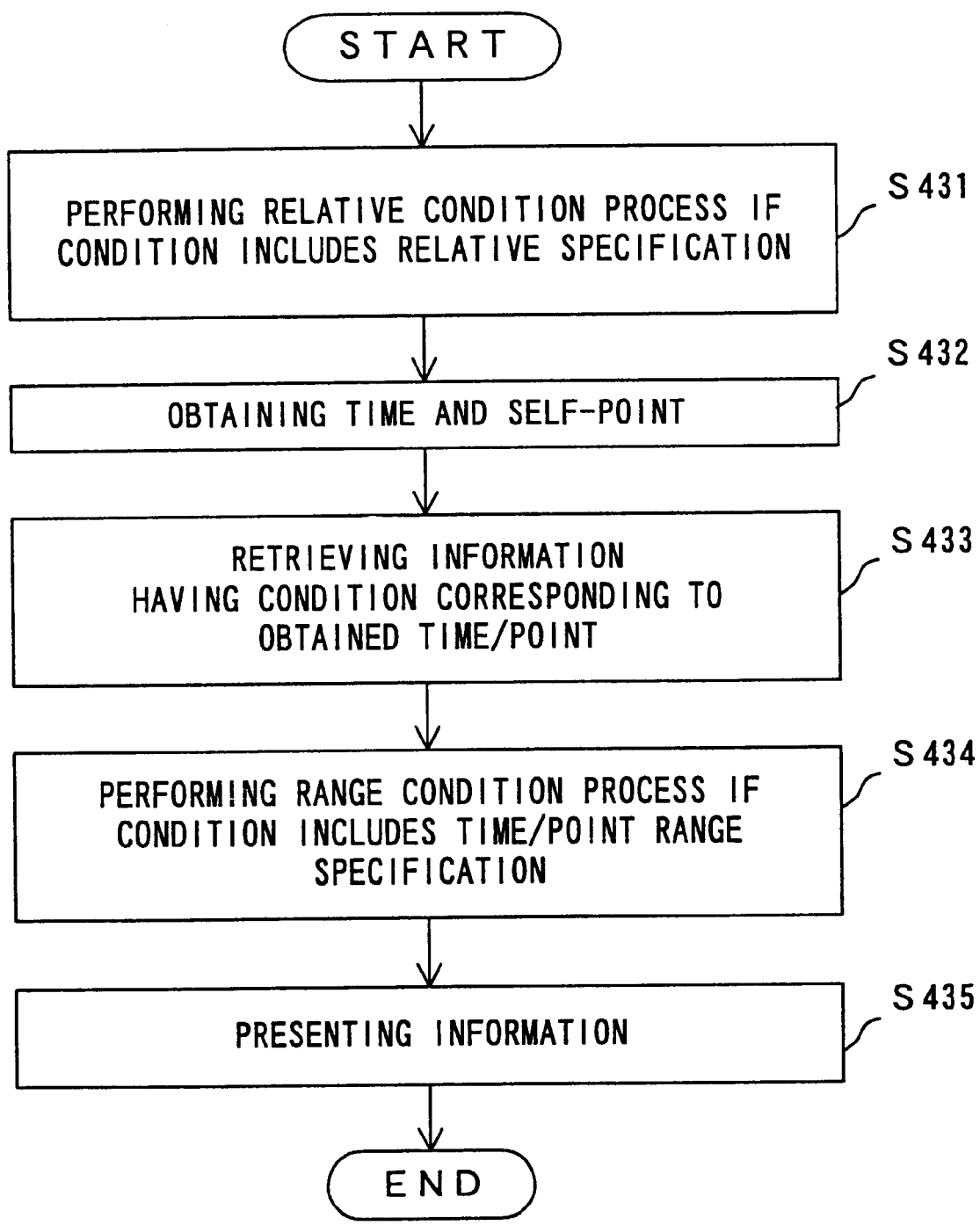
FIG. 49 is a flowchart showing the process for manipulating information with a time/point condition performed on the terminal side.

FIG. 49 shows the flow of the process performed when a terminal side selects time/point-conditional information. steps S431 through S435 are operations performed on the terminal 1430 side. If the time/point condition of the information transmitted from a server side includes relative specification, the relative condition process is performed by the relative condition processing unit 1404 (step S431). Then, the time and the self-point are respectively obtained by the time measuring unit 1411 and the self-position identifying unit 1433 (step S432), and the information having the condition corresponding to the time/point retrieved by the information retrieving unit 1401 is selected. Furthermore, if the condition of the selected information includes time/point range specification, the range condition process is performed for this information by the range condition processing unit 1403 (step S434). The selected information is then presented by the presenting unit 1431 (step S435).

FIG. 50 shows a sixth example of the system configuration where time/point-conditional information is processed by a terminal having a self-schedule managing capability. In this case, the terminal 1430 side comprises the information retrieving unit 1401, the range condition processing unit 1403, the relative condition processing unit 1404, the time measuring unit 1411, and the self-point identifying unit 1433, as units for identifying a time/point condition. The terminal 1430 side further comprises the inputting unit 1434 for inputting as time/point-conditional information also the information of a schedule of a local user or the group to which the user belongs. With this configuration, both of general time/point-conditional information and the information such as an individual schedule, etc. can be presented according to a time/point condition, and the user can receive only the information satisfying the condition.

Figure 51:
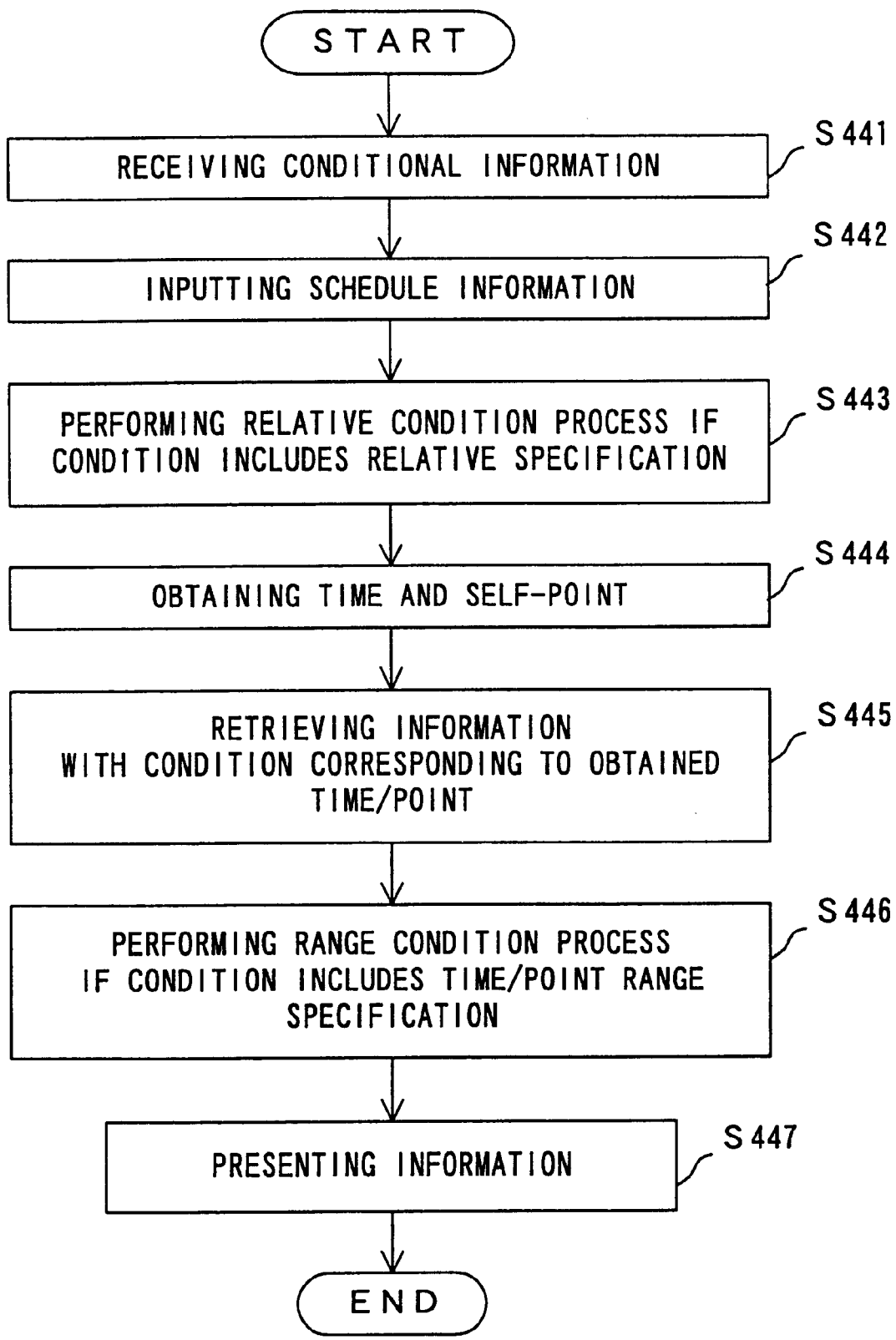
FIG. 51 is a flowchart showing the process for manipulating information with a time/point condition performed on the terminal side having the scheduling capability.

FIG. 51 shows the flow of the process performed when time/point-conditional information is processed by the terminal having the self-schedule managing capability. First, the time/point-conditional information transmitted from a server side is received (S441). Schedule information is input from the inputting unit 1434 (step S442). If the condition assigned to the information includes relative specification, the relative condition process is performed by the relative condition processing unit 1404 (step S443), and a time and a self-point are respectively obtained by the time measuring unit 1411 and the self-point identifying unit 1433 (step S444). The information having the condition corresponding to the obtained time/point is retrieved by the information retrieving unit 1401 (step S445). Furthermore, if the condition of the retrieved information includes time/point range specification, the range condition process is performed by the range condition processing unit 1403 for this information (step S446). The retrieved information is then presented by the presenting unit 1431 (step S447).

An example where conditional information is described by a naviscript is provided below.

```
<par>
    <inst>
        <point>
            <latitude> N35.11.11.111 </latitude>
            <longitude>E135.22.22.222</longitude>
```

```
            <address> 1-1, ΔΔ, ○○ City </address>
        </point>
        <info area = "1.0km">
            <text> This is built in the year □□,
and famous for XX...              </text>
            <voice src="aaa.wav"/>
            <image src="bbb.jpg"/>
        </info>
    </inst>
</par>
```

The contents of this naviscript mean that the text data "This is built in the year □□, and famous for XX . . . ", the voice data within the file "aaa.wav", and the image data within the file "bbb.jpg" are presented to the user staying within a range of the radius of 1.0 km from the point at the latitude of N35.11,11,111 and the longitude of E135.22.22.222. Information in the above described explanation means information contents which are significant to the user. However, information is not limited to the above described type of information. Information which is not significant to a user can be processed in a similar manner as a signal passing through a machine.

Specification of the Naviscript Language

Explained below is the details of the specification such as tags, attributes, and contents, which are used by the naviscript language in the above described preferred embodiments. The relationship between a tag, an attribute, and a content (data not including a tag set is called a content) is:

```
            <tag attribute = "attribute" value> content
    </tag>
    (a) the highest-order description
    (1)     tag: <naviscript>
                    indicates that this description is a
naviscript.
            attribute:
                    version - indicates the version of the
naviscript.
            content: the following tag set can be included
herein.
                <title>, <version>, <author>, <affiliation>,
<date>, <copyright>, <comment>, <navi>, <inst>,
<point>, <object>
    (b) a description below <naviscript>
    (2)     tag: <title>
            attribute: none
            content: the title of navigation described by
this naviscript is written.
                example: Rainbow Town Tour
    (3)     tag: <version>
            attribute: none
            content: the version of the navigation described
by this naviscript is written.
                example: example-04_05
    (4)     tag: <author>
            attribute: none
            content: the author of the navigation described
by this naviscript is written.
                example: Ai Ueo, Kaki Kukeko
    (5)     tag: <affiliation>
            attribute: none
            content: to which company the navigation
described by this naviscript belongs.
                example: Fuji Kanko
    (6)     tag: <date>
            attribute: none
            content: the date on which the navigation
described by this naviscript is written.
                example: 98/09/10
```

-continued

```
(7)     tag: <copyright>
        attribute: none
        content: the copyright of the navigation
described by this naviscript is written.
        example: All Rights Reserved, Copyright (C)
FujiLab Ltd. 1998
(8)     tag: <comment>
        attribute: none
        content: the comment on the navigation described
by this naviscript is written.
(9)     tag: <navi>
        attribute: none
        content: the following tag set can be included.
        <title>, <author>, <date>, <country>, <area>,
<genre>, <duration>, <distance>, <cost>, <course>,
<comment>, <seq> or <par>
(c) a description below <navi>
(10)    tag: <title>
        attribute: none
        content: the title of contents to be navigated
is written.
        example: Rainbow Town
(11)    tag: <author>
        attribute: none
        content: the author of the contents to be
navigated is written.
        example: Fuji Kanko
(12)    tag: <date>
        attribute: none
        content: the date of the contents to be navigated
is written.
        example: 98/09/10
(13)    tag: <country>
        attribute: none
        content: the name of the country to which points,
routs, and facilities to be navigated belong is
written.
        example: Japan
(14)    tag: <area>
        attribute: none
        content: an area to which a point, a route, and
a facility to be navigated belong is written.
        example: Tokyo, Odaiba
(15)    tag: <genre>
        attribute: none
        content: a category to which the contents to be
navigated belongs is written.
        example: driving, viewing
(16)    tag: <duration>
        attribute: none
        content: a required time of a course to be
navigated is written.
        example: 3hour40min
(17)    tag: <distance>
        attribute: none
        content: a travel distance of the course to be
navigated is written.
        example: 95.0km
(18)    tag: <cost>
        attribute: none
        content: a required cost of the course to be
navigated is written.
        example: 1940yen
(19)    tag: <course>
        attribute: none
        content: the course to be navigated is written.
        example: Kaihinmakuhari - Tokyo - Rainbow Bridge
               - Fujisan TV - Tokyo
(20)    tag: <comment>
        attribute: none
        content: a comment on the contents to be
navigated is written.
(21)    tag: <seq>
        "seq" means "sequential". <seq> indicates that
included items are sequentially executed.
        attribute:
                time-optimal - items relating to <point>
included in the tag set of <seq> are rearranged so as
```

-continued

```
to minimize a required time, and the rearranged items
are sequentially executed.
                distance-optimal - items relating to <point>
included in the tag set of <seq> are rearranged so as
to minimize a required distance, and the rearranged
items are sequentially executed.
                cost-optimal - attributes relating to
<route> included in the tag set of <seq> are
determined so as to minimize a required cost, and the
result is sequentially executed.
        content: the following tag sets or an arbitrary
combination of an arbitrary number of them can be
included.
                <inst>, <seq>, <par>
(22)    tag: <par>
        "par" means "parallel". <par> indicates that
included items are executed in parallel.
        attribute: none
        content: the following tag sets or an arbitrary
combination of an arbitrary number of them can be
included.
                <inst>, <seq>, <par>
(d) a description below <seq> or <par>, or below
<naviscript>
(23)    tag: <inst>
        "inst" means "instruction".
        attribute:
                id - an ID for making an internal or
external reference is assigned.
                        example: id = "inst-info-introduction"
                ref - an internal or external <inst> is
referenced by describing an ID assigned to the <inst>.
                        example: ref = "inst-info-introduction"
                if - a condition of whether or not to
execute an instruction is written. If the condition
is satisfied, the instruction is executed. If not, the
instruction is not executed.
                        example: if = "(ref(inst-point-Daiba
IC#time) &ge 11:30) && (ref(inst-point-Daiba IC#time)
&le 13:30)"
```

This condition means "if the contents of the tag set of <time> within the tag set to which the ID of Daiba IC is assigned indicate 11:30 or later, and 13:30 or earlier". The symbols and their meanings used within the attribute "if" are as follows.

```
        relational operator
                &eg or == (=:      equal)
                        The left side is equal to the right
side.
                &ne or != (!=: not equal)
                        The left side is not equal to the right
side.
                &le
                The left side is equal to or less than the
right side. (<=: less or equal)
                &ge
                        The left side is equal to or greater
than the right side. (>=: greater or equal)
                <
                        The left side is less than the right
side. (<: less than)
                >
                        The left side is greater than the right
side. (<: greater than)
        Logical Operator
                ¬    or    !
                        negation (NOT)
                &and
                        and (AND)
                &or
                        or (OR)
``` content: the following tag sets or an arbitrary combination of an arbitrary number of them can be included.

```
            <time> or <point> or <location> or <object>, and
<route>; <info>
(e) a description below <inst> or <naviscript>
(24)    tag: <time>
            "time" indicates a time at which navigation is
performed.
            attribute:
                id - an ID for making an internal or
external reference is assigned.
                ref - an internal or external <time> is
referenced by describing the ID assigned to the
<time>.
            content: a time at which navigation is performed.
            A time can be specified both absolutely and
relatively as follows.
            <time> 12:00 </time>
                Absolute time specification "at 12:00".
            <time> +5 sec </time>
                Relative time specification "5 seconds after
a preceding instruction".
            <time> -10 mm </time>
                Relative time specification "10 minutes
before a succeeding instruction.
(25)    tag: <point>
            "point" indicates a point at which navigation is
performed. "point" absolutely stipulates a point.
            attribute:
                id - an ID for making an internal or an
external reference is assigned.
                    example: id = point-Daiba IC
                ref - an internal or external <point> is
referenced by describing the ID assigned to the
<point>.
                    example:  ref = "point-Daiba IC"
                              ref = "http://
www.naviscript.com/japan/tokyo/odaiba.nav#point-
breakwater"
            content: the following tag sets can be
included.
            <name>, <category>, <latitude>, <longitude>,
<altitude>, <cost>, <comment>
            These tag sets can be recognized as the elements
for stipulating a point at which navigation is
performed.
(f) a description below <point>
(26)    tag: <name>
            attribute: none
            content: the name of the point is written.
(27)    tag: <category>
            attribute: none
            content: the category of the point is written.
            example: station
(28)    tag: <latitude>
            attribute: none
            content: the latitude of the point is written.
            example: 36.2.5
(29)    tag: <longitude>
            attribute: none
            content: the longitude of the point is written.
            example: 133.33.36
(30)    tag: <altitude>
            attribute: none
            content: the altitude of the point is written.
            example: 100m
(31)    tag: <cost>
            attribute: none
            content: cost required at the point, such as an
admission fee, is written.
            example: 540yen
(32)    tag: <comment>
            attribute: none
            content: a comment on the point is written.
(g) a description below <inst> or <naviscript>
[continued from (e)]
(33)    tag: <location>
            "location" indicates a position at which
navigation is performed.   "location" relatively
stipulates a position.
            attribute:
                id - an ID for making an internal or
external reference is assigned.
                ref - an internal or external <location> is
referenced by describing the ID assigned to the
<location>.
            content: a position at which navigation is
performed is written. A position can be relatively
specified as follows.
                <location> +1.0km </location>
                    Relative position specification "1 km
after a preceding point".
                <location> -1.0km <location>
                    Relative position specification "1 km
before a succeeding point".
(34)    tag: <object>
            "object" indicates an object to be navigated such
as a building.
            attribute:
                id - an ID for making an internal or
external reference is assigned.
                    example: id = "object-Rainbow Bridge"
                ref - an internal or external <object> is
referenced by describing the ID assigned to the
<object>
                    example: ref = "object-cafe"
            content: the following tag sets can be included.
            <name>, <category>, <address>, <zip-code>,
<country>, <phone>, <fax>, <url>, <e-mail>,
<latitude>, <longitude>, <altitude>, <open>, <close>,
<reservation>, <comment>, <text>, <voice>, <audio>,
<image>, <video>
            These tag sets can be recognized as the elements
for stipulating an object such as a facility to be
navigated.
(h) a description below <object>
(35)    tag: <name>
            attribute: none
            content: the name of the object is written.
            example: Restaurant Fujitsu
(36)    tag: <category>
            attribute: none
            content: the category of the object is written.
            example: restaurant, Italian, ...
(37)    tag: <address>
            attribute: none
            content: The address of the object is written.
            example: 9-9-9, Daiba, Minato Ward, Tokyo
(38)    tag: <zip-code>
            attribute: none
            content: the zip code of the object is written.
            example: 012-3456
(39)    tag: <country>
            attribute: none
            content: the name of the country to which the
object belongs is written.
            example: Japan
(40)    tag: <phone>
            attribute: none
            content: the telephone number of the object is
written.
            example: 987-654-3210
(41)    tag: <fax>
            attribute: none
            content: the fax number of the object is written.
            example: 999-999-9999
(42)    tag: <url>
            attribute: none
            content: the web page address (URL: Uniform
Resource Locator) relating to the object is written.
            example: http://www.fujisan-tv.com/
(43)    tag: <e-mail>
            attribute: none
            content: the e-mail address relating to the
object is written.
            example: www@fujisan-tv.com
```

-continued

(44) tag: <latitude>
attribute: none
content: the latitude of the object is written:
example: 36.3.5
(45) tag: <longitude>
attribute: none
content: the longitude of the object is written.
(46) tag: <altitude>
attribute: none
content: the altitude of the object is written.
example: 999m
(47) tag: <open>
attribute: none
content: open days of the week and open time of the object are written.
example: Monday through Friday, 10:00-17:00
(48) tag: <close>
attribute: none
content: closed days of the week and closed time of the object are written.
example: Saturday, Sunday, holidays
(49) tag: <reservation>
attribute: none
content: whether or not a reservation for the object is required is written.
example: reservation required
(50) tag: <comment>
attribute: none
content: a comment on the object is written.
(51) tag: <text>
attribute:
duration - a time period during which "text" is displayed.
content: "text" displayed as one form of object navigation is written in text.
example: Specialty is...made by an Italian chef.
(52) tag: <voice>
attribute:
duration - a time period during which "voice" is output.
times - the number of times that "voice" is output.
content: "voice" output as one form of object navigation is written in text.
example: Specialty is...made by an Italian chef.
(53) tag: <audio>
attribute:
src -an "audio" file output as one form of object navigation is specified.
duration - a time period during which "audio" is output.
content: none
(54) tag: <image>
attribute:
src - an "image" file displayed as one form of object navigation is specified.
duration - a time period during which an "image" is displayed.
content: none
(55) tag: <video>
attribute:
src -a "video" file played as one form of object navigation is specified.
duration - a time period during which a "video" is played.
content: none
(i) a description below <inst> or <naviscript> [continued from (g)].
(56) tag: <route>
"route" indicates a route to be navigated.
attribute:
id - an ID for making an internal or external reference is assigned.
ref - an internal or external <route> is referenced by describing the ID assigned to the <route>.
content: The following tag sets can be included.
<means>, <name>, <category>, <cost>, <comment>

These tag sets can be recognized as the elements for stipulating a route to be navigated. Or, the following content can be written.

thesame - this indicates that the information of a route from a current point to the next point is the same as that of the route from the preceding point to the current point.
(j) a description below <route>
(57) tag: <means>
attribute: none
content: a method for moving the route is written.
example: walk, bicycle, car, bus, train, ship, plane, . . .
(58) tag: <name>
attribute: none
content: the name of the route is written.
example: Route 1
(59) tag: <category>
attribute: none
content: the category of the route is written.
example: a normal road, a toll road, a highway, an esplanade, . . .
(60) tag: <cost>
attribute: none
content: the cost required on the route is written.
example: 540 yen
(61) tag: <comment>
attribute: none
content: a comment on the route is written.
(k) a description below <inst> or <naviscript> [continued from (i)]
(62) tag: <info>
"info" indicates information to be navigated.
attribute:
ref - an internal or external <info> is referenced by describing the ID assigned to the <info>.
example: ref = object-Rainbow Bridge#info
content: the following tag sets can be included.
<seq> or <par>
(1) a description below <info>
(63) tag: <seq>
"seq" indicates "sequential". <seq> indicates that included items are executed sequentially.
attribute: none
content: the following tag sets or an arbitrary combination of an arbitrary number of them can be included.
<text>, <voice>, <audio>, <image>, <video>
(64) tag: <par>
"par" indicates "parallel". <par> indicates that included items are executed in parallel. <par> is defined to be a default setting in a portion below <info>, and thus <par> can be omitted.
attribute: none
content: the following tag sets or an arbitrary combination of an arbitrary number of them can be included.
<text>, <voice>, <audio>, <image>, <video>
(m) a description below <seq> or (par> below <info>, or just below <info>
(65) tag: <text>
attribute:
ref - an internal or external <text> is referenced by describing the ID assigned to the <text>.
example: ref = "object-restaurant#text"
duration - a time period during which "text" is displayed.
content: "text" displayed as one form of navigation is written in text.
example: Welcome to Rainbow Town Tour!
(66) tag: <voice>
attribute:
ref - an internal or external <voice> is referenced by describing the ID assigned to the

```
        <voice>.
                    example: ref = "object-
restaurant#voice"
                duration - a time period during which
        "voice" is output.
                content: "voice" output as one form of navigation
        is written in text.
                example: Hope you enjoyed this tour!
(67)    tag: <audio>
            attribute:
                ref - an internal or external <audio> is
        referenced by describing the ID assigned to the
        <audio>.
                    example: ref = "object-
restaurant#audio"
                src - an "audio" file output as one form of
        navigation is specified.
                duration - a time period during which
        "audio" is output.
                content: none
(68)    tag: <image>
            attribute:
                ref - an internal or external <image> is
        referenced by describing the ID assigned to the
        <image>.
                        exampl: ref = "object-restaurant#image"
                src - an "image" file displayed as one form
        of navigation is specified.
                duration - a time period during which
        "image" is displayed.
                content: none
(69)    tag: <video>
            attribute:
                ref - an internal or external <video> is
        referenced by describing the ID assigned to the
        <video>.
                    example: ref = "object-
restaurant#video"
                src - a "video" file reproduced as one form
        of navigation is specified.
                duration - a time period during which
        "video" is reproduced.
                content: none
```

The above described specification of a naviscript language is merely one example, and can be easily expanded and changed when being designed.

Characteristics of the Preferred Embodiments

The characteristics of the preferred embodiments are listed below.

1. Naviscript Description Methods

(01) A naviscript is written by using a sequence of instructions which include as a constituent element a presentation time, or both of a presentation time and information for guidance to be output at that time.

(02) A naviscript is written by using a sequence of instructions which include a constituent element a point to be reached, or both of a point to be reached and information for guidance to be output at that point.

(03) A naviscript is written by using a sequence of instructions which include as a constituent element a presentation time or both of a presentation time and information for guidance to be output at that time, and/or a point to be reached or both of a point to be reached and information for guidance to be output at that place.

(04) A naviscript can describe that a plurality of instructions are processed sequentially or in parallel, and that navigation is made in an optimum order of required durations, distances, or costs of a plurality of instructions, or an order specified by a compound combination of the instructions in the above described methods (01), (02), and (03).

(05) A naviscript can specify respective times by using a time range obtained by an arbitrary combination of an absolute time like "10:00", a relative time like "10 minutes after", or "a time at or before . . . ", "a time at or after . . . ", "a time before . . . ", and "a time after . . . " in the above described methods (01), (03), and (04).

(06) A naviscript can specify respective point by using a point range obtained by an arbitrary combination of an absolute point (for example, coordinates such as latitude, longitude, and altitude, or a proper attribute of an object which can indirectly identify a point, such as a name, an address, a telephone number, etc.), a relative point (such as "10 km beyond . . . "), a point range (such as "within a radius of 10 km"), a point range such as an attribute of abstract concept which can indirectly identify a point (such as a name, an address, a zip code, etc.), or "inside . . . ", "outside . . . ", "within . . . ", and "beyond . . . " in the above described (02), (03), and (04).

(07) A naviscript can specify a route or a track, which is a point transition with time, by using an arithmetic function, a separately defined function, or separately specified data, or an arbitrary combination of the functions and data in the above described methods (02), (03), and (04).

(08) A naviscript can specify a condition of whether or not to execute each instruction by describing whether or not a navigation provider/providing apparatus, a navigation user/using apparatus, information about navigation contents, information about a move method, and information about peripheral situation, or their combination is equal to a certain value or belongs to a certain range (set) in the above described methods (01), (02), (03), and (04).

(09) A naviscript can describe also a variety of external information such as a facility, an object, an event (such as a concert, an exhibition, etc.), a timetable, etc., which relate to a presentation time, a presentation time and navigation information to be output at that time, a point to be reached, and a point to be reached and information for guidance to be output at that point, by specifying their locations with network addresses, etc. in the above described methods (01), (02), (03), and (04).

(10) A naviscript can specify as a navigation outputting means characters, a map, voice, music, an image, a video, light, smell, force, and a movement, or their arbitrary combination in the above described methods (1), (02), (03), and (04).

(11) A naviscript can describe the items relating to the summary of navigation in the above described methods (01), (02), (03), and (04).

(12) A naviscript is written so that identifiers like tags are assigned to respective items such as a time, a point, navigation information, summary of navigation, etc. in the above described methods (01), (02), (03), (04), and (11).

2. Naviscript Generation Method

(01) Respective types of move data such as times, places, etc. of a user or a move method, and/or respective types of media data such as voice, music, an image, a video, etc. are sampled, so that a part or the whole of the above described naviscript is semi-automatically generated in a discrete or a continuous manner.

3. Naviscript Storing Methods

(01) A portion or the whole of the naviscript is stored by being assigned a unique number or name which can identify data.

(02) A portion or the whole of the naviscript is classified and stored according to an item relating to the summary of the navigation described therein.

(03) With respect to a portion or the whole of the naviscript, only one principal script is stored and a link to the principal script is stored for each classification.

(04) The language specification and available tags of a portion or the whole of the naviscript are registered to a particular location on a network, and a limitation is imposed so that only the registered tags are utilized by all users, in order to facilitate the distribution of the naviscript.

4. Naviscript Retrieving Methods

(01) A desired naviscript is retrieved with a given keyword using contents, which are obtained by excluding tags included in a portion or the whole of the naviscript, as a target.

(02) A desired naviscript is retrieved with a given keyword using only contents, which relate to a particular tag (set) included in a portion or the whole of the naviscript, as a target.

(03) A desired naviscript is retrieved by using as keys one or a plurality of tags and the contents relating to the tags in a portion or the whole of the naviscript.

(04) Tags of items relating to the summary of the navigation in a portion or the whole of the naviscript are used as the tags referred to in the above described method (3).

5. Naviscript Creating System (editor)

(01) The naviscript creating system creates a portion or the whole of the naviscript by dividing one or a plurality of naviscripts into respective portions in units of instruction, and/or by merging the portions.

(02) The naviscript creating system assists in attaching tags in a portion or the whole of the naviscript based on the specification of the naviscript language by automatically complementing the name of a tag when characters at the beginning of the tag or its abbreviation are input, or by automatically attaching a tag with a selection from a menu.

(03) The naviscript creating system arranges a portion or the whole of the naviscript in a hierarchical structure based on the specification of the naviscript language, and displays the naviscript.

(04) The naviscript creating system has a parsing capability and a debugging capability, which are intended to check a portion or the whole of the naviscript, to indicate a grammatically erroneous portion to a user, and to automatically modifies the erroneous portion based on the specification of the naviscript language.

(05) The naviscript creating system has an inputting unit for inputting from a map information system to a portion or the whole of the naviscript the information about a place including latitude, longitude, altitude, object attributes such as a name, an address, a telephone number, etc., and/or navigation information accompanying the place via a buffer or a file, and an outputting unit for outputting the portion or the whole of the naviscript via a buffer or a file.

(06) The naviscript creating system has a loading/saving unit for loading/saving a portion or the whole of the naviscript to/in a local file system and/or a network file system.

(07) The naviscript creating system has a storing unit for storing a portion or the whole of the naviscript by using the above described storing methods for the naviscript.

6. Naviscript Conversion Method

(01) Instructions are extracted from a portion or the whole of the naviscript, and the extracted instructions are converted into structured navigation data.

(02) Instructions are extracted from a portion or the whole of the naviscript, particular flags are attached to the respective contents of a time, place, and navigation information, and these contents are converted into structured navigation data so as to allow the distinction from the respective contents of a time, place, and navigation information added/modified by the system to be made.

(03) An item relating to a time included in an instruction in a portion or the whole of the naviscript is converted into that of another naviscript for describing time information (for example, for a scheduler, etc.)

(04) A description relating to a place (a point or a route) included in an instruction in a portion or the whole of the naviscript is converted into that of another naviscript for describing the place or a map.

(05) A description relating to an output medium in a portion or the whole of the naviscript is converted into that of another naviscript for an output of the output medium.

(06) Respective types of parameters in a portion or the whole of the naviscript, which are required by a naviscript resultant from conversion, are specified by a description within the naviscript, a default value, another specification file, a user menu selection, or their combination.

(07) The naviscript is converted into a form of an article in a travel advertisement or an informative magazine.

(08) The naviscript is converted into a form of a program or a commercial of television or radio.

7. Naviscript Converting System (Translator)

(01) The naviscript converting system comprises a converting unit for converting a portion or the whole of the naviscript with the above described conversion methods.

8. Navigation Instruction Executing Method

(01) An instruction extracted from a naviscript is executed with the process algorithm shown in FIGS. 7 and 8, or with the process algorithm a portion of which is omitted.

9. Navigation Instruction Executing System (Processor)

(01) The navigation instruction executing system executes an instruction extracted from a naviscript with the process algorithm shown in FIGS. 7 and 8 or with the process algorithm a portion of which is omitted.

10. Navigation Output Methods Based on a Naviscript

(01) Navigation is performed for a current point, a departure point, en-route spots, a destination, a route, etc., one after another, or according to each instruction in a portion or the whole of the naviscript. Or, navigation is performed for a certain time, distance, or point, or with an input operation or according to an external event.

(02) With respect to a portion or the whole of the naviscript, navigation such as straight-going, right-turn, or left-turn is performed at an intersection or a particular point.

(03) With respect to a portion or the whole of the naviscript, the entire contents such as a departure point, en-route spots, a destination, a route, etc. are presented.

(04) With respect to a portion or the whole of the naviscript, navigation is performed by switching or combining the above described methods (01), (02), and (03).

(05) With respect to a portion or the whole of the naviscript, navigation is performed by using characters, a map, voice, music, an image, a video, light, smell, force, movement, etc.

(06) A combination or a switching selection in the above described methods (04) and (05) is specified by a description in a portion or the whole of the naviscript, a default value, another specification file, or a user menu selection, or their combination.

11. Navigation Outputting System Based on a Naviscript (Browser)

(01) The navigation outputting system output navigation with the above described navigation output methods based on the naviscript.

12. Naviscript Providing System and Using System

(01) The naviscript providing system (a server or a center) provides to a terminal via a network or an electronic medium a naviscript which describes an information sequence of various points and a route such as a recommended date spot, sightseeing course, etc., and navigation information accompanying the information sequence (such as facility information, a right-turn or left-turn directive, etc.), and makes the terminal perform navigation according to the naviscript.

(02) The naviscript using system (a client or a terminal) obtains a naviscript being an information sequence describing various spots or a route such as a recommended date spot, sight-seeing course, etc. and navigation information accompanying the information sequence (such as facility information, a right-turn or left-turn directive, etc.) via a network or an electronic medium, and performs navigation according to the obtained naviscript.

(03) The naviscript providing system uses a portion or the whole of the naviscript as the naviscript used in the above described (01) or (02).

(04) The naviscript providing system uses a portion or the whole of the naviscript as the naviscript used in the above described (01) or (02).

(05) The naviscript providing system and using system are configured by using the above described naviscript conversion methods, the above described naviscript converting system (translator), the above described navigation instruction execution method, the above described navigation instruction executing system (processor), the navigation output method based on the naviscript, and the above described navigation outputting system (browser).

(06) The naviscript providing system and using system have a navigation mode and/or a simulation mode as navigation modes. In the navigation mode, the system obtains the information about an actual current time/point from a state acquiring unit, and performs actual navigation according to the obtained information. In the simulation mode, the system obtains the information about a virtual current time/point, and performs virtual navigation according to the obtained information.

(07) The naviscript providing system and using system have a state generating unit for initializing and stopping a virtual current time or moving a virtual current time forward or backward, and for allowing the forward or the backward moving speed to be changed during simulation in the simulation mode.

(08) The naviscript providing system and using system change the contents of navigation, an output method, and/or a display method according to the type of a using device.

13. Various Service Types Using Naviscripts

(01) The naviscript providing system and using system can be used for route navigation, sightseeing navigation and guidance, a delivery plan, a travel plan, traffic control, scheduling, an amusement, a municipal service, etc.

(02) The systems can be used for driving management such that a driving management center returns a reserved and modified naviscript by receiving a naviscript describing an itinerary/route that a user desires from an information device such as a car navigation system, and by making a comparison/coordination between the naviscript and the data stored in a driving management database.

(03) The systems automatically determine whether or not a user can reach by an arrival time, and proposes an action to be taken by the user, so that a time adjustment during a move can be made when navigation information using a naviscript is presented.

(04) The systems attach navigation information to areas on a map, automatically capture the navigation information about a route when a user selects the route on the map, and can easily create a navigation plan with a naviscript obtained by combining navigation information.

(05) An information providing system can be configured so that also a range or a relatively specified time/point condition can be processed for the information with the time/point presentation condition, which is described by a naviscript, and suitable information is transmitted to a user or users corresponding to the time/point condition.

Effects and Applications of the Preferred Embodiments

As described above, the following effects can be obtained with the preferred embodiments according to the present invention.

(a) A navigation service can be provided/used to/by various users offline or online with various types of devices/media at the same time or different times in the same point or different points.

(b) A naviscript can be executed, converted, created, edited, divided, merged, changed, modified, copied, deleted, stored, and retrieved. It can be also formed into a database for reuse. Additionally, the naviscript can be carried or transferred by a suitable electronic medium or a network. Furthermore, it can be sold, purchased, issued, received, given, taken, thrown away, picked up, value-added (such as a mileage service), etc.

(c) Specifically, the naviscript can be created and provided by anybody such as a naviscript center, a contents provider, each facility, an individual, a group, etc.

(d) Additionally, the naviscript can be used by various devices/media such as a PC, a car navigation system, PDA, PDC, PHS, an IC card, a prepaid card, a magnetic disk, an optical disk, a bar code, paper, etc.

(e) Especially, a PC, etc. can be used as the naviscript providing device, while a PC, a car navigation system, PDA, PDC, PHS, and the like can be used as the naviscript using device.

(f) A naviscript created by a PC, a car navigation system, PDA, PDC, PHS, etc. can be written to an IC card or a prepaid card. Additionally, the naviscript written to the IC card or the prepaid card is read into the car navigation system, the PDA, the PDC, the PHS, etc., so that the instructions for a navigation service can be executed.

(g) The navigation received by a certain PC, car navigation system, PDA, PDC, PHS, etc. can continuously received even if the device receiving the naviscript is changed to a different PC, car navigation system, PDA, PDC, PHS, etc. For example, if a user who carries a PDA and receives navigation while walking rides in a car, the same navigation can be received from a car navigation system with the shared use of the same naviscript. Similarly, for example, a private tour can be made by riding multiple cabs in succession. If a naviscript is stored in a PDA, etc. and carried in this case, a copy of the naviscript is transmitted to a corresponding car navigation system at the time of riding in a cab. This is exactly the same at the time of a transfer to another cab. Besides, a narrative service based on navigation information can be received.

(h) The naviscript being received by a certain PC, car navigation system, PDA, PDC, PHS, etc. can be received also by another PC, car navigation system, PDA, PDC, PHS, etc. Therefore, for example, a plurality of private cars can make the same tour. Namely, one naviscript can be shared by many people.

(i) The naviscript can be carried or dealt by an IC card or a prepaid card. By way of example, with an IC card storing a naviscript and electronic money, a ticket can be purchased when inserting the IC card into an automatic ticket vending machine, and a seat and also a hotel can be reserved at a ticket center. Since these information are added to the naviscript, navigation is performed not only from the station to the seat but also check-in at the hotel can be easily made. Furthermore, if the naviscript is read into a terminal in a room, it becomes possible to make the terminal care for you. For example, "Is it OK to wake you up at ◯ o'clock tomorrow?", etc. is uttered according to the schedule.

(j) Prepaid cards describing various naviscripts such as a historic spots tour, a route on which a famous person passed, impressed movie scenes tour, etc. can be sold. Also shop advertisements or a movie schedule can be included therein. Furthermore, restaurant information, etc. can be included, which facilitates reservation making of a restaurant. Note that the cards may only include the principal part of a naviscript, and quoted voice or image data may be stored at a source in a network.

(k) For example, a tissue paper including a naviscript prepaid card is distributed in front of a station, or a name card is formed as a naviscript prepaid card, so that the advertised shop or company can be easily reached.

(l) A naviscript can be written/read as a bar code.

(m) A course introduced by television can be downloaded from the Internet as a naviscript, or a demo tape of a course carried in a magazine or a guide book can be viewed with an input from an attached bar code or CD-ROM.

(n) Since a naviscript can be described as text data, it can be written/read to/from paper, plastic, etc. For example, a paper sheet on which a naviscript describing the procedures for reaching a treasure spot can be stored in a particular place like a bank, similar to cash.

(o) A naviscript can be applied in various ways. As navigation within a building, a natural world, or a virtual world, for example, indoor navigation using an elevator or an escalator, navigation in a skiing area or a golf course, navigation for going down a stream or for scuba diving, an experience of a simulated sightseeing flight or space trip, navigation in a virtual shopping mall, etc. can be performed.

(p) Also a naviscript allows navigation in the past or in the future. The navigation can be applied to, for example, navigation for Tokaido, an explanation about an invasion, a battle, or a war, an explanation about scenery viewed from the Silk Road or a car/train window in the world, a flashback of a movie such as the Titanic, creation of a logbook or a travel album, etc.

(q) With a naviscript, the flow of an animal, goods, substance, and information are made visible. For example, a move of a passage bird, an image of a driving simulation of a train or a bus, movement of a weather satellite, an explanation about the flow of barter or trade, a mail transmission path, etc. can be displayed.

(r) It is possible to make a naviscript easy to be read and written by realizing it with a standard mark-up language.

(s) Since a naviscript is fundamentally text data, a storage medium with a small capacity is sufficient. Also the execution of its instructions can be realized with ease.

As described above, according to the present invention, navigation with various types of data can be experienced by various types of devices, systems, and media in various places. Additionally, navigation can be virtually received by setting a virtual time or place. Note that the present invention is not limited to navigation for a route such as a road, etc. The present invention can be also applied to navigation in a virtual space/time world, visualization of a travel course of an animal, transportation facilities, a weather satellite, etc., a display of barter, a display of a transmission path of mail, etc.

What is claimed is:

1. A portable navigation information providing apparatus for providing information to a user, comprising:

a conditional information storage storing pieces of information, each piece having attached thereto a presentation condition, including a time restriction in a predetermined format so that an appropriate piece of information from among the pieces of information can be provided to the user at an effective time satisfying the time restriction;

a unit checking the pieces of information at predetermined time intervals, and retrieving a piece of information with a time restriction satisfied by a current time; and a unit providing the retrieved information to the user.

2. The navigation information providing apparatus according to claim 1, further comprising a range condition processing unit determining how to present information when the current time is included in a time range if the time restriction is a condition indicating the time range, and wherein said unit providing the information provides the retrieved information according to said range condition processing unit when the time restriction is satisfied.

3. The navigation information providing apparatus according to claim 1, further comprising a unit checking the pieces of information by using an estimating module estimating a future state if the time restriction is a relative condition.

4. The navigation information providing apparatus according to claim 1, wherein the pieces of information are represented by a navigation script composed of an instruction sequence based on a predetermined specification, in which at least one of time information and point information, and information for guidance to be output according to at least one of a presentation time and a presentation point are described using a set of combinations of a name which identifies a type of the information and the contents thereof.

5. A portable navigation information providing apparatus for providing information to a user, comprising:

a conditional information storage storing pieces of information, each piece having attached thereto a presentation condition, including a point restriction in a predetermined format so that when the user is in a position satisfying the point restriction, the piece of information corresponding thereto can be provided to the user;

a unit obtaining information about a point of a user;

a unit checking the pieces of information according to the point of the user, and retrieving a piece of information with a point restriction satisfied by the point of the user; and a unit providing the retrieved information to the user.

6. The navigation information providing apparatus according to claim 5, further comprising a range condition processing unit determining how to present information when the point of the user is included in a point range if the point restriction is a condition indicating the point range, and wherein the unit providing the retrieved information provides the retrieved information according to said range condition processing unit when the point restriction is satisfied.

7. The navigation information providing apparatus according to claim 5, further comprising a unit checking the pieces of information by using an estimating module estimating a future state if the point restriction is a relative condition.

8. The navigation information providing apparatus according to claim 5, wherein the pieces of information are represented by a navigation script composed of an instruction sequence based on a predetermined specification, in which at least one of time information and point information, and information for guidance to be output according to at least one of a presentation time and a presentation point are described using a set of combinations of a name which identifies a type of the information and the contents thereof.

9. A portable navigation information providing apparatus for providing information to a user, comprising:
 a conditional information storage storing information to which a presentation condition including a point restriction in a predetermined format is attached, so that when the user is in a position satisfying the point restriction, the information corresponding thereto can be provided to the user;
 a unit obtaining information about a plurality of points of a plurality of users;
 a unit checking the information with the point restriction, and retrieving a user at a point which satisfies the point restriction; and
 a unit providing the information with the point restriction to the user retrieved by said checking unit.

10. The navigation information providing apparatus according to claim 9,
 further comprising a range condition processing unit determining how to present information when a point of a user is included in a point range if the point restriction is a condition indicating the place range, and
 wherein said unit providing the information provides the information according to said range condition processing unit when the point restriction is satisfied.

11. The navigation information providing apparatus according to claim 9, further comprising a unit checking the information with the point restriction by using an estimating module estimating a future state if the point restriction is a relative condition.

12. The navigation information providing apparatus according to claim 9, wherein the information with the point restriction is represented by a navigation script composed of an instruction sequence based on a predetermined specification, in which at least one of time information and point information, and information for guidance to be output according to at least one of a presentation time and a presentation point are described using a set of combination of a name which identifies a type of the information and the contents thereof.

13. A portable navigation information providing apparatus for providing information to a user, comprising:
 a conditional information storage storing a plurality of pieces of information, each piece having a presentation condition attached thereto, including a time restriction and a point restriction is attached, the time and point restrictions respectively specifying an effective time and an effective point in predetermined formats so that at least one appropriate piece of information from among the pieces of information can be provided to the user when the time and point restrictions are satisfied by a current time and a location of the user;
 a unit checking the pieces of information at predetermined time intervals, and retrieving a piece of information with a time restriction satisfied by the current time;
 a unit obtaining information about a plurality of points of a plurality of users;
 a unit performing one of a process of checking the pieces of information according to one of the points of the users and retrieving a piece of information with a point restriction satisfied by the one of the points of the users, and a process of checking a piece of information and retrieving a user at a point which satisfies the point restriction; and
 a unit providing the retrieved information to the user retrieved by said performing unit.

14. The navigation information providing apparatus according to claim 13,
 further comprising a range condition processing unit determining how to present information when one of the current time and a point of a user is included in a certain range if the presentation condition is a condition indicating the certain range, and
 wherein said unit providing the retrieved information provides the retrieved information according to said range condition processing unit when the presentation condition is satisfied.

15. The navigation information providing apparatus according to claim 13, further comprising a unit checking the pieces of information by using an estimating module estimating a future state if the presentation condition is a relative condition.

16. The navigation information providing apparatus according to claim 13, wherein the pieces of information are represented by a navigation script composed of an instruction sequence based on a predetermined specification, in which at least one of time information and point information, and information for guidance to be output according to at least one of a presentation time and a presentation point are described using a set of combinations of a name which identifies a type of the information and the contents thereof.

17. A navigation information providing method for providing information to a user, comprising:
 storing in a portable conditional information storage a plurality of pieces of information, each piece having attached thereto a presentation condition including at least one of a time restriction and a point restriction, the time and point restrictions respectively specifying an effective time and an effective point in predetermined formats so that at least one appropriate piece of information from among the pieces of information can be provided to the user when the time and point restrictions are satisfied by a current time and a location of the user;
 retrieving at least one of a piece of information with a time restriction satisfied by the current time and a piece of information with a point restriction satisfied by the location of the receiving the provided information, with one of a method of checking the pieces of information at predetermined time intervals, and a method of checking the pieces of information according to the point of the user; and
 providing the retrieved information to the user.

18. A computer-readable storage medium on which is recorded a program for implementing with a computer a portable device which provides information to a user, and for causing the computer to execute a process comprising:

storing in a conditional information storage a plurality of pieces of information, each piece having attached thereto a presentation condition including at least one of a time restriction and a point restriction, the time and point restrictions respectively specifying an effective time and an effective point in predetermined formats so that at least one appropriate piece of information from among the pieces of information can be provided to the user when the time and point restrictions are satisfied by a current time and a location of the user;

retrieving at least one of a piece of information with a time restriction satisfied by the current time and a piece of information with a point restriction satisfied by the location of the user receiving the provided information, with one of a method of checking the pieces of information at predetermined time intervals, and a method of checking the pieces of information according to the point of the user; and providing the retrieved information to a user.

19. A portable navigation information presenting apparatus for presenting navigation information to a user according to a state, comprising:

a unit dynamically selecting navigation information to be presented according to a change of at least one of time information and point information, at least one of an effective time at which the navigation information is to be presented and an effective point in which the navigation information is to be presented being described in a predetermined format in the selected navigation information and being used to select the navigation information to be presented; and a unit outputting the selected navigation information according to at least one of the effective time at which the selected navigation information is to be presented and the effective point in which the selected navigation information is to be presented.

* * * * *